(12) United States Patent
Urano et al.

(10) Patent No.: US 7,627,172 B2
(45) Date of Patent: Dec. 1, 2009

(54) IMAGE PROCESSING APPARATUS AND METHOD, AND PROGRAM

(75) Inventors: Izumi Urano, Tokyo (JP); Natsuo Koda, Kanagawa (JP)

(73) Assignee: Sony Corporation, Tokyo (JP)

( * ) Notice: Subject to any disclaimer, the term of this patent is extended or adjusted under 35 U.S.C. 154(b) by 701 days.

(21) Appl. No.: 11/130,390

(22) Filed: May 17, 2005

(65) Prior Publication Data

US 2005/0271274 A1 Dec. 8, 2005

(30) Foreign Application Priority Data

| Jun. 7, 2004 | (JP) | ............................. 2004-168836 |
| Jun. 7, 2004 | (JP) | ............................. 2004-168837 |
| Jun. 7, 2004 | (JP) | ............................. 2004-168838 |

(51) Int. Cl.
*G06K 9/34* (2006.01)
*G06K 9/00* (2006.01)
*G06K 9/46* (2006.01)

(52) U.S. Cl. .................... 382/173; 382/164; 382/204

(58) Field of Classification Search ................ 382/199, 382/164, 173, 204
See application file for complete search history.

(56) References Cited

U.S. PATENT DOCUMENTS

| 5,077,805 A * | 12/1991 | Tan ............................. 382/137 |
| 5,513,275 A * | 4/1996 | Khalaj et al. ................. 382/149 |
| 7,068,834 B1 * | 6/2006 | Ikeda et al. .................. 382/145 |
| 2005/0157950 A1 * | 7/2005 | Xavier ......................... 382/300 |
| 2006/0045375 A1 * | 3/2006 | Okuno et al. ................ 382/266 |

OTHER PUBLICATIONS

S. Coorg et al. "Extracting textured vertical facades from controlled close-range imagery", IEEE Computer Society Conference on Computer Vision and Pattern Recognition, Fort Collins, CO, 1999, pp. 625-632.*

Xiaoguang Wang, et al., "Surface Microstructure Extraction from Multiple Aerial Images", Proceedings of the spie—The International Society for Optical Engineering Spie-Int. Soc. Opt., vol. 3072, XP-002473976, 1997, pp. 251-262.

Xiaoguang Wang, et al., "Surface Texture and Microstructure Extraction from Multiple Aerial Images", Computer Vision and Image Understanding Academic Press USA, vol. 83, No. 1, XP-002473977, Jul. 2001, pp. 1-37.

* cited by examiner

*Primary Examiner*—Samir A. Ahmed
*Assistant Examiner*—Li Liu
(74) *Attorney, Agent, or Firm*—Oblon, Spivak, McClelland, Maier & Neustadt, L.L.P.

(57) ABSTRACT

An image processing apparatus for processing an image includes the following elements. A repeating-component extracting unit extracts repeating components, which are repeatedly appearing, similar components in the image, from the image. A repeating-component location adjusting unit adjusts the location of the repeating components by equally locating the repeating components extracted by the repeating-component extracting unit at regular intervals on a screen. An area interpolator interpolates a representative value of an image without the repeating components into some of the areas forming the image in which the location of the repeating components is not adjusted. A feature information generator generates feature information indicating the repeating components in the image interpolated by the areas interpolator and a feature of the location of the repeating components.

19 Claims, 73 Drawing Sheets

BLOCK INFORMATION

- START POSITION INFORMATION
- LENGTH INFORMATION
- COLOR INFORMATION

FIG. 61A

| 0 | −1 | 0 |
|---|----|---|
| −1 | 5 | −1 |
| 0 | −1 | 0 |

FIG. 61B

| −1 | −1 | −1 |
|----|----|----|
| −1 | 9 | −1 |
| −1 | −1 | −1 |

FIG. 63A

| 0 | 1 |
|---|---|
| −1 | 0 |

FIG. 63B

| 1 | 0 |
|---|---|
| 0 | −1 |

FIG. 64A

| 0 | 0 | 0 |
|---|---|---|
| −1 | 0 | 1 |
| 0 | 0 | 0 |

FIG. 64B

| 0 | −1 | 0 |
|---|---|---|
| 0 | 0 | 0 |
| 0 | 1 | 0 |

FIG. 65A

| -1 | 0 | 1 |
|----|---|---|
| -1 | 0 | 1 |
| -1 | 0 | 1 |

FIG. 65B

| -1 | -1 | -1 |
|----|----|----|
| 0  | 0  | 0  |
| 1  | 1  | 1  |

FIG. 66A

| -1 | 0 | 1 |
|---|---|---|
| -2 | 0 | 2 |
| -1 | 0 | 1 |

FIG. 66B

| -1 | -2 | -1 |
|---|---|---|
| 0 | 0 | 0 |
| 1 | 2 | 1 |

IMAGE PROCESSING APPARATUS AND METHOD, AND PROGRAM

CROSS REFERENCES TO RELATED APPLICATIONS

The present invention contains subject matter related to Japanese Patent Application JP 2004-168836, 2004-168837, and 2004-168838 filed in the Japanese Patent Office on Jun. 7, 2004, the entire contents of which are incorporated herein by reference.

BACKGROUND OF THE INVENTION

1. Field of the Invention

The present invention relates to image processing apparatuses and methods, and programs, and more particularly, to an image processing apparatus and method, and a program in which the positions at which the repeating cycle of repeating components in an image appears can be specified.

2. Description of the Related Art

A technique for forming a map by extracting a building from an image photographed by a digital still camera and outputting the extracted building as an image is known.

One technique for forming a three-dimensional map is as follows, as disclosed in, for example, U.S. Pat. No. 3,267,590. A user performs a two-dimensional input operation to form a surveying map, calculates the heights of buildings, and photographs target buildings. Based on the surveying result, the user creates a general-purpose database representing two-dimensional map data provided with the heights of the buildings, and options are further added to the map data, thereby generating an integrated three-dimensional city database.

To form a map, if two-dimensional Fourier transform is performed on an image, the repeating cycle of repeating components in the image can be determined to a certain degree by detecting the peak value.

Japanese Unexamined Patent Application Publication No. 9-167240 discloses a technique for extracting edges of an image based on a combination of the difference of pixels of digitized image data.

To form a map, if an image is divided into a plurality of blocks, generally, the numbers by which the image is divided in the horizontal direction and in the vertical direction are set based on the size of the image, and the block size is determined based on the numbers of divided portions.

For example, U.S. Pat. No. 3,364,939 discloses a technique for spatially dividing image data into a plurality of blocks, one block having n×n pixels.

SUMMARY OF THE INVENTION

If a building is extracted from an image photographed by a digital still camera, many unnecessary items of information, such as telegraph wires, trees, and shadows, are contained in the building.

In the technique disclosed in U.S. Pat. No. 3,267,590, the procedure to form a three-dimensional map is time-consuming, and also, the amount of data in a database is large, which is very costly.

It is difficult to process such an image based on the features of the image. If two-dimensional Fourier transform is performed, it is difficult to specify the positions in an image at which the repeating cycle of repeating components appears.

In the technique disclosed in Japanese Unexamined Patent Application Publication No. 9-167240, it is difficult to extract, among many edges, edges characterizing an image only.

In the technique disclosed in U.S. Pat. No. 3,364,939, an image is divided into a plurality of blocks without changing the block size. Accordingly, even if the image contains repeating components, it is difficult to divide the image into a plurality of blocks by considering the features of the repeating components.

Accordingly, it is desirable to process an image based on the features of the image.

An image processing system for processing an image according to an embodiment of the present invention includes the following elements. Edge extracting means extracts edges in at least one of a substantially horizontal direction and a substantially vertical direction from an input image. Mode-value calculating means calculates a mode value of intervals between two edges on the image in the substantially horizontal direction or in the substantially vertical direction for all possible combinations of edge pairs of the edges extracted by the edge extracting means. Repeating-cycle calculating means detects linkage portions of a set of edge pairs having the mode value of the intervals calculated by the mode-value calculating means, areas sandwiched between the two edges of the edge pairs having the mode value being continuously adjacent to each other, calculates a statistically representative value of the intervals of the two edges of the edge pairs having the linkage portions as a repeating cycle of the extracted edges. Image dividing means divides the input image by the repeating cycle of the extracted edges in a direction in which the edges repeatedly appear so as to generate a plurality of first blocks, which are small areas divided from the input image, and sets a statistically representative color of each of the plurality of first blocks for the corresponding first block. Block integrating means couples, among the plurality of first blocks generated by dividing the input image by the image dividing means, a plurality of adjacent first blocks whose color difference is within a predetermined range into a second block and sets the statistically representative color of the coupled first blocks for the color of the second block so as to integrate the plurality of first blocks into the second block. Area generating means divides the input image by boundaries of the second block in the substantially horizontal direction or in the substantially vertical direction generated by integrating the plurality of first blocks by the block integrating means so as to generate a plurality of areas for substituting the color. Area substituting means substitutes, among the plurality of areas generated by the area generating means, an area having the largest proportion of a predetermined statistically representative color for colors of the other areas. Area extracting means extracts areas having a predetermined or greater size among the areas substituted by the area substituting means. Repeating-component extracting means extracts repeating components, which are repeatedly appearing, similar components, in an image including the areas extracted by the area extracting means. Repeating-component location adjusting means adjusts the location of the repeating components by equally locating the repeating components extracted by the repeating-component extracting means at regular intervals on a screen. Area interpolation means interpolates a representative value of an image without the repeating components into some of the areas forming the image in which the location of the repeating components is not adjusted. Feature information generating means generates feature information indicating the repeating components located in the image interpolated by the area interpolation means and a feature of the location of the repeating components. Acquiring means acquires the feature information generated by the feature information generating means. Reproduction means reproduces the image based on the feature information acquired by the acquiring means.

An image processing apparatus for processing an image according to another embodiment of the present invention includes the following elements. Repeating-component extracting means extracts repeating components, which are repeatedly appearing, similar components in the image, from the image. Repeating-component location adjusting means adjusts the location of the repeating components by equally locating the repeating components extracted by the repeating-component extracting means at regular intervals on a screen. Area interpolation means interpolates a representative value of an image without the repeating components into some of the areas forming the image in which the location of the repeating components is not adjusted. Feature information generating means generates feature information indicating the repeating components in the image interpolated by the area interpolation means and a feature of the location of the repeating components.

An image processing method for an image processing apparatus for processing an image according to another embodiment of the present invention includes the steps of: extracting repeating components, which are repeatedly appearing, similar components in the image, from the image; adjusting the location of the repeating components by equally locating the repeating components extracted by the extracting step at regular intervals on a screen; interpolating a representative value of an image without the repeating components into some of the areas forming the image in which the location of the repeating components is not adjusted; and generating feature information indicating the repeating components located in the image interpolated by the interpolating step and a feature of the location of the repeating components.

A program for processing an image allows a computer to execute processing according to another embodiment of the present invention includes the steps of: extracting repeating components, which are repeatedly appearing, similar components in the image, from the image; adjusting the location of the repeating components by equally locating the repeating components extracted by the extracting step at regular intervals on a screen; interpolating a representative value of an image without the repeating components into some of the areas forming the image in which the location of the repeating components is not adjusted; and generating feature information indicating the repeating components located in the image interpolated by the interpolating step and a feature of the location of the repeating components.

An image processing apparatus for processing an image according to another embodiment of the present invention includes the following elements. Edge extracting means extracts edges in at least one of a substantially horizontal direction and a substantially vertical direction from an input image. Mode-value calculating means calculates a mode value of intervals between two edges on the image in the substantially horizontal direction or in the substantially vertical direction for all possible combinations of edge pairs of the edges extracted by the edge extracting means. Repeating-cycle calculating means detects linkage portions of a set of edge pairs having the mode value of the intervals calculated by the mode-value calculating means, areas sandwiched between the two edges of the edge pairs having the mode value being continuously adjacent to each other, and calculates a statistically representative value of the intervals of the two edges of the edge pairs having the linkage portions as a repeating cycle of the extracted edges.

An image processing method for an image processing apparatus for processing an image according to another embodiment of the present invention includes the steps of: extracting edges in at least one of a substantially horizontal direction and a substantially vertical direction from an input image; calculating a mode value of intervals between two edges on the image in the substantially horizontal direction or in the substantially vertical direction for all possible combinations of edge pairs of the edges extracted by the extracting step; and detecting linkage portions of a set of edge pairs having the mode value of the intervals calculated by the calculating step, areas sandwiched between the two edges of the edge pairs having the mode value being continuously adjacent to each other, and for calculating a statistically representative value of the intervals of the two edges of the edge pairs having the linkage portions as a repeating cycle of the extracted edges.

A program for processing an image according to another embodiment of the present invention allows a computer to execute processing including the steps of: extracting edges in at least one of a substantially horizontal direction and a substantially vertical direction from an input image; calculating a mode value of intervals between two edges on the image in the substantially horizontal direction or in the substantially vertical direction for all possible combinations of edge pairs of the edges extracted by the extracting step; and detecting linkage portions of a set of edge pairs having the mode value of the intervals calculated by the calculating step, areas sandwiched between the two edges of the edge pairs having the mode value being continuously adjacent to each other, and for calculating a statistically representative value of the intervals of the two edges of the edge pairs having the linkage portions as a repeating cycle of the extracted edges.

An image processing apparatus for processing an input image according to another embodiment of the present invention includes the following elements. Image dividing means divides the input image in which a plurality of edges repeatedly appear at predetermined intervals in one of a substantially horizontal direction and a substantially vertical direction by a repeating cycle of the edges in a direction in which the edges repeatedly appear so as to generate a plurality of first blocks, which are small areas divided from the input image, and sets a statistically representative color of each of the plurality of first blocks for the corresponding first block. Block integrating means couples, among the plurality of first blocks generated by dividing the input image by the image dividing means, a plurality of adjacent first blocks whose color difference is within a predetermined range into a second block and for setting the statistically representative color of the coupled first blocks for the color of the second block so as to integrate the plurality of first blocks into the second block.

An image processing method for an image processing apparatus for processing an input image according to another embodiment of the present invention includes the steps of: dividing the input image in which a plurality of edges repeatedly appear at predetermined intervals in one of a substantially horizontal direction and a substantially vertical direction by a repeating cycle of the edges in a direction in which the edges repeatedly appear so as to generate a plurality of first blocks, which are small areas divided from the input image, and for setting a statistically representative color of each of the plurality of first blocks for the corresponding first block; and coupling, among the plurality of first blocks generated by the dividing step, a plurality of adjacent first blocks whose color difference is within a predetermined range into a second block and for setting the statistically representative color of the coupled first blocks for the color of the second block so as to integrate the plurality of first blocks into the second block.

A program allowing a computer to perform image processing according to another embodiment of the present invention includes the steps of: dividing the input image in which a plurality of edges repeatedly appear at predetermined intervals in one of a substantially horizontal direction and a substantially vertical direction by a repeating cycle of the edges in a direction in which the edges repeatedly appear so as to generate a plurality of first blocks, which are small areas divided from the input image, and for setting a statistically representative color of each of the plurality of first blocks for the corresponding first block; and coupling, among the plurality of first blocks generated by the dividing step, a plurality of adjacent first blocks whose color difference is within a predetermined range into a second block and for setting the statistically representative color of the coupled first blocks for the color of the second block so as to integrate the plurality of first blocks into the second block.

According to an embodiment of the present invention, the following advantages can be achieved.

An image can be processed based on the features of the image. More particularly, the position of a group having a similar color distribution can be adjusted, and the image can be processed by making the best use of the features of the image. Also, based on data on a plurality of similar group images, the reproduction position of the image can be specified and the data on the group images can be expanded quickly. Additionally, an image can be divided into blocks having desired sizes, and the positions of similar group images can be adjusted, and the image can be processed and reproduced by making the best use of the features of the image.

The repeating cycle of an image can be extracted. More particularly, the repeating cycle of an image can be extracted based on the repeating components of the major edges of the image.

An image can be formed into blocks based on the features of the image. More particularly, an image can be formed into blocks having desired sizes.

An image processing apparatus (for example, a repeating-cycle extracting device 11 shown in FIG. 3) for processing an image according to an embodiment of the present invention includes the following elements. Edge extracting means (for example, an edge extracting unit 52 shown in FIG. 3) extracts edges in at least one of a substantially horizontal direction and a substantially vertical direction from an input image. Mode-value calculating means (for example, an edge appearance interval calculator 53 shown in FIG. 3) calculates a mode value of intervals between two edges on the image in the substantially horizontal direction or in the substantially vertical direction for all possible combinations of edge pairs of the edges extracted by the edge extracting means. Repeating-cycle calculating means (for example, a repeating cycle calculator 54 shown in FIG. 3) detects linkage portions of a set of edge pairs having the mode value of the intervals calculated by the mode-value calculating means, areas sandwiched between the two edges of the edge pairs having the mode value being continuously adjacent to each other, and calculates a statistically representative value of the intervals of the two edges of the edge pairs having the linkage portions as a repeating cycle of the extracted edges.

An image processing method for an image processing apparatus for processing an image according to an embodiment of the present invention includes the steps of: extracting edges in at least one of a substantially horizontal direction and a substantially vertical direction from an input image (for example, step S33 or S34 shown in FIG. 7); calculating a mode value of intervals between two edges on the image in the substantially horizontal direction or in the substantially vertical direction for all possible combinations of edge pairs of the edges extracted by the extracting step (for example, step S36 shown in FIG. 7); and detecting linkage portions of a set of edge pairs having the mode value of the intervals calculated by the calculating step, areas sandwiched between the two edges of the edge pairs having the mode value being continuously adjacent to each other, and for calculating a statistically representative value of the intervals of the two edges of the edge pairs having the linkage portions as a repeating cycle of the extracted edges (for example, step S37 in FIG. 7).

A program for processing an image, allowing a computer to execute processing according to an embodiment of the present invention includes the steps of: extracting edges in at least one of a substantially horizontal direction and a substantially vertical direction from an input image (for example, step S33 or S34 in FIG. 7); calculating a mode value of intervals between two edges on the image in the substantially horizontal direction or in the substantially vertical direction for all possible combinations of edge pairs of the edges extracted by the extracting step (step S36 in FIG. 7); and detecting linkage portions of a set of edge pairs having the mode value of the intervals calculated by the calculating step, areas sandwiched between the two edges of the edge pairs having the mode value being continuously adjacent to each other, and for calculating a statistically representative value of the intervals of the two edges of the edge pairs having the linkage portions as a repeating cycle of the extracted edges (step S37 in FIG. 7).

BRIEF DESCRIPTION OF THE DRAWINGS

FIG. 44 illustrates an example of the block information structure;

FIGS. 61A and 61B illustrate Laplacian filters;

FIGS. 62A through 66B illustrate edge detecting filters;

DESCRIPTION OF THE PREFERRED EMBODIMENTS

Figure 1:
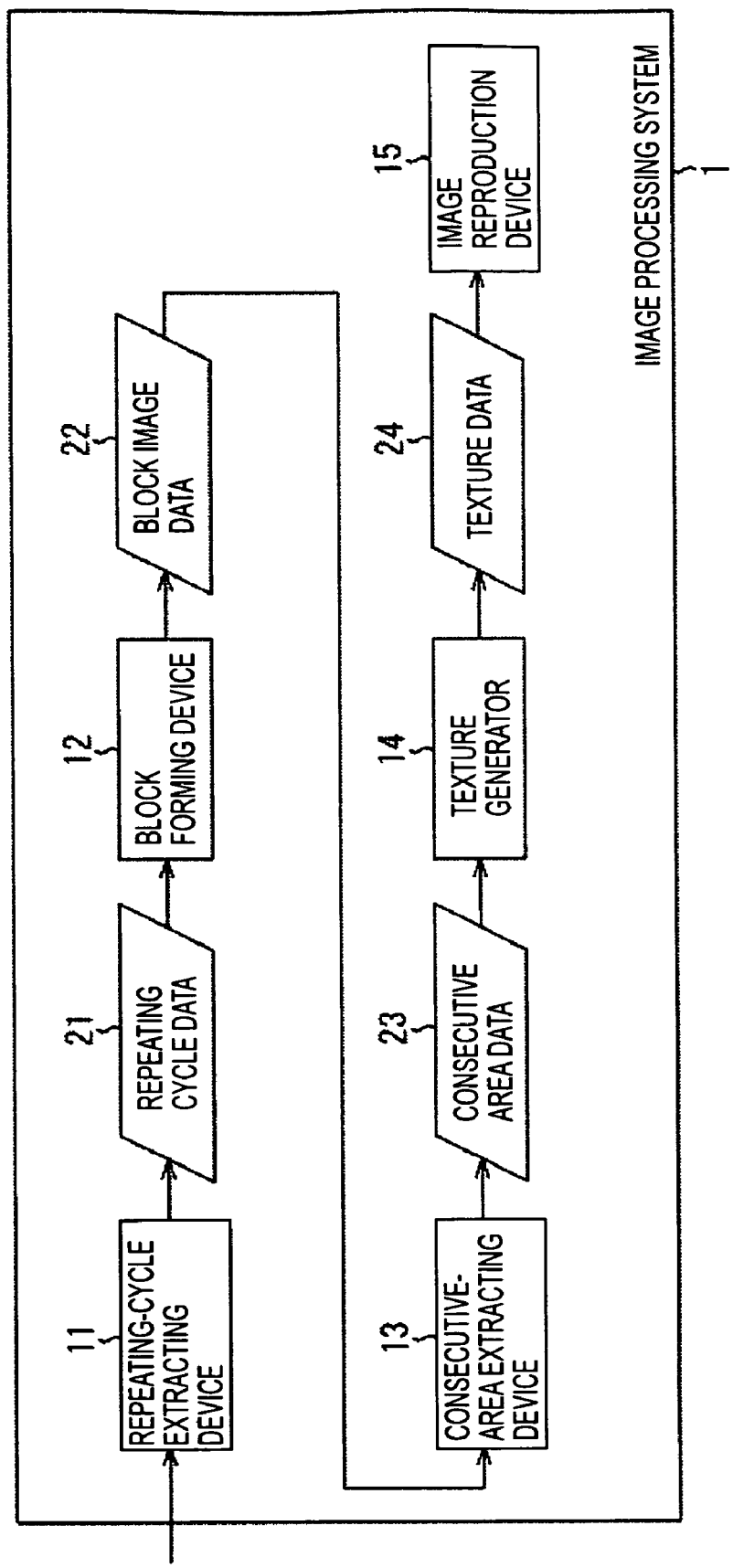
FIG. 1 is a block diagram illustrating an example of the overall configuration of an image processing system according to an embodiment of the present invention.

An embodiment of the present invention is described below with reference to the accompanying drawings.

An image processing system 1 according to an embodiment of the present invention includes a repeating-cycle extracting device 11, a block forming device 12, a consecutive-area extracting device 13, a texture generator 14, and an image reproduction device 15.

Figure 5:
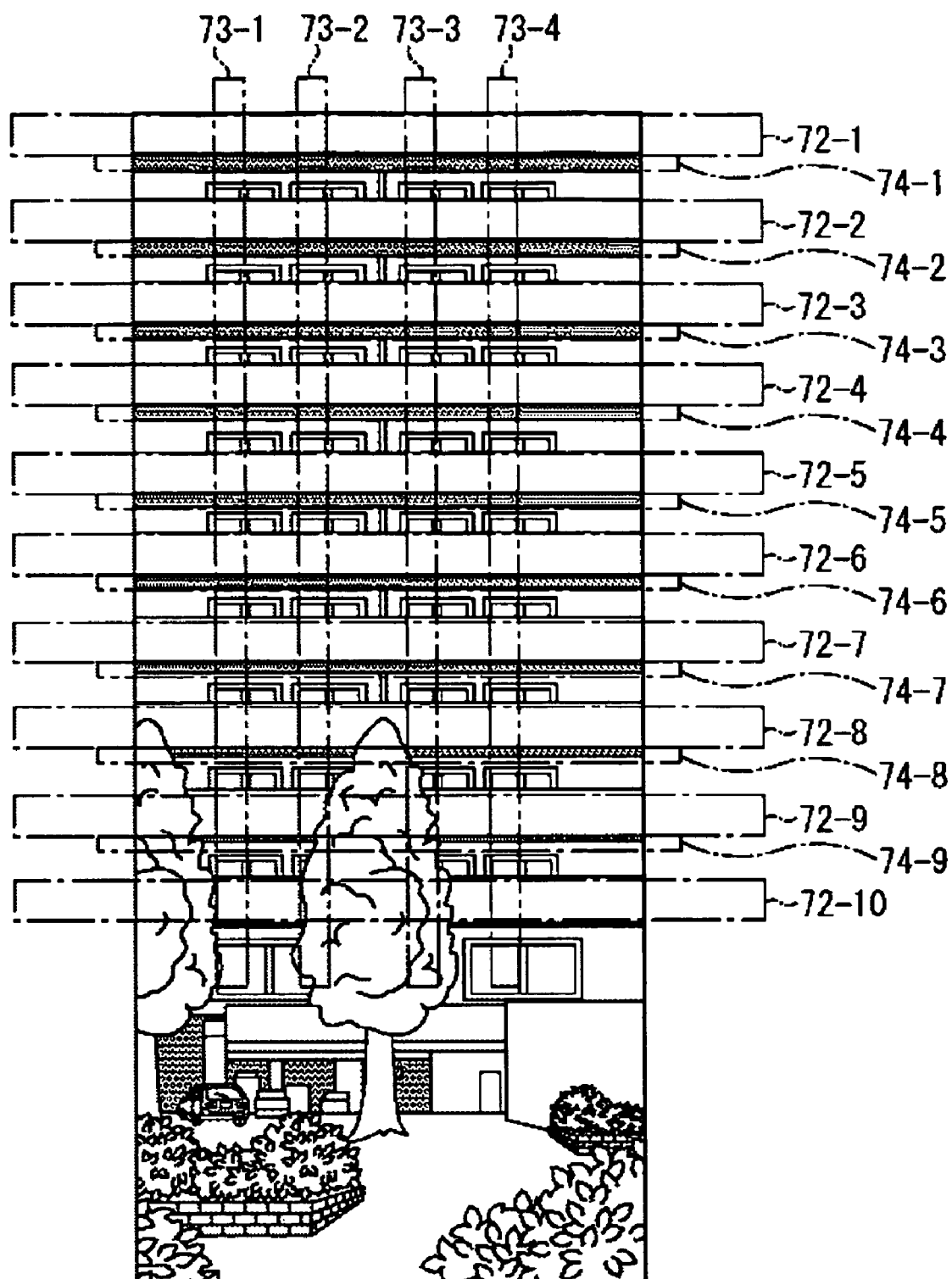
FIG. 5 illustrates repeating areas contained in the image shown in FIG. 4.
Figure 6:
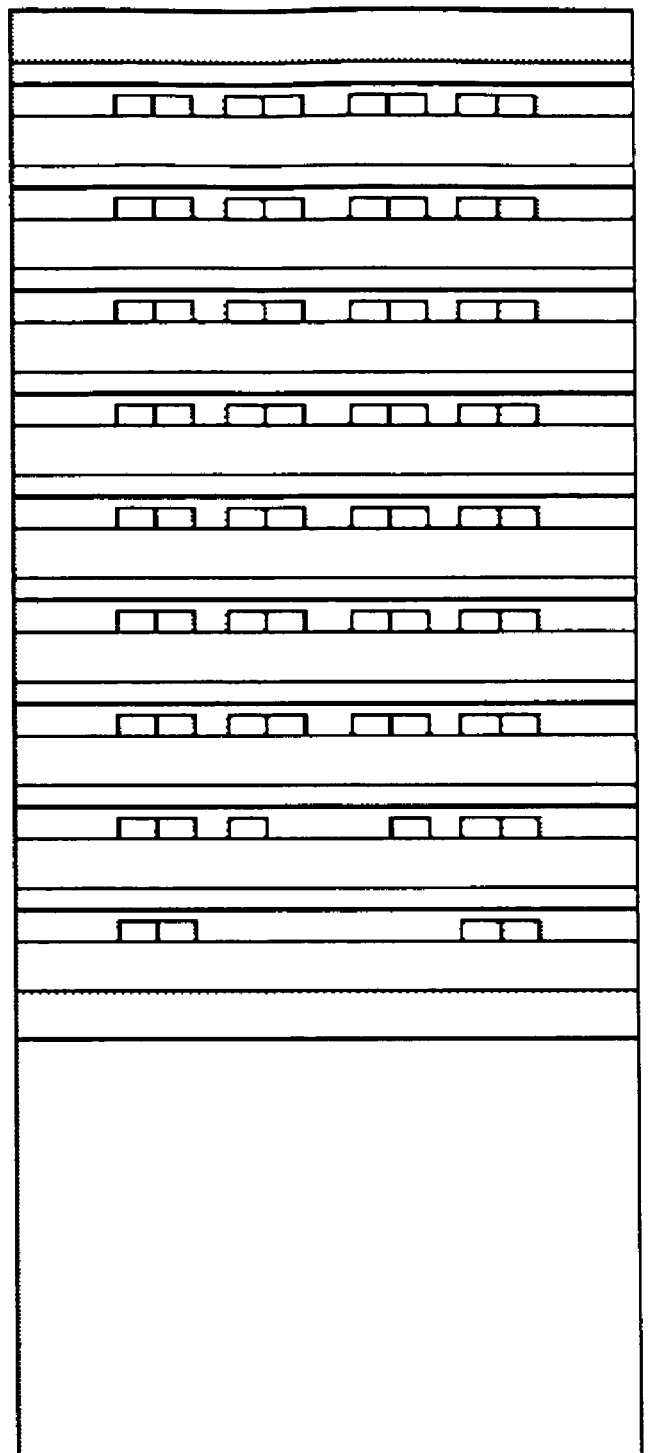
FIG. 6 illustrates an image from which major edges are extracted from the image shown in FIG. 5.

The repeating-cycle extracting device 11 extracts the repeating cycle concerning the appearance of major edges of an image based on image data of the image containing repeating components, which are discussed in detail below with reference to FIGS. 4 through 6, and outputs the extracted repeating cycle as repeating cycle data 21. The repeating cycle data 21 includes repeating cycle data concerning horizontal edges and repeating cycle data concerning vertical edges. The block forming device 12 divides an image into blocks having desired sizes based on the repeating components of the image, and outputs the divided image as block image data 22. The block image data 22 includes at least image data formed of a plurality of block images divided into desired sizes of blocks. The consecutive-area extracting device 13 divides an image into a plurality of areas based on the image data including block images, and substitutes similar areas by a representative value, and also extracts: consecutive areas and outputs them as consecutive area data 23. The consecutive area data 23 includes at least data concerning consecutive areas. The texture generator 14 extracts repeating components of an image and adjusts the positions of the repeating components, and also interpolates the adjusted image and outputs it as texture data 24. The texture data 24 includes data concerning the features of the image. The image reproduction device 15 reproduces the image based on the texture data 24.

Figure 2:
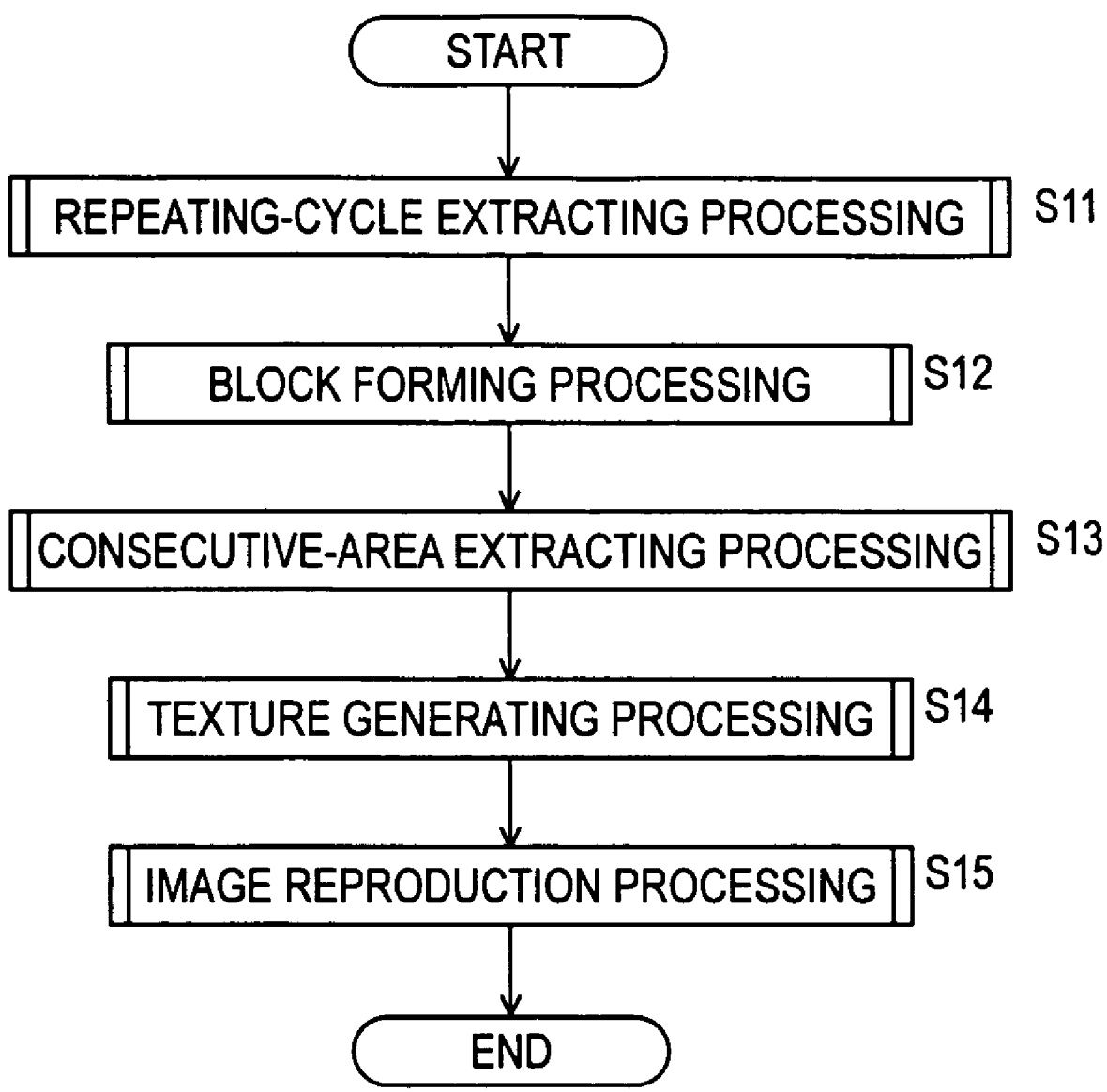
FIG. 2 is a flowchart illustrating image processing performed by the image processing system shown in FIG. 1.

FIG. 2 is a flowchart illustrating image processing performed by the image processing system 1 shown in FIG. 1. This processing is started when image data of an image containing repeating components (i.e., repeatedly appearing, similar image components) is input into the repeating-cycle extracting device 11.

In step S11, the repeating-cycle extracting device 11 performs repeating-cycle extracting processing. For example, the repeating-cycle extracting device 11 extracts the cycle of repeating components of major edges of an image from image data of the image containing the repeating components, and outputs the extracted cycle as the repeating cycle data 21. Details of this processing are discussed below with reference to FIG. 7.

In step S12, the block forming device 12 performs block forming processing. For example, the block forming device 12 divides the image into blocks having desired sizes based on the repeating components of the image contained in the repeating cycle data 21 output from the repeating-cycle extracting device 11, and outputs the divided image as the block image data 22. Details of this processing are discussed below with reference to FIG. 13.

In step S13, the consecutive-area extracting device 13 performs consecutive-area extracting processing. For example, the consecutive-area extracting device 13 divides the image into a plurality of areas based on the block image data 22 and substitutes similar areas by a representative value, and also extracts the consecutive areas and outputs them as the consecutive area data 23. Details of this processing are discussed below with reference to FIG. 18.

In step S14, the texture generator 14 executes texture generating processing. For example, the texture generator 14 extracts repeating components of an image and adjusts the positions of the repeating components, and also interpolates the adjusted image and outputs it as the texture data 24. Details of this processing are discussed below with reference to FIG. 36.

In step S15, the image reproduction device 15 performs image reproduction processing. For example, the image reproduction device 15 reproduces the repeating components of an image based on the texture data 24 to reconstruct the image. Details of this processing are discussed below with reference to FIG. 46. The image processing is then completed.

According to the image processing of FIG. 2, the repeating cycle concerning the interval between major edges of an image is extracted from the image data of the image containing repeating components, and based on the extracted repeating cycle, the image is divided into blocks having desired sizes. Based on the image blocks, the image is divided into a plurality of areas and consecutive areas are extracted, and the repeating components of the image are extracted and adjusted, thereby generating the texture data 24. Then, based on this texture data 24, the repeating components of the image are reproduced to reconstruct the image.

Thus, the image can be processed based on the features of the image (repetition of the image components). The image can also be divided into blocks having desired sizes. Additionally, the positions of the similar areas of the image can be adjusted. As a result, the image can be processed by making the best use of the features of the image, and the image can be reproduced by making the best use of the features of the image.

The configuration of the repeating-cycle extracting device 11 shown in FIG. 1 and the repeating-cycle extracting processing are described below.

Figure 3:
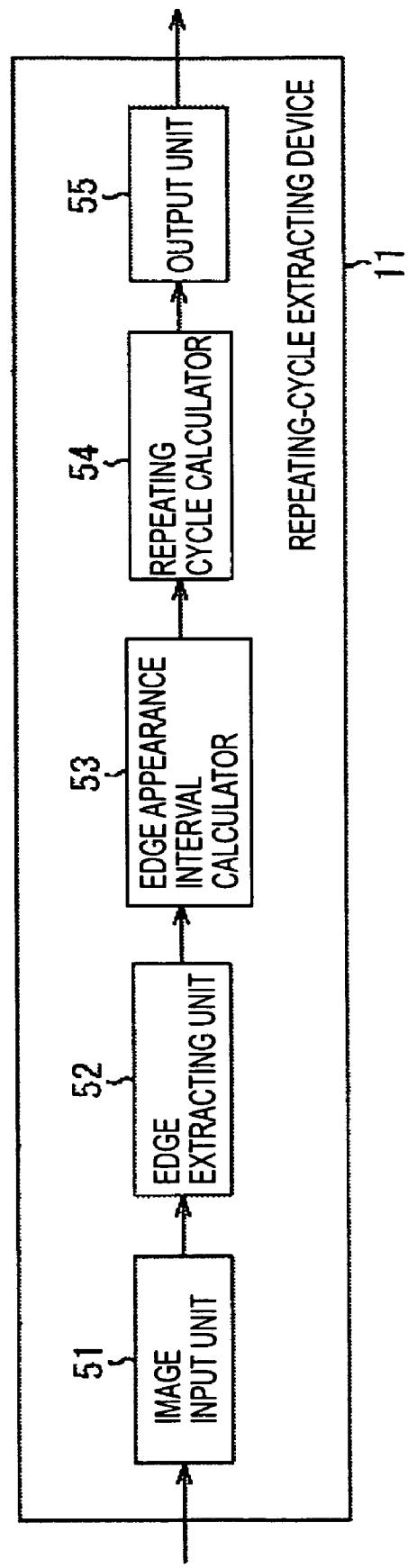
FIG. 3 is a block diagram illustrating an example of the functional configuration of a repeating-cycle extracting device shown in FIG. 1.

FIG. 3 is a block diagram illustrating the functional configuration of the repeating-cycle extracting device 11 shown in FIG. 1.

The repeating-cycle extracting device 11 includes an image input unit 51, an edge extracting unit 52, an edge appearance interval calculator 53, a repeating cycle calculator 54, and an output unit 55.

The image input unit 51 receives (reads) image data of an image containing repeating components, converts the image into R, G, and B digital data, i.e., three primary color data, and supplies the digital data to the edge extracting unit 52. Although in this embodiment the image data is converted into R, G, and B digital data, it may be converted into a color coordinate system data, such as YCrCb data.

The edge extracting unit 52 extracts edges in the horizontal direction and in the vertical direction based on the R, G, and B digital image data. The edge extracting unit 52 extracts edges by, for example, the Hough transform method. The edge extracting unit 52 may extract edges only in one of the horizontal direction and the vertical direction. Alternatively, the edge extracting unit 52 may extract edges substantially in the horizontal direction and substantially in the vertical direction.

The edge appearance interval calculator 53 detects the mode value of the appearance intervals between the horizontal edges or the vertical edges based on the horizontal edges and the vertical edges detected by the edge extracting unit 52. More specifically, the edge appearance interval calculator 53 selects all possible combinations of two horizontal edges or two vertical edges to determine the mode value (most frequent value of the appearance intervals (distance) of the two edges, thereby detecting the mode value of the appearance interval of the horizontal edges or the vertical edges.

The repeating cycle calculator 54 detects all possible combinations of the two edges having the mode value, and searches for linkage portions (one of the two lines of one linkage portion is overlapped with one of the two lines of the other linkage portion) from the detected combinations. Then, the repeating cycle calculator 54 sets the statistically representative length, such as the mode value, the median value, or the average value, of the linkage portions to be the repeating cycle concerning the appearance of major edges of the image. The linkage portions are formed of a set of edge pairs which appear at the interval having the mode value so that the areas sandwiched by the corresponding two edges are continuously adjacent to each other. The length of the linkage portions is the repeating cycle of the above-described edge appearance. That is, the mode value, the median value, or the average value (i.e., statistically representative value) of the linkage portions is used as the repeating cycle of the edge appearance.

The output unit 55 outputs the repeating cycle data concerning the appearance of major edges of the image detected by the repeating cycle calculator 54. More specifically, the output unit 55 outputs the "length of the linkage portions having the mode value" and the "positions of the edges having the mode value" as the repeating cycle data 21. In this case, the positions include a vertical position, which is the x coordinate of the image, and a horizontal position, which is the y coordinate of the image.

The image containing repeating components is discussed below with reference to FIGS. 4 through 6.

Figure 4:
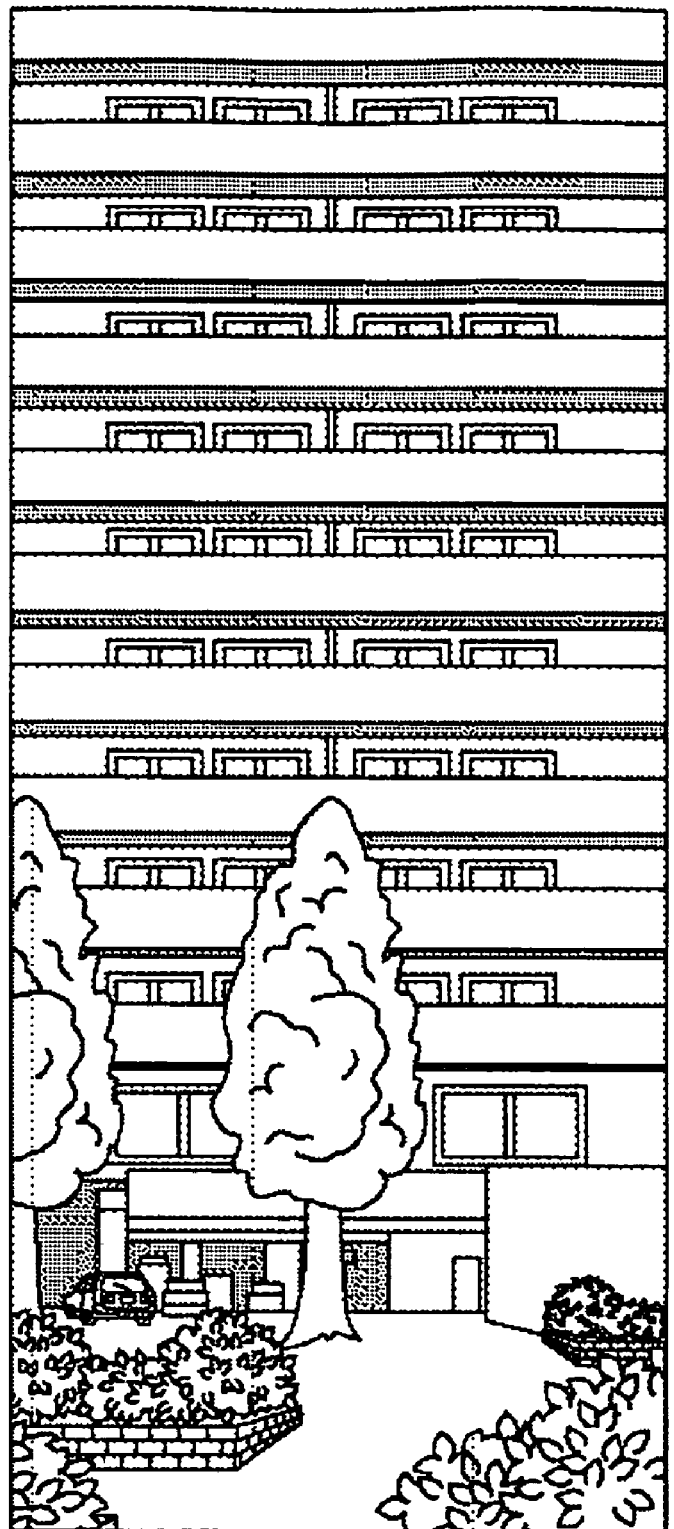
FIG. 4 illustrates an example of an image to be processed.

FIG. 4 illustrates an example of an image 71 of a building (for example, an apartment), as viewed from the front side, photographed by a digital still camera, from which distortions of a camera lens are corrected. In this image 71, in areas 72-1 through 72-10 (FIG. 5), walls and shadows are repeated in the horizontal direction, and in areas 73-1 through 73-4 (FIG. 5), window frames are repeated in the vertical direction. For example, major edges, such as the window frames, walls, and shadows, indicated by the areas 72-1 through 72-10 and the areas 73-1 through 73-4 shown in FIG. 5, are extracted from the image 71 shown in FIG. 4, resulting in an image 74 shown in FIG. 6. In the image 74, the areas 72-1 through 72-10 repeatedly appear in the horizontal direction, and the areas 73-1 through 73-4 repeatedly appear in the vertical direction. This shows that the image 71 shown in FIG. 4 contains repeating components.

As discussed above, an image having edges that repeatedly and regularly appear in the horizontal or vertical direction contains repeating components. In other words, the repeating components are components similar to each other and repeatedly appearing in the image.

Details of the repeating-cycle extracting processing in step S11 of FIG. 2 are described below with reference to the flowchart of FIG. 7. This processing is performed by the repeating-cycle extracting device 11 shown in FIG. 3.

In step S31, the image input unit 51 receives the input of image data of an image containing repeating components. More specifically, the input of image data of an image (for example, the image 71) containing the above-described repeating components discussed with reference to FIGS. 4 through 6 is received.

In step S32, the image input unit 51 extracts color components of each pixel forming the image. More specifically, the image input unit 51 converts the image into R, G, and B digital image data, i.e., the three primary color image data, to extract the color components of the pixels. The image input unit 51 supplies the extracted R, G, and B digital image data to the edge extracting unit 52.

Figure 8:
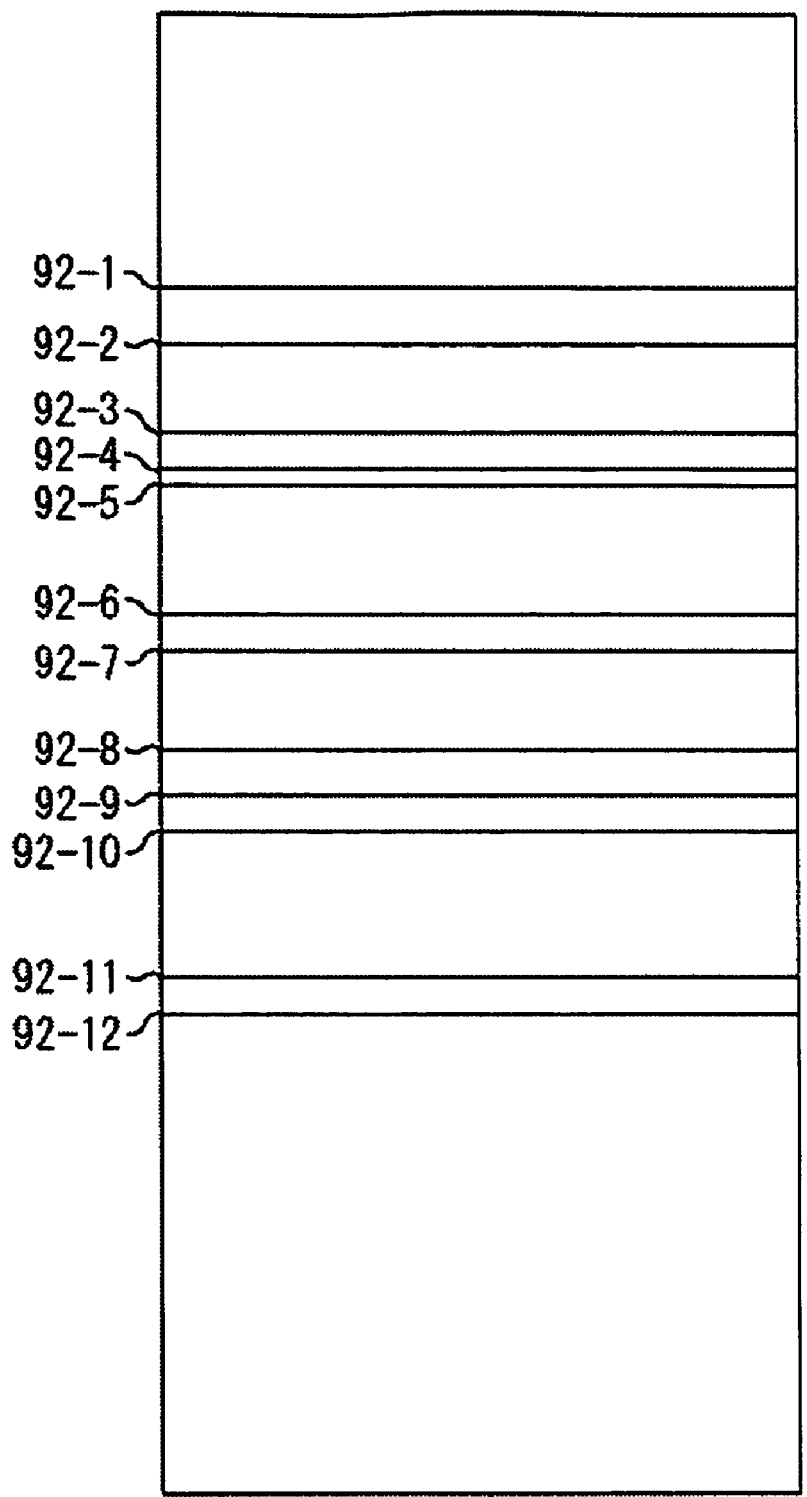
FIG. 8 illustrates extracted edges in the horizontal direction.

In step S33, the edge extracting unit 52 extracts the horizontal edges of the image based on the R, G, and B digital image data by using, for example, the Hough transform method. In the Hough transform method, straight lines are detected. A specific example of the extraction of the horizontal edges is discussed below with reference to FIG. 8. In FIG. 8, horizontal edges 92-1 through 92-12 extracted by the edge extracting unit 52 are shown. That is, the edges 92-1 through 92-12 indicate positions (straight lines) at which the walls and shadows are repeated in the horizontal direction. Although, in actuality, the image having a background shown in FIG. 5 is displayed, the background of an image 91 is not shown for the sake of description (the same applies to images without a background in other drawings). The edge extracting unit 52 supplies the data concerning the horizontal edges (extracted data) indicated by 92-1 through 92-12 to the edge appearance interval calculator 53.

In step S34, the edge extracting unit 52 detects the vertical edges of the image based on the R, G, and B digital image data by using, for example, the Hough transform method. More specifically, the edge extracting unit 52 extracts the vertical edges in a manner similar to the extraction of the horizontal edges in step S33. The edge extracting unit 52 supplies the extracted data concerning the vertical edge to the edge appearance interval calculator 53.

In step S35, the edge appearance interval calculator 53 calculates the appearance intervals between the horizontal edges and the vertical edges based on the extracted horizontal and vertical edges. More specifically, the edge appearance interval calculator 53 calculates the appearance intervals (distances) between all combinations of two edges among the horizontal and vertical edges. In other words, the edge appearance interval calculator 53 calculates the appearance intervals of all the combinations of two edges among the edges 92-1 through 92-12 shown in FIG. 8. For example, the edge appearance interval calculator 53 calculates the appearance interval between the edge 92-1 and one of the edges 92-2 through 92-12. A specific example of the calculation of edges is discussed below with reference to FIG. 9.

Figure 9:
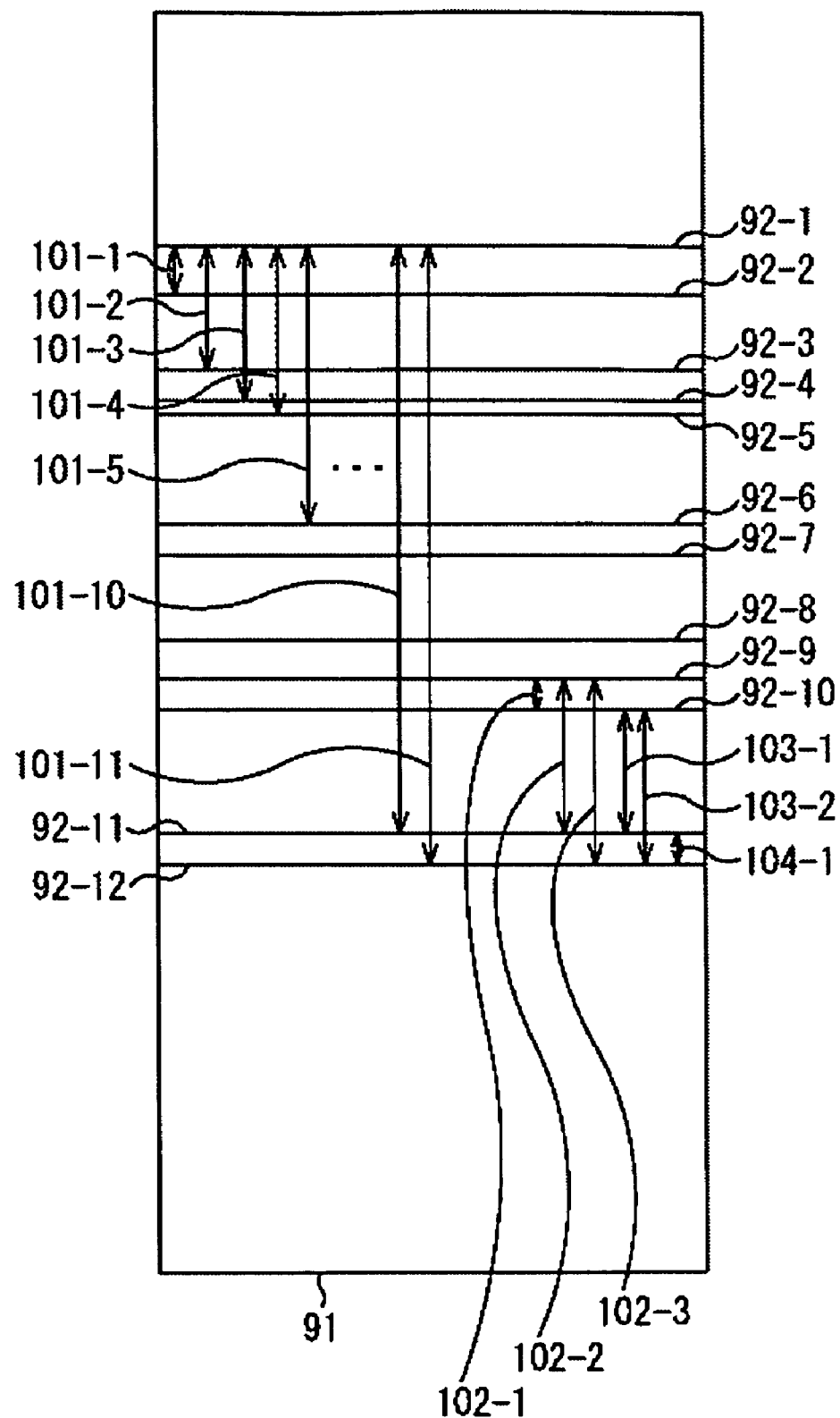
FIG. 9 illustrates appearance intervals between two edges.

In FIG. 9, the appearance interval (distance) between the edges 92-1 an 92-2 is indicated by 101-1. Similarly, the appearance intervals between the edges 92-1 and 92-3, the edges 92-1 and 92-4, the edges 92-1 and 92-5, the edges 92-1 and 92-6, the edges 92-1 and 92-11, and the edges 92-1 and 92-12 are indicated by 101-2, 101-3, 101-4, 101-5, 101-10, and 101-11, respectively. The intervals 101-6 through 101-9 are not shown. Not only the appearance intervals 101-1 through 101-11 between the edge 92-1 and the individual edges 92-2 and 92-12, the appearance intervals of the other combinations of two edges are also detected. In other words, the edge appearance interval calculator 53 detects all combinations of two edges among the 12 edges 92-1 through 92-12, and calculates the corresponding appearance intervals.

For example, as shown in FIG. 9, appearance intervals 102-1, 102-2, and 102-3 between the edges 92-9 and 92-10, the edges 92-9 and 92-11, and the edges 92-9 and 92-12, respectively, are calculated. Also, for the edge 92-10, appearance intervals 103-1 and 103-2 between the edges 92-10 and 92-11 and the edges 92-10 and 92-12, respectively, are calculated. For the edge 92-11, an appearance interval 104-1 between the edges 92-11 and 92-12 is calculated. Although the appearance intervals only in the horizontal direction are shown in FIG. 9, the edge appearance interval calculator 53 also calculates the edge appearance intervals in the vertical direction in a manner similar to the appearance intervals in the horizontal direction.

In step S36, the edge appearance interval calculator 53 calculates the interval appearing most frequently. More specifically, the edge appearance interval calculator 53 determines the mode value of the edge appearance intervals calculated in step S35. For example, the edge appearance interval calculator 53 determines the intervals between two edges for all possible combinations of the extracted plurality of edges and forms a histogram for the determined interval lengths. The edge appearance interval calculator 53 then determines edge pairs having the interval appearing most frequently, and then sets the length of the interval as the mode value. In the example shown in FIG. 9, the mode value of the appearance intervals corresponds to intervals 121 through 127 shown in FIG. 10. The edge appearance interval calculator 53 supplies information concerning the appearance intervals having the mode value to the repeating cycle calculator 54. If a specific value is set as the mode value, it is possible that a sufficient number of edge pairs having the mode value cannot be obtained, which may cause a problem in the practical use of the histogram. Accordingly, all values (lengths of the intervals) contained in a predetermined range in the histogram are set as the mode value, and all the edge pairs satisfying the predetermined range are set as edge pairs having the mode value. An example of the method for calculating the mode value is discussed below with reference to FIGS. 47 and 48.

Figure 10:
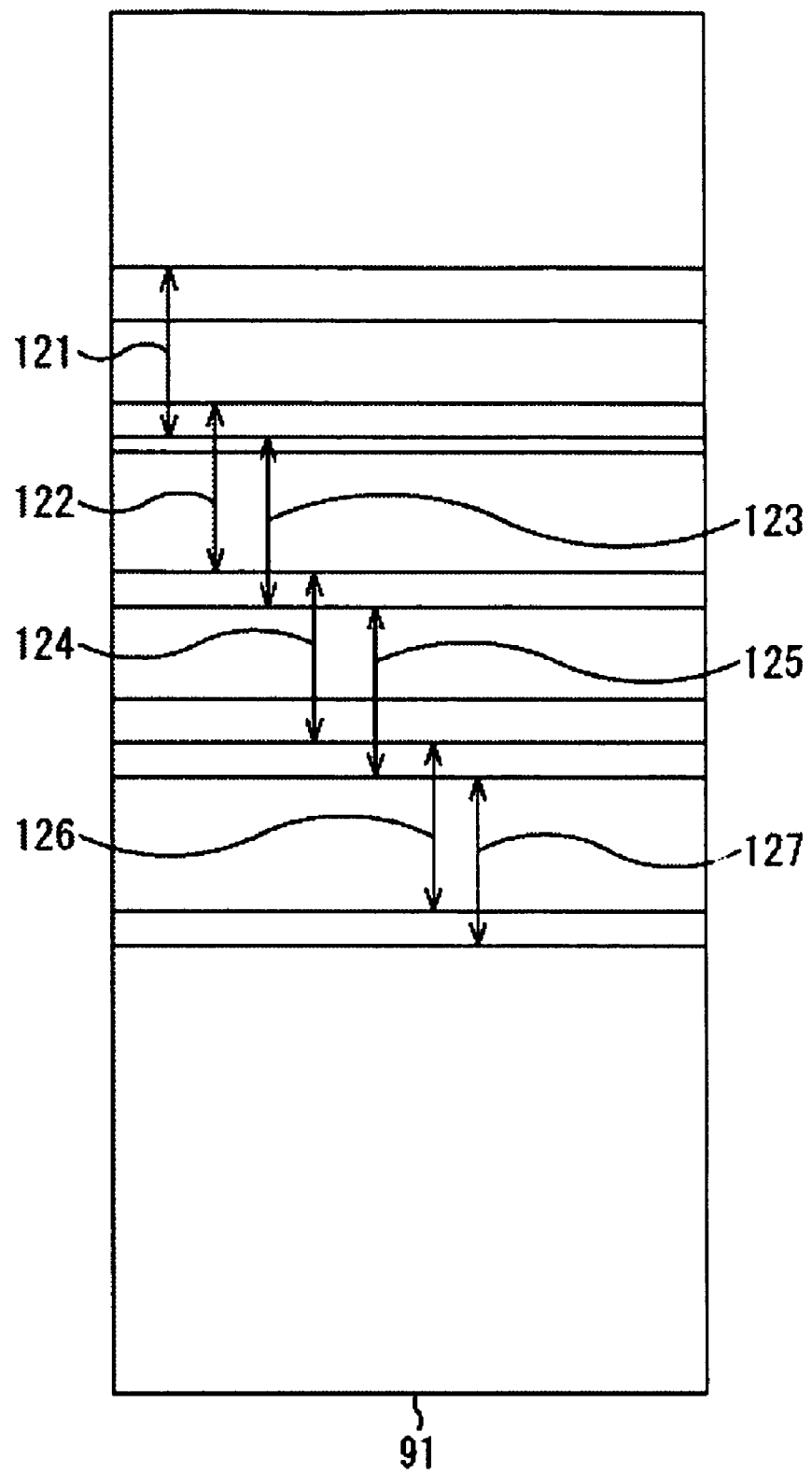
FIG. 10 illustrates the mode value of the edge appearance intervals.
Figure 11:
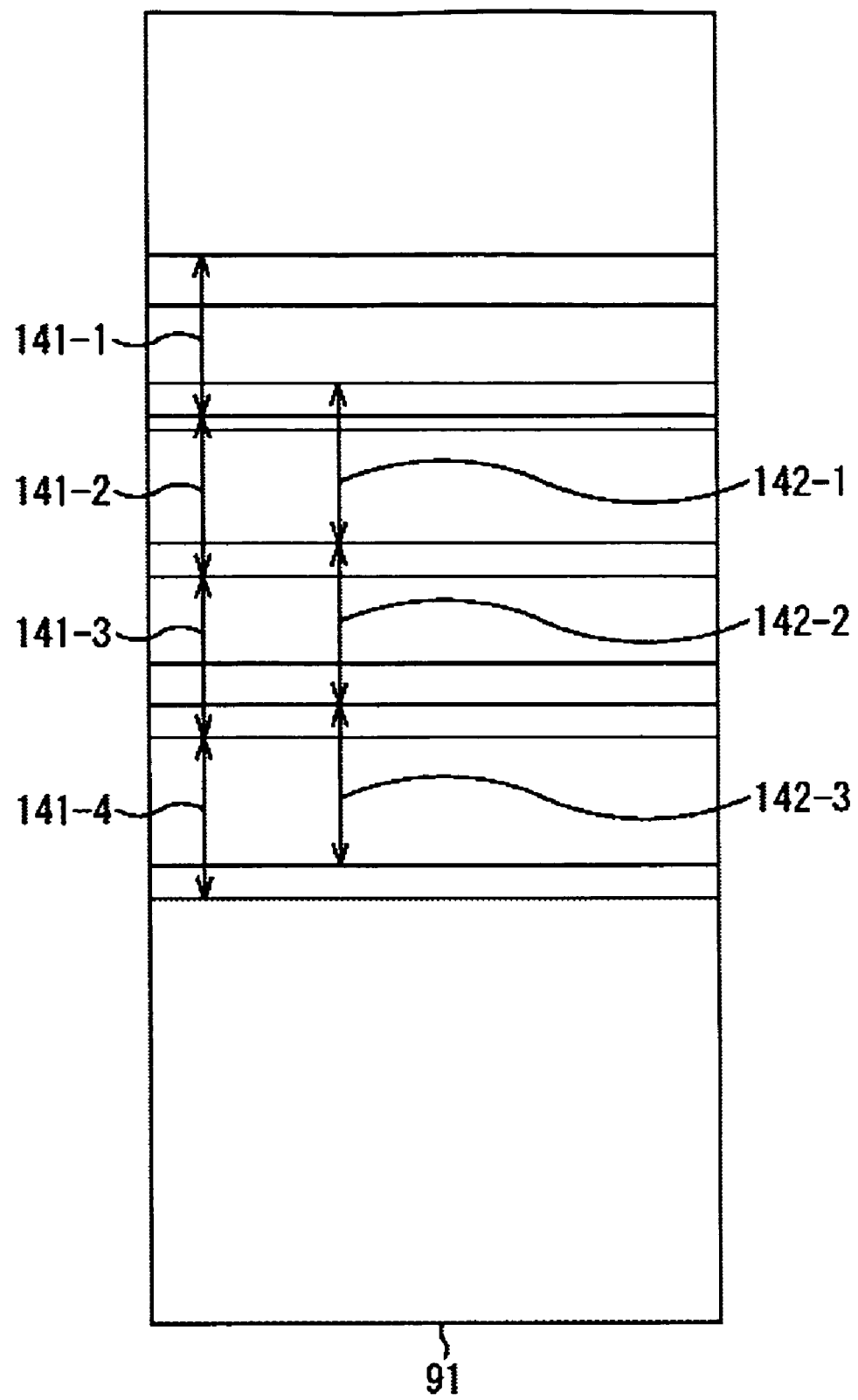
FIG. 11 illustrates linkage portions.

In step S37, the repeating cycle calculator 54 calculates the length of linkage portions (statistically representative value) as the repeating cycle. More specifically, the repeating cycle calculator 54 detects all possible combinations of the two edges having the mode value, and searches for linkage portions from the detected combinations. Then, the repeating cycle calculator 54 sets the average value (or median or mode value) of the linkage portions to be the repeating cycle of the edge appearance. The linkage portions are formed of a set of edge pairs which appear at the interval having the mode value so that the areas sandwiched by the corresponding two edges are continuously adjacent to each other. The length of the linkage portions is the repeating cycle of the above-described edge appearance. For example, if the intervals 121 through 127 shown in FIG. 10 are all combinations of two edges having the mode value, the repeating cycle calculator 54 calculates intervals 141-1 through 141-4 and intervals 142-1 through 142-3, as shown in FIG. 11, as linkage portions from among the detected combinations of edges. The intervals 141-1 through 141-4 correspond to the intervals 121, 123, 125, and 127, respectively, shown in FIG. 10, while the intervals 142-1 through 142-3 shown in FIG. 11 correspond to the intervals 122, 124, and 126, respectively, shown in FIG. 10. The repeating cycle calculator 54 supplies the calculated length of linkage portions to the output unit 55 as the repeating cycle. In the example shown in FIG. 11, the average value (median or mode value) of the intervals 141-1 through 141-4 or the average value (median or mode value) of the intervals 142-1 through 142-3 is supplied to the output unit 55 as the length of the linkage portions, i.e., as the repeating cycle. That is, the average, median, or mode value of the lengths of the intervals 141-1 through 141-4 or the intervals 142-1 through 142-3 is used as the length of the linkage portions.

In step S38, the output unit 55 outputs the repeating cycle data 21. More specifically, the output unit 55 outputs the repeating cycle calculated by the repeating cycle calculator 54 as the repeating cycle data 21. The process is then completed and returns to step S11 of FIG. 2. In this case, the repeating cycle data 21 includes at least repeating cycle data concerning the horizontal edges and repeating cycle data concerning the vertical edges.

Figure 7:
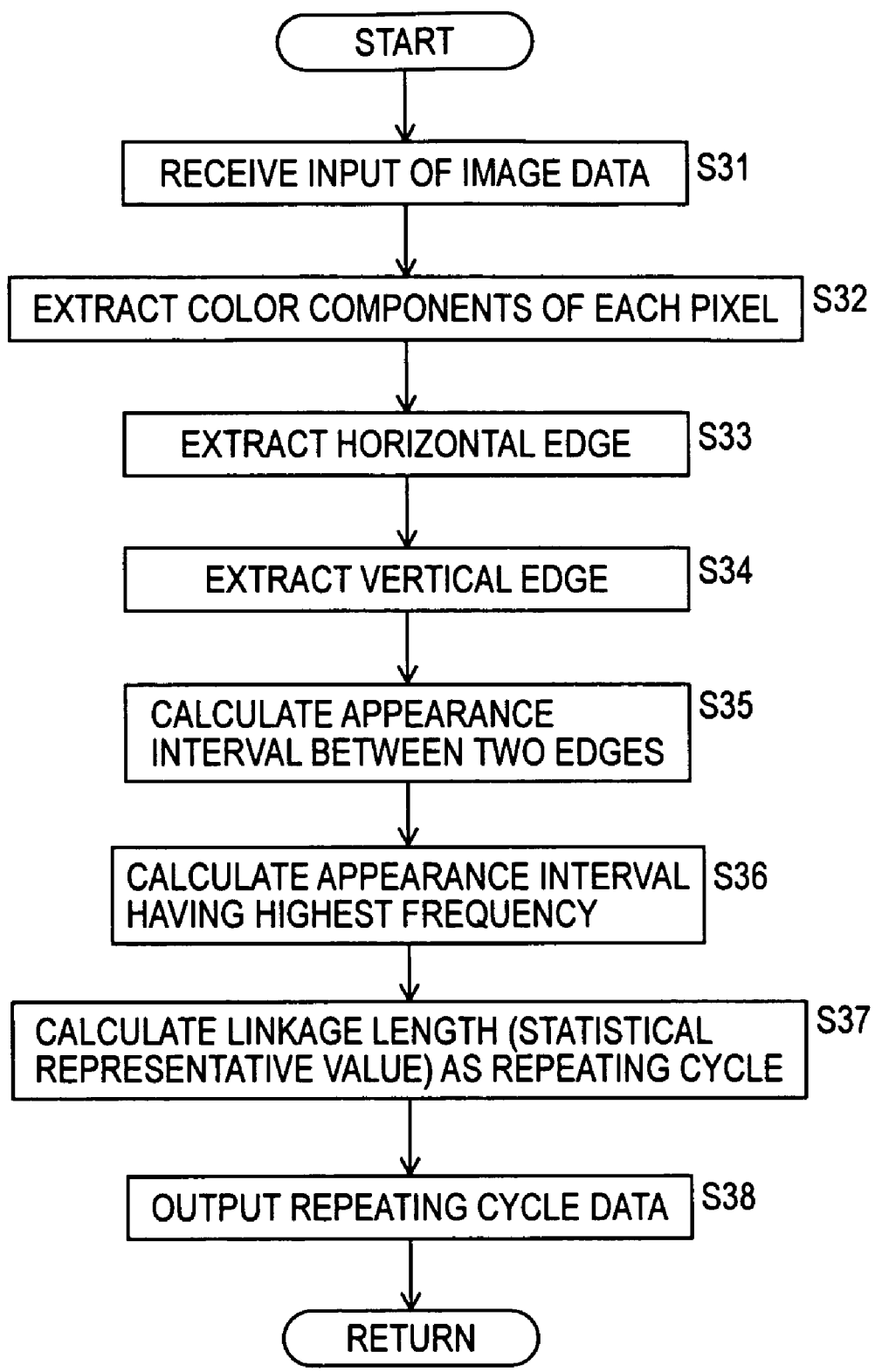
FIG. 7 is a flowchart illustrating details of repeating-cycle extracting processing in step S11 of FIG. 2.

According to the processing shown in FIG. 7, the repeating-cycle extracting device 11 extracts edges contained in an image from the image data containing repeating components, and calculates the edge intervals appearing most frequently (having the mode value) from the extracted edges to detect linkage portions, and also sets the average (or median or mode) value of the linkage portions to be the repeating cycle of the edge appearance. Thus, the repeating cycle of the edge appearance can be determined based on the repetition of the major edges (edges appearing most frequently) of the image. The positions of the repeating cycle can also be extracted, and the repeating components of the image can also be found.

If the image containing repeating components input into the image input unit 51 is processed by using the discrete cosine transform (DCT) method, the frequency components can be detected. According to the processing shown in FIG. 7, not only the repeating cycle of the repeating components, but also the positions of the repeating cycle can also be detected.

According to the repeating-cycle extracting device 11 discussed with reference to FIGS. 3 through 7, the edge extracting unit 52 extracts at least one of horizontal edges and vertical edges from an input image. Then, the edge appearance interval calculator 53 detects all possible combinations of a pair of edges in the same direction and calculates the edge interval appearing most frequently as the mode value. The repeating cycle calculator 54 then detects linkage portions of a set of edge pairs which appear at the interval having the mode value so that the areas sandwiched by the corresponding two edges are continuously adjacent to each other, and also sets the statistically representative value (average, median, or mode value) of the edge intervals of the set of edge pairs to be the repeating cycle of the edge appearance. With this configuration, the repeating components contained in an image can be extracted. The position of the repeating cycle can also be extracted.

The configuration of the block forming device 12 shown in FIG. 1 and the block forming processing are described below.

Figure 12:
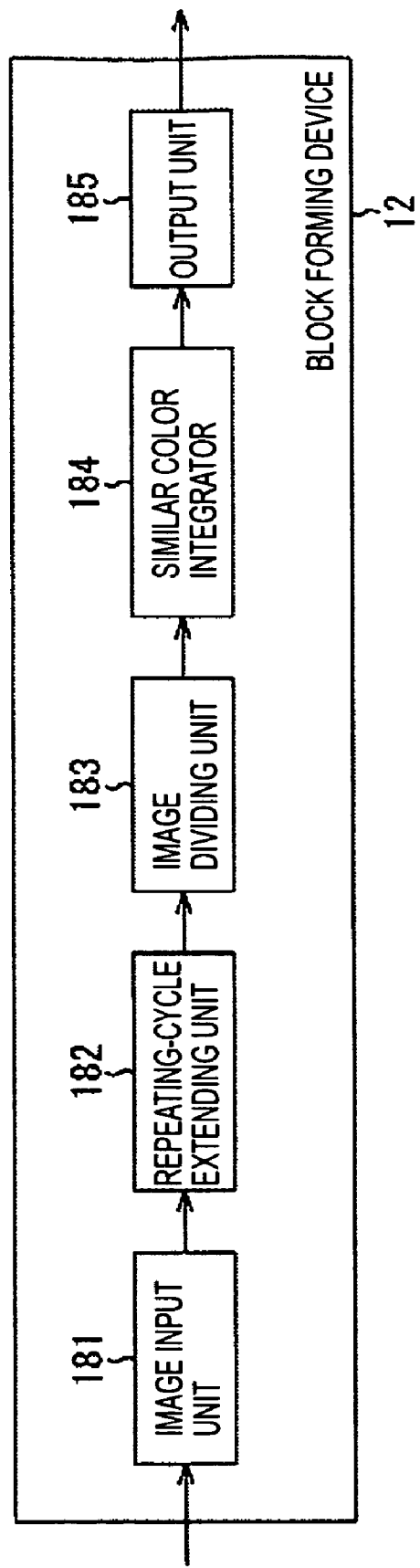
FIG. 12 is a block diagram illustrating an example of the functional configuration of a block forming device shown in FIG. 1.

FIG. 12 is a block diagram illustrating the functional configuration of the block forming device 12 shown in FIG. 1.

The block forming device 12 includes an image input unit 181, a repeating-cycle extending unit 182, an image dividing unit 183, a similar color integrator 184, and an output unit 185.

The image input unit 181 receives image data from the repeating-cycle extracting device 11, and supplies it to the repeating-cycle extending unit 182. In the example shown in FIG. 1, since the repeating cycle data 21 output from the repeating-cycle extracting device 11 is input, the image input unit 181 supplies the cycle of the repeating components of each of the horizontal edges and the vertical edges contained in the repeating cycle data 21 to the repeating-cycle extending unit 182.

The repeating-cycle extending unit 182 horizontally extends the length of the repeating components until the two outermost edges of the image based on the cycle of the repeating components of the horizontal edges, and also vertically extends the length of the repeating components until the two outermost edges of the image based on the cycle of the repeating components of the vertical edges. That is, the repeating-cycle extending unit 182 extends the lengths of the repeating components to the two outermost edges of the image in the horizontal and vertical directions based on the cycles (lengths) of the repeating components of the horizontal and vertical edges. Accordingly, an auxiliary line having the same length as the cycle of the repeating components is added.

The image dividing unit 183 divides the image into a plurality of blocks by using the edges of the image contained in the repeating cycle data 21 (i.e., extracted by the repeating-cycle extracting device 11) and the auxiliary lines added by the repeating-cycle extending unit 182. The image dividing unit 183 sets a representative color of each block and fills the entire block by the representative color.

If, among the divided blocks, there are adjacent blocks having similar colors, the similar color integrator 184 integrates such blocks and substitutes the similar colors of the blocks by the representative color. That is, the similar color integrator 184 integrates similar colors. More specifically, the similar color integrator 184 scans all the divided blocks to compare the colors of adjacent blocks, and if the colors of adjacent blocks are similar, the similar color integrator 184 integrates the adjacent blocks and substitutes the colors of the adjacent blocks by the representative color.

The output unit 185 outputs the image blocks integrated by the similar color integrator 184.

Figure 13:
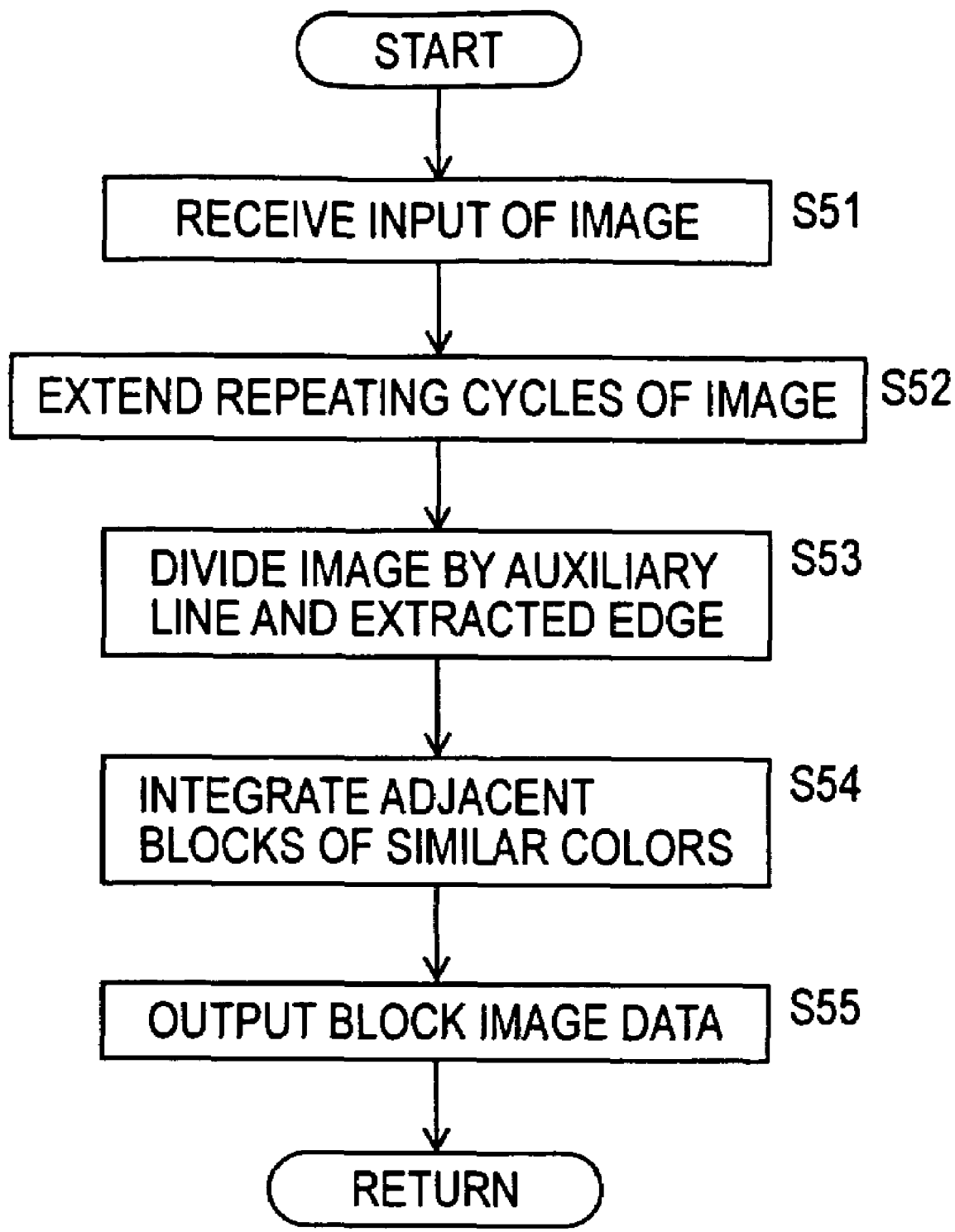
FIG. 13 is a flowchart illustrating details of block forming processing in step S12 of FIG. 2.

A description is now given of the block forming processing in step S12 of FIG. 2 with reference to the flowchart of FIG. 13. This processing is performed by the block forming device 12 shown in FIG. 12.

In step S51, the image input unit 181 receives the input of an image, and more specifically, the input of the repeating cycle data 21 output from the repeating-cycle extracting device 11 and extracted by the processing of step S11 of FIG. 2. The image input unit 181 then supplies the repeating components of the horizontal edges and the repeating components of the vertical edges contained in the repeating cycle data 21 to the repeating-cycle extending unit 182.

In step S52, the repeating-cycle extending unit 152 extends the repeating cycles of the image. More specifically, the repeating-cycle extending unit 152 extends the interval (length) of the repeating components to the two outermost edges of the image in the horizontal direction based on the cycle of the repeating components of the horizontal edges, and also extends the interval (length) of the repeating components to the two outermost edges of the image in the vertical direction based on the cycle of the repeating components of the vertical edges. Details of the horizontal edges are discussed below with reference to FIGS. 14 and 15. The intervals 141-1 through 141-4 have the same length, and the intervals 142-1 through 142-3 have the same length.

Figure 14:
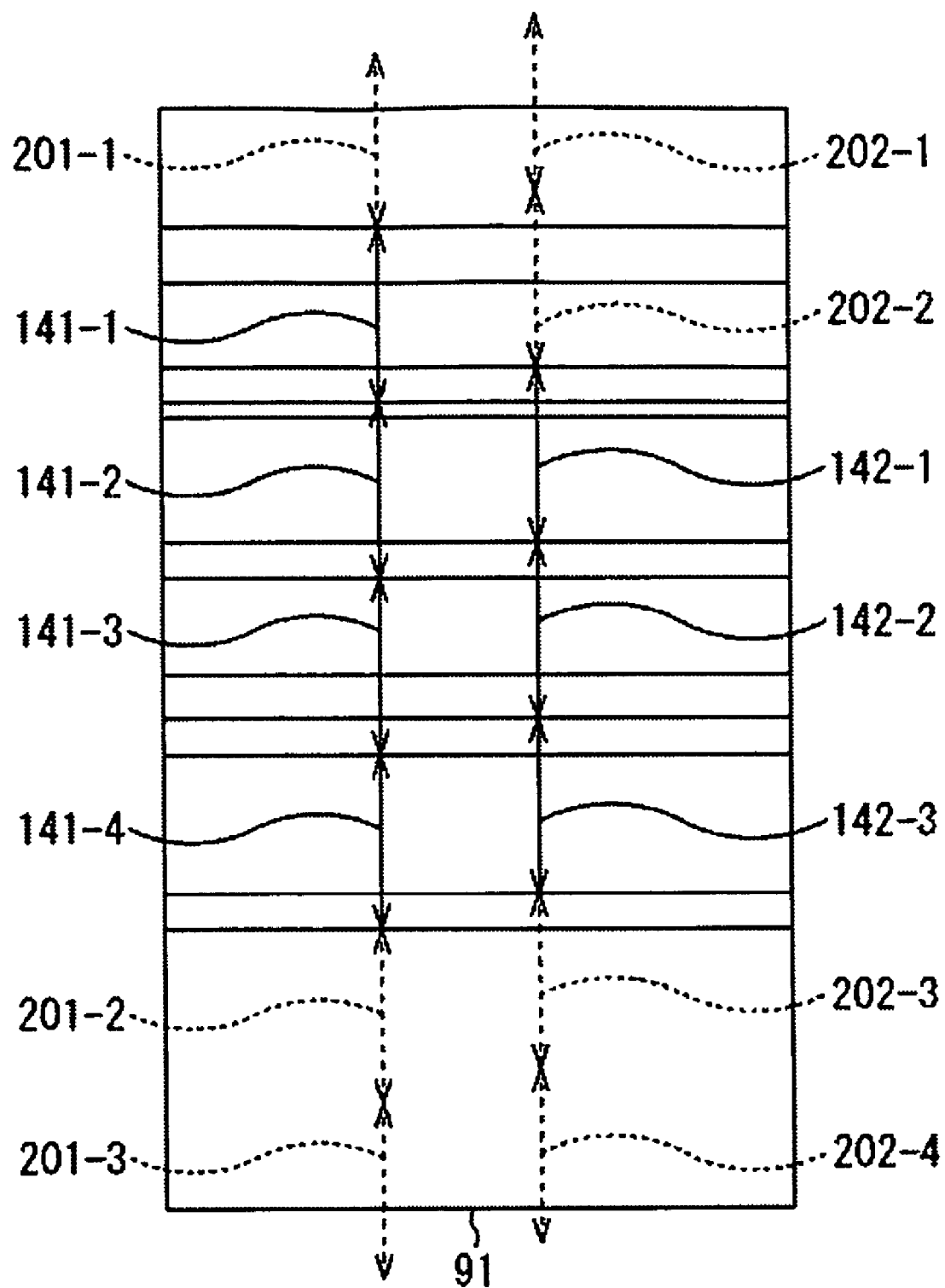
FIG. 14 illustrates extensions of repeating cycles.
Figure 15:
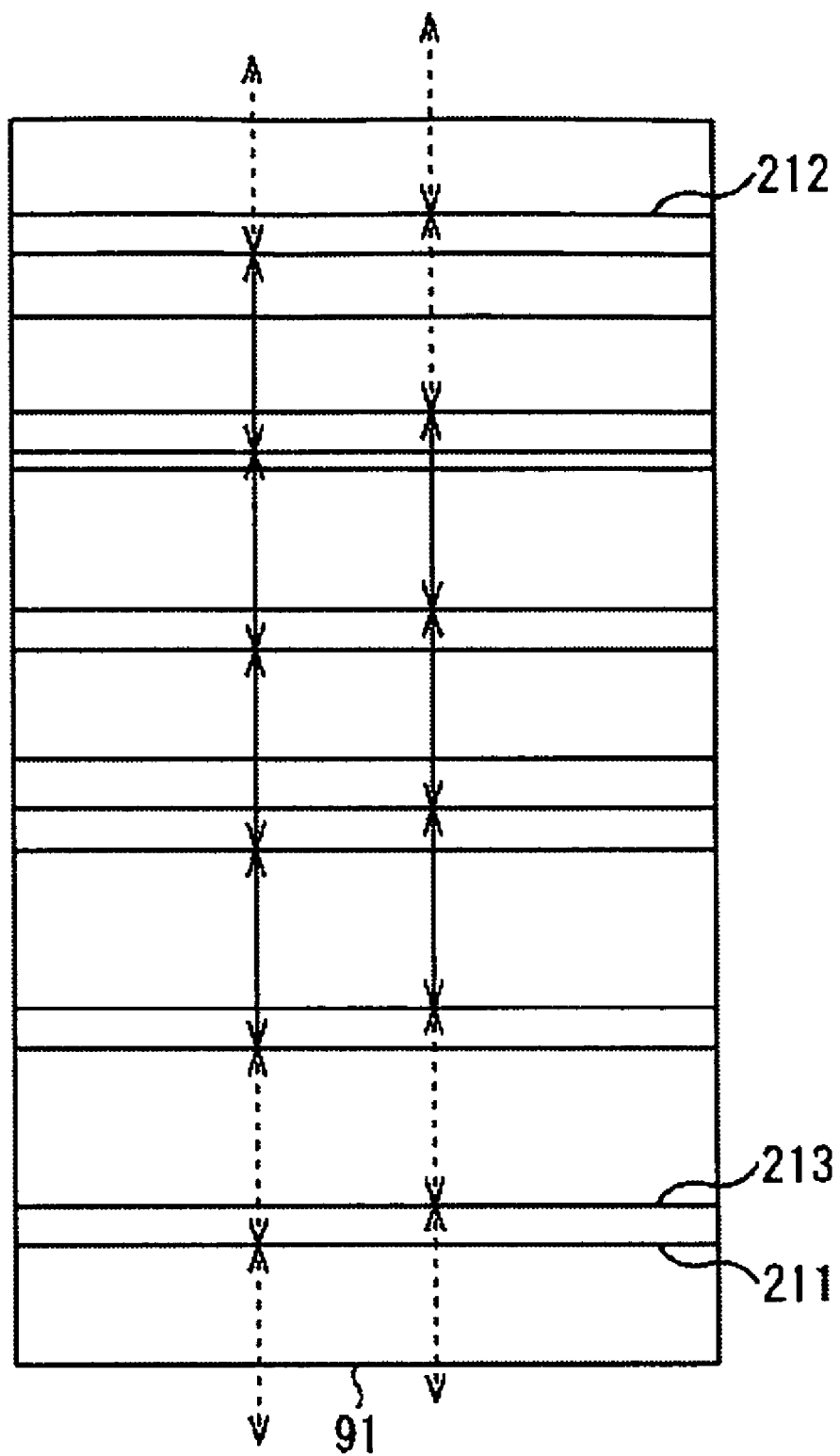
FIG. 15 illustrates auxiliary lines to be added.

For example, if the image based on the repeating cycle data 21 received in step S51 is the image 91 shown in FIG. 11, as shown in FIG. 14, intervals 201-1 through 201-3 having the same length as the mode value (median or average value) of the intervals 141-1 through 141-4 are extended to the two outermost edges of the image 91. Also, as shown in FIG. 14, intervals 202-1 through 202-4 having the same length as the mode value (median or average value) of the intervals 142-1 through 142-3 are extended to the two outermost edges of the image 91. As shown in FIG. 15, a new auxiliary line added as a result of adding the intervals 201-1 through 201-3 is indicated by 211, and new auxiliary lines added as a result of adding intervals 202-1 through 202-4 are indicated by 212 and 213. That is, the auxiliary lines 211 through 213 are new additional edges. In other words, new edges (auxiliary lines) are added at positions where no edges of the original image are extracted. Accordingly, auxiliary lines having the same length as the cycle of the repeating components are added. The same applies to the vertical edges.

In step S53, the image dividing unit 183 divides the image by the auxiliary lines and extracted edges. More specifically, the image dividing unit 183 divides the image into blocks by using the edges of the image contained in the repeating cycle data 21 and the auxiliary lines added by the repeating-cycle extending unit 182. For example, the image dividing unit 183 divides the image into blocks by using the edges 92-1 through 92-12 shown in FIG. 8 contained in the repeating cycle data 21 and the auxiliary lines 211 through 213 shown in FIG. 15. The image dividing unit 183 sets the representative color of each block, and fills the entire block with this representative color. As the representative color, the mode color, median color, or average color is used.

Figure 16:
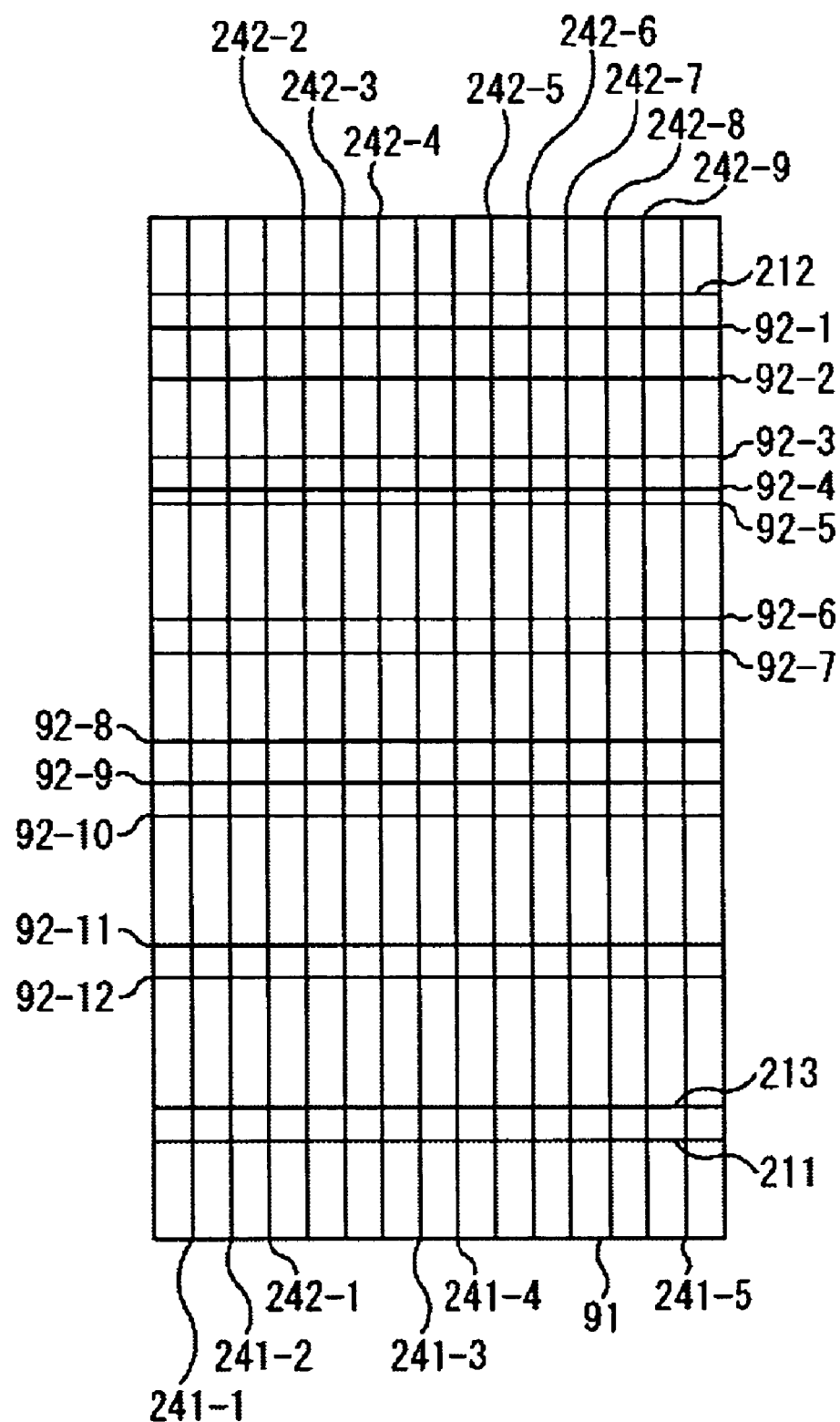
FIG. 16 illustrates a divided image.

FIG. 16 illustrates the image 91 divided by the image dividing unit 183. The image 91 is divided by using the horizontal edges 92-1 through 92-12 and the auxiliary lines 211 through 213 and also by using vertical edges 241-1 through 241-5 (vertical edges extracted by the processing of step S11 in FIG. 2) and auxiliary lines 242-1 through 242-9 (vertical auxiliary lines added by the processing of step S52). Accordingly, the image dividing unit 183 divides the image 91, as shown in FIG. 16, by using the auxiliary lines 211 through 213 and 242-1 through 242-9 and the extracted edges 92-1 through 92-12 and 241-1 through 241-5.

In step S54, the similar color integrator 184 integrates adjacent blocks of similar colors. More specifically, among the blocks divided by the processing of step S53, the similar color integrator 184 integrates adjacent blocks having similar colors and substitutes the colors of the adjacent blocks by the representative color. The similar color integrator 184 scans all the blocks of the block images and compares the colors of adjacent blocks, and if the colors of the adjacent blocks are similar, the similar color integrator 184 integrates the adjacent blocks and substitutes the colors of the adjacent blocks by the representative color. The representative color is, for example, the mode color, the median color, and the average color. That is, the representative color is the statistically representative color.

In step S55, the output unit 185 outputs the block image data 22. More specifically, the output unit 185 scans the image blocks from the top in the horizontal direction, and outputs the "block size (column, row) and color (R, G, B)" of each block. Then, the output unit 185 outputs the "start position, the block size (column, row) and color (R, G, B)" of the adjacent block. After finishing one row, the output unit 185 starts scanning toward downward.

According to the processing of FIG. 13, the image can be divided into blocks by considering the features of the image. In particular, by performing the processing shown in FIG. 13 on the image containing repeating components, the image can be divided into blocks by more precisely reflecting the features of the image. Additionally, the image can be divided into blocks having desired sizes.

More specifically, if the image is divided into blocks having a fixed size, the features of the image are not reflected. On the other hand, if the image is divided into blocks having desired sizes, the features of the image (features of the repeating cycle of the image) can be reflected. By dividing the image according to the features, the image data can be stored by decreasing the amount of image data.

The image data input into the block forming device 12 shown in FIG. 12 does not have to contain the output data from the repeating-cycle extracting device 11 shown in FIG. 3. For example, even if low-resolution mosaic image data is input into the block forming device 12, the image can be divided into blocks by considering the features of the image. Details of low-resolution mosaic image data are given below with reference to FIGS. 57 through 72.

According to the block forming device 12 discussed with reference to FIGS. 13 through 16, the image dividing unit 183 divides an image containing a plurality of edges repeatedly appearing at regular intervals in the same direction (horizontal or vertical direction), into small areas, i.e., a plurality of first blocks, by using the repeating cycle of the edge appearance, and the statistically representative color is set in each first block. Then, the similar color integrator 184 integrates, among the first blocks, adjacent blocks whose color differences are within a predetermined range into a new second block. The similar color integrator 184 then substitutes the colors of the second block by the statistically representative color of the first block. Accordingly, the similar color integrator 184 integrates the plurality of first blocks into the second block. Thus, the image can be divided into blocks having desired sizes based on the repeating components of the image.

The configuration of the consecutive-area extracting device 13 shown in FIG. 1 and the consecutive-area extracting processing are described below.

Figure 17:
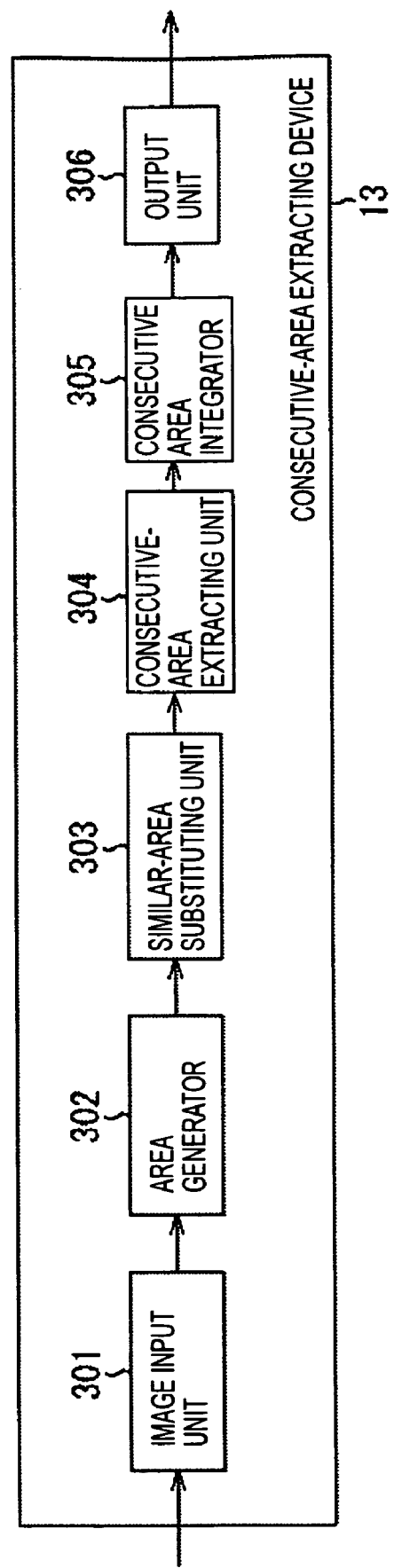
FIG. 17 is a block diagram illustrating an example of the functional configuration of a consecutive-area extracting device shown in FIG. 1.

FIG. 17 is a block diagram illustrating the functional configuration of the consecutive-area extracting device 13 shown in FIG. 1.

The consecutive-area extracting device 13 includes an image input unit 301, an area generator 302, a similar-area substituting unit 303, a consecutive-area extracting unit 304, a consecutive area integrator 305, and an output unit 306.

The image input unit 301 receives data from the block forming device 12, and supplies it to the area generator 302. In the example shown in FIG. 1, since the block image data 22 output from the block forming device 12 is input into the consecutive-area extracting device 13, the image input unit 301 reads the block image data 22 and expands information concerning the block image (i.e., the start positions, the block sizes (row, column), and the colors (R, G, and B). The image input unit 301 then supplies the expanded block image information to the area generator 302.

Figure 20:
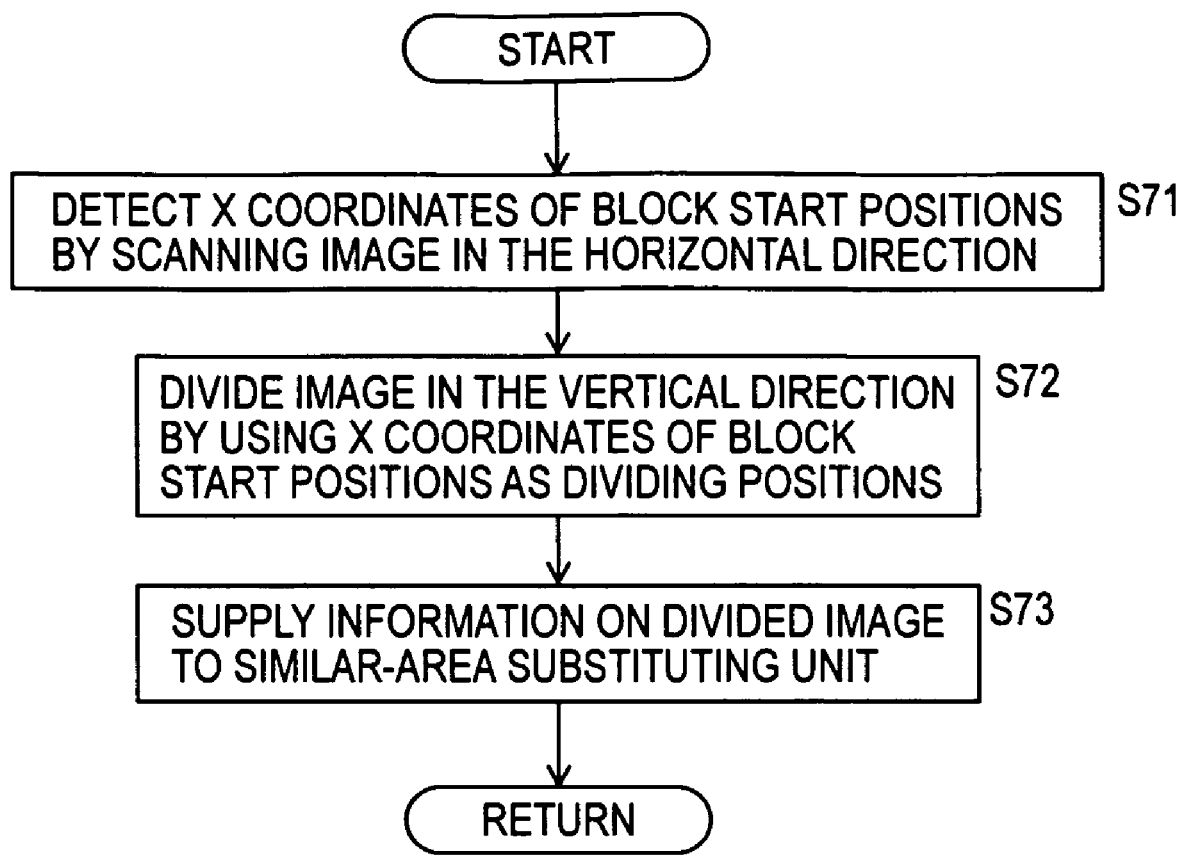
FIG. 20 is a flowchart illustrating details of processing for dividing the image in the vertical direction by performing horizontal scanning in step S62 of FIG. 18.

The area generator 302 scans the image blocks and divides the image into a plurality of areas in the horizontal and vertical direction. In other words, the area generator 302 generates a plurality of areas in the image. More specifically, the area generator 302 detects boundaries of the block image in the horizontal and vertical directions, and divides the image by the detected boundaries. For example, the area generator 302 horizontally scans the block image from the right or left edge to detect the vertical start positions (vertical boundaries) of the individual blocks, and divides the image in the vertical direction by using the x coordinates of the detected start positions as the dividing position, which is discussed in detail below with reference to FIG. 20. The area generator 302 also vertically scans the block image from the top or the bottom to detect the horizontal start positions (horizontal boundaries) of the individual blocks, and divides the image in the horizontal direction by using the y coordinates of the detected start positions as the dividing positions. If the blocks are not divided at the dividing positions, the area generator 302 divides the image at new horizontal or vertical dividing positions. The area generator 302 supplies information concerning the generated areas to the similar-area substituting unit 303.

The similar-area substituting unit 303 compares the color distributions of all the areas based on the information supplied from the area generator 302 and substitutes areas having similar color distributions by a representative color distribution. The comparison of the color distributions can be conducted by, for example, dynamic programming matching (DP matching), which is an algorithm for comparing different elements with minimum calculations. The similar-area substituting unit 303 stores the color information as well as the length information of the areas in an array, and checks the similarity of the array. Upon comparing the color distributions, the similar-area substituting unit 303 substitutes areas having similar color distribution patterns (whose difference of the color distributions is smaller than a predetermined threshold) by the representative color distribution (area), which is discussed in detail below with reference to FIG. 25. Then, the similar-area substituting unit 303 scans all the blocks in the horizontal and vertical directions, and integrates adjacent small blocks (blocks divided by the boundaries of the block image and the boundaries used when dividing the image into a plurality of areas are hereinafter referred to as "small blocks") having similar colors. The similar-area substituting unit 303 supplies information concerning the resulting image (i.e., information concerning the image obtained by substituting similar areas by the representative area and by integrating adjacent small blocks having similar colors) to the consecutive-area extracting unit 304.

The consecutive-area extracting unit 304 extracts adjacent areas having the same color as consecutive areas based on the image information received from the similar-area substituting unit 303. More specifically, the consecutive-area extracting unit 304 extracts areas having a certain or greater length (or width) in the horizontal or vertical direction from the image.

The consecutive area integrator 305 integrates the consecutive areas extracted by the consecutive-area extracting unit 304 and supplies the resulting image to the output unit 306.

The output unit 306 outputs data concerning the block image having the integrated consecutive areas (data including the consecutive area data 23). The output unit 306 also outputs information concerning the consecutive areas extracted by the consecutive-area extracting unit 304 as the consecutive area data 23. That is, at least the consecutive area data 23 is output from the consecutive-area extracting device 13.

Figure 18:
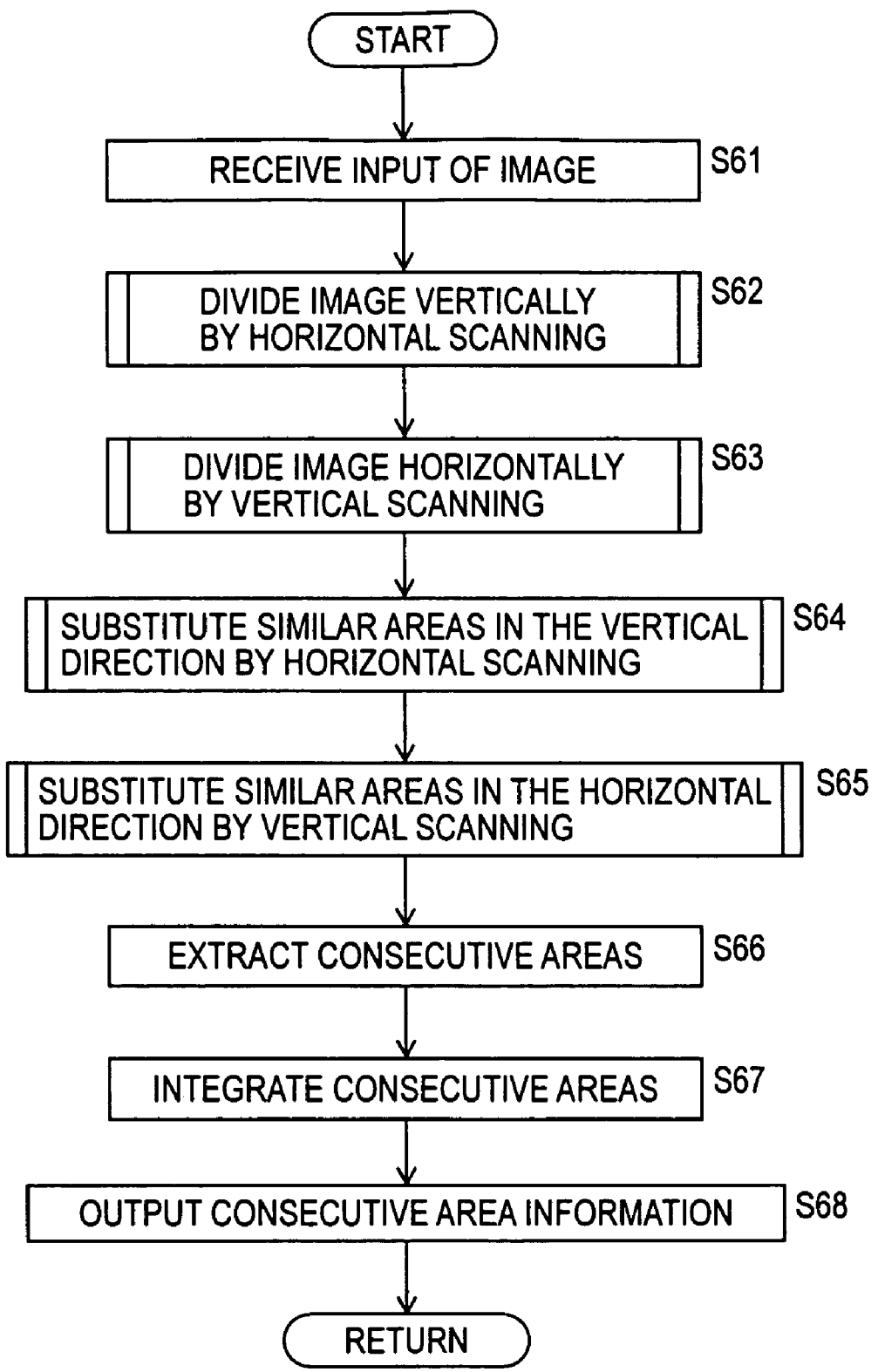
FIG. 18 is a flowchart illustrating details of consecutive-area extracting processing in step S13 of FIG. 2.

A description is now given, with reference to the flowchart of FIG. 18, of details of the consecutive-area extracting processing in step S13 of FIG. 2. This processing is executed by the consecutive-area extracting device 13 shown in FIG. 17.

In step S61, the image input unit 301 receives the input of an image. More specifically, the image input unit 301 receives the input of the block image data 22 from the block forming device 12, and expands the block image information (i.e., the start positions, the block sizes (row, column), and colors (R, G, B)). The image input unit 301 supplies the expanded block image information to the area generator 302. The image input unit 301 receives data of, for example, an image 331 shown in FIG. 19, as the block image data 22, and expands the block image information. The image 331 has been divided into a plurality of blocks by the processing of the block forming device 12.

In step S62, the area generator 302 vertically divides the image 331 into a plurality of areas by performing horizontal scanning. Details of this processing are given below with reference to the flowchart of FIG. 20.

Figure 19:
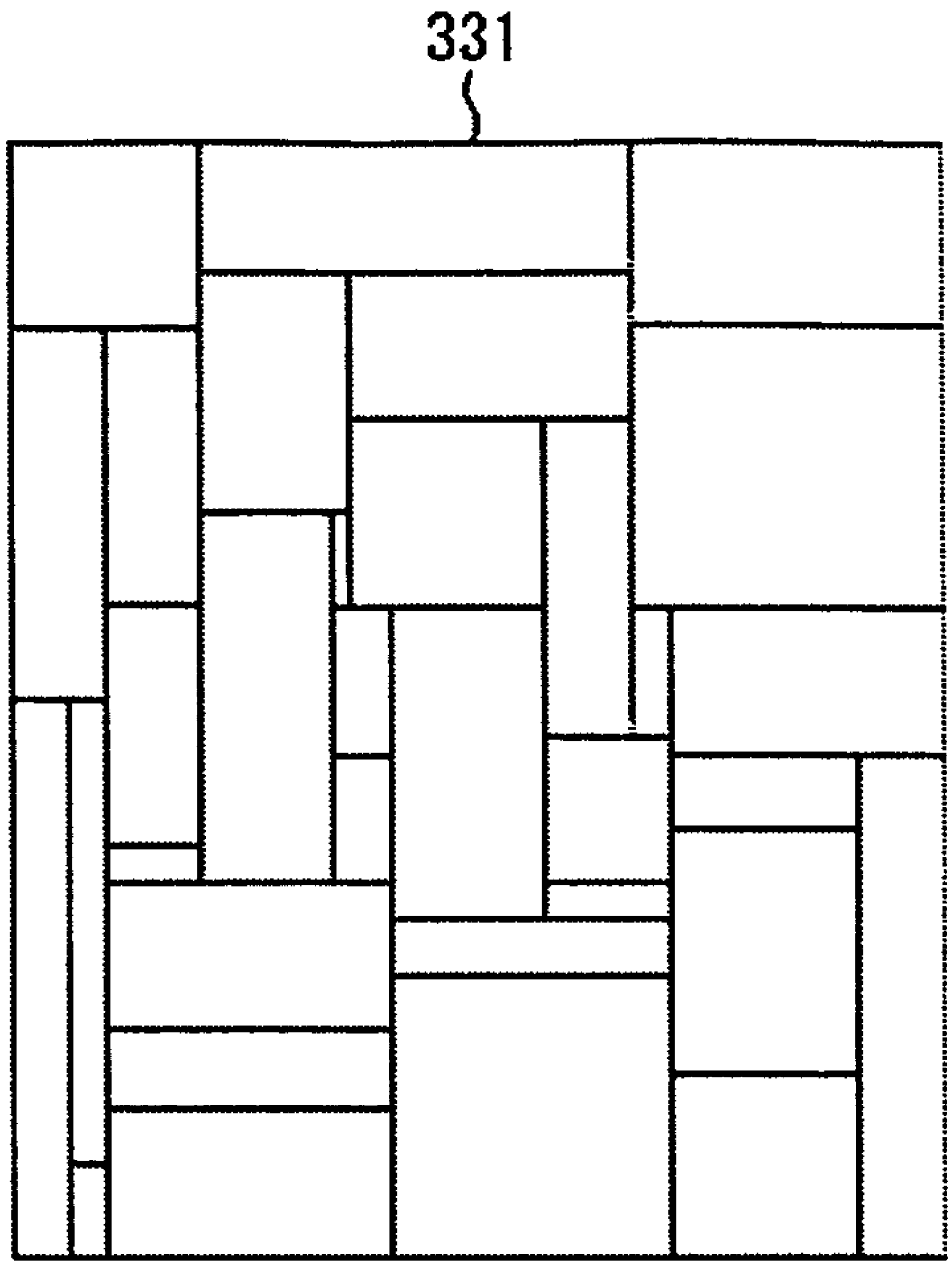
FIG. 19 illustrates an example of a block image received by an image input unit shown in FIG. 17.
Figure 21:
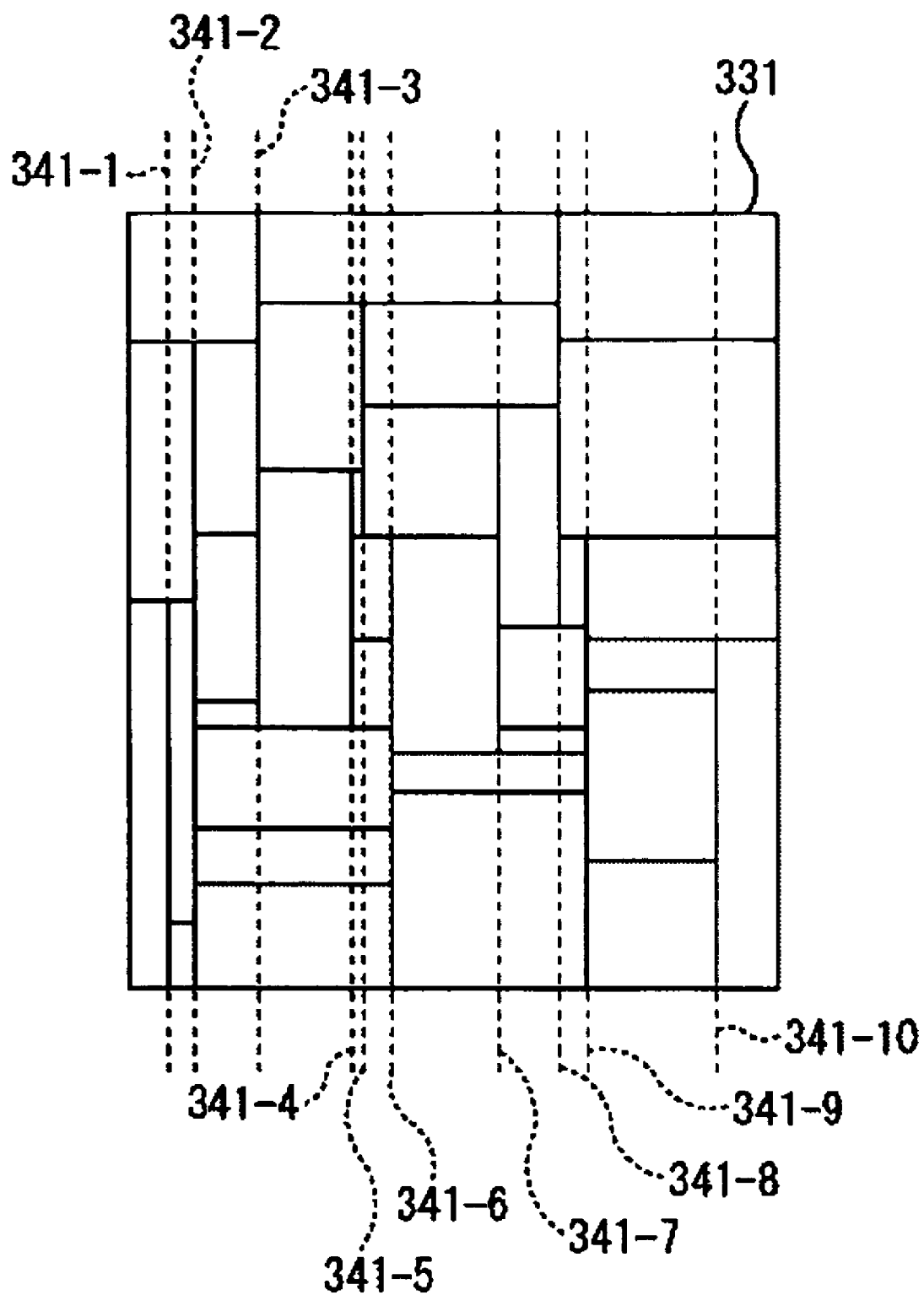
FIG. 21 illustrates dividing positions of an image in the vertical direction.

In step S71, by scanning the image 331 shown in FIG. 19 from the right or left edge in the horizontal direction, the area generator 302 detects, as shown in FIG. 21, x coordinates (boundaries of the block image) 341-1 through 341-10 of the start positions of the vertical blocks.

Figure 22:
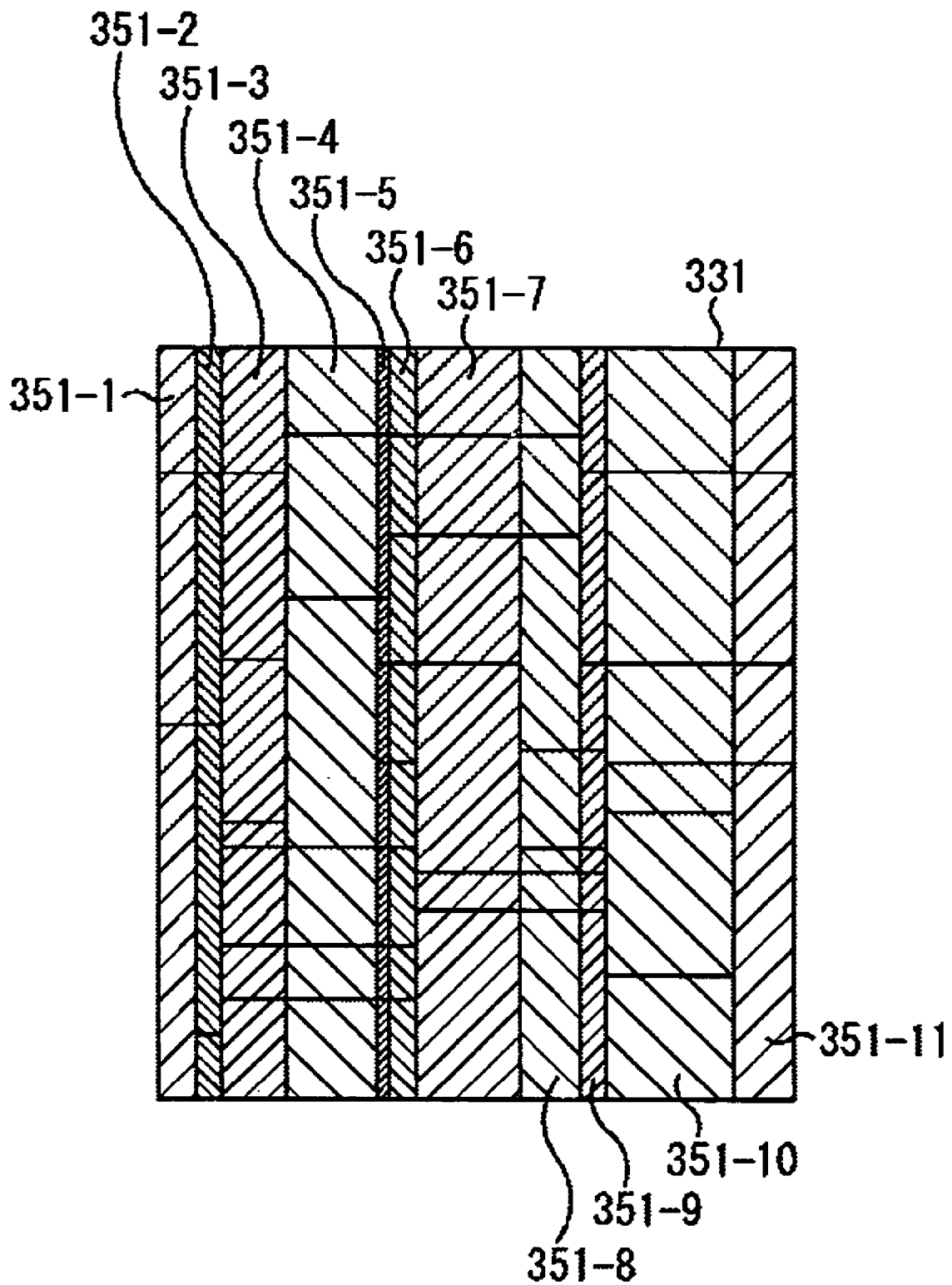
FIG. 22 illustrates an image divided vertically.

In step S72, the area generator 302 divides the image in the vertical direction by using the x coordinates of the block start positions detected in step S71 as the dividing positions. In the example shown in FIG. 21, the area generator 302 divides the image in the vertical direction by using the x coordinates 341-1 through 341-10 as the dividing positions. Then, the image is divided in the vertical direction, as shown in FIG. 22, into areas 351-1 through 351-11. The area 351-1 includes an area from the left edge of the image 331 to the dividing position 341-1. The area 351-2 includes an area from the dividing position 341-1 to the dividing position 341-2. Similarly, the area 351-11 includes an area from the dividing position 341-10 to the right edge of the image 331. If the blocks are not divided at the dividing positions, the area generator 302 divides the image at new vertical dividing positions. The blocks divided by the boundaries (dividing positions) 341-1 through 341-10 of the areas 351-1 through 351-11 shown in FIG. 22 and by the blocks of the block image 331 are small blocks.

In step S73, the area generator 302 supplies the information concerning the divided image to the similar-area substituting unit 303, and the process returns to step S62 of FIG. 18.

By the processing in step S62, the image is vertically divided into small blocks at desired dividing positions. That is, in step S62, the image 331 is scanned in the horizontal direction, and then, the image 331 is vertically divided at the x coordinates of the start positions (boundaries) of the individual blocks divided in the image 331.

In step S63 of FIG. 18, the area generator 302 further divides the image 331 divided into a plurality of blocks shown in FIG. 19 into a plurality of areas in the horizontal direction by performing vertical scanning. Details of this processing are similar to those of the processing shown in FIG. 20. In this case, however, in step S71, the image is scanned in the vertical direction, and in step S72, the image is divided in the horizontal direction by using the y coordinates of the block start positions as the dividing position. By this processing, as in the areas 351-1 through 351-11 shown in FIG. 22, horizontal blocks are generated. That is, in step S63, the image 331 is scanned in the vertical direction, and is then divided in the horizontal direction by using the y coordinates of the start positions (boundaries) of the individual blocks divided in the image 331 as the dividing positions.

In step S64, the similar-area substituting unit 303 substitutes areas having similar color distributions in the vertical direction by performing horizontal scanning. Details of this processing are given below with reference to the flowchart of FIG. 23.

Figure 23:
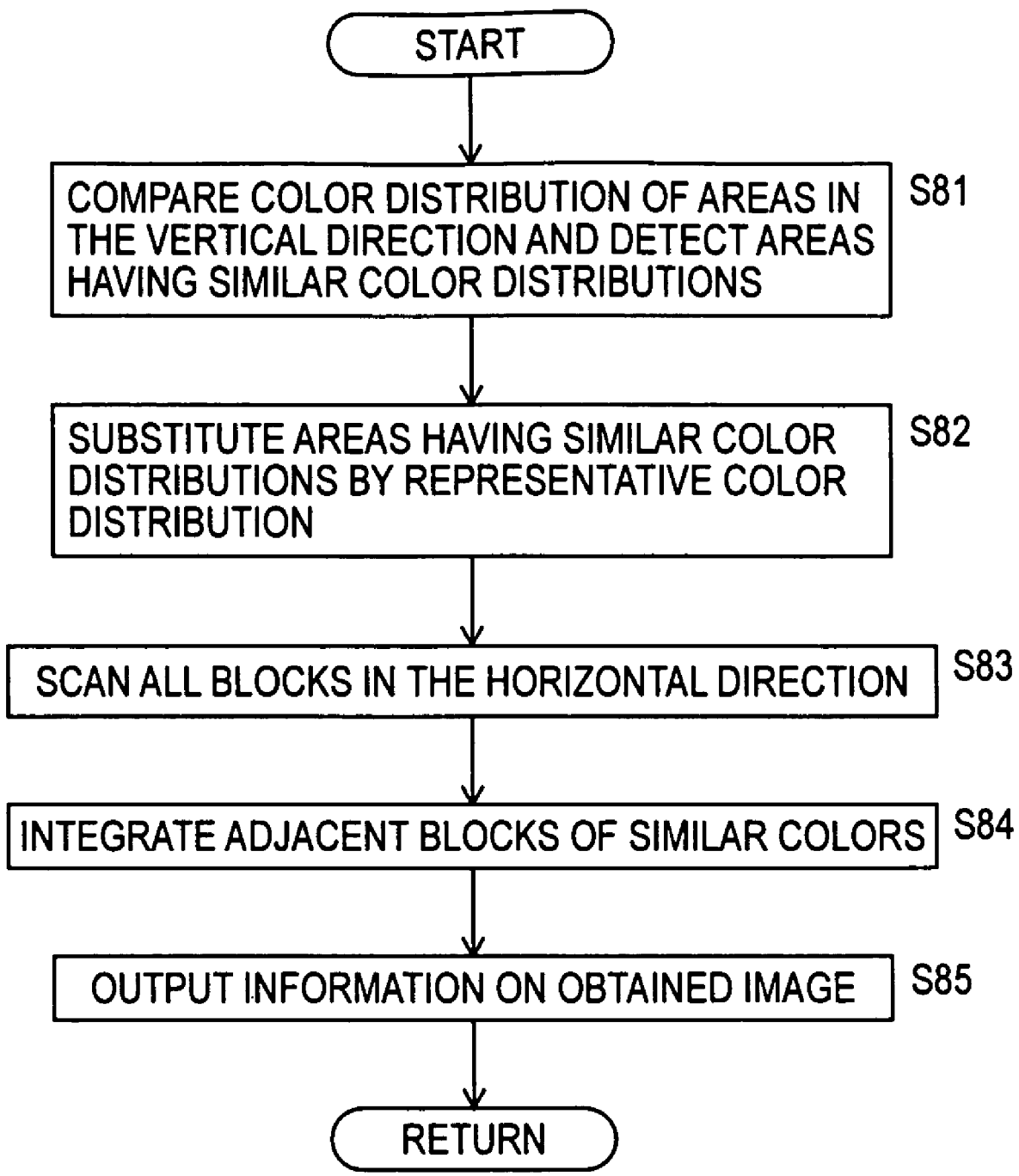
FIG. 23 is a flowchart illustrating details of processing for substituting similar areas in the vertical direction by performing horizontal scanning in step S64 of FIG. 18.
Figure 24:
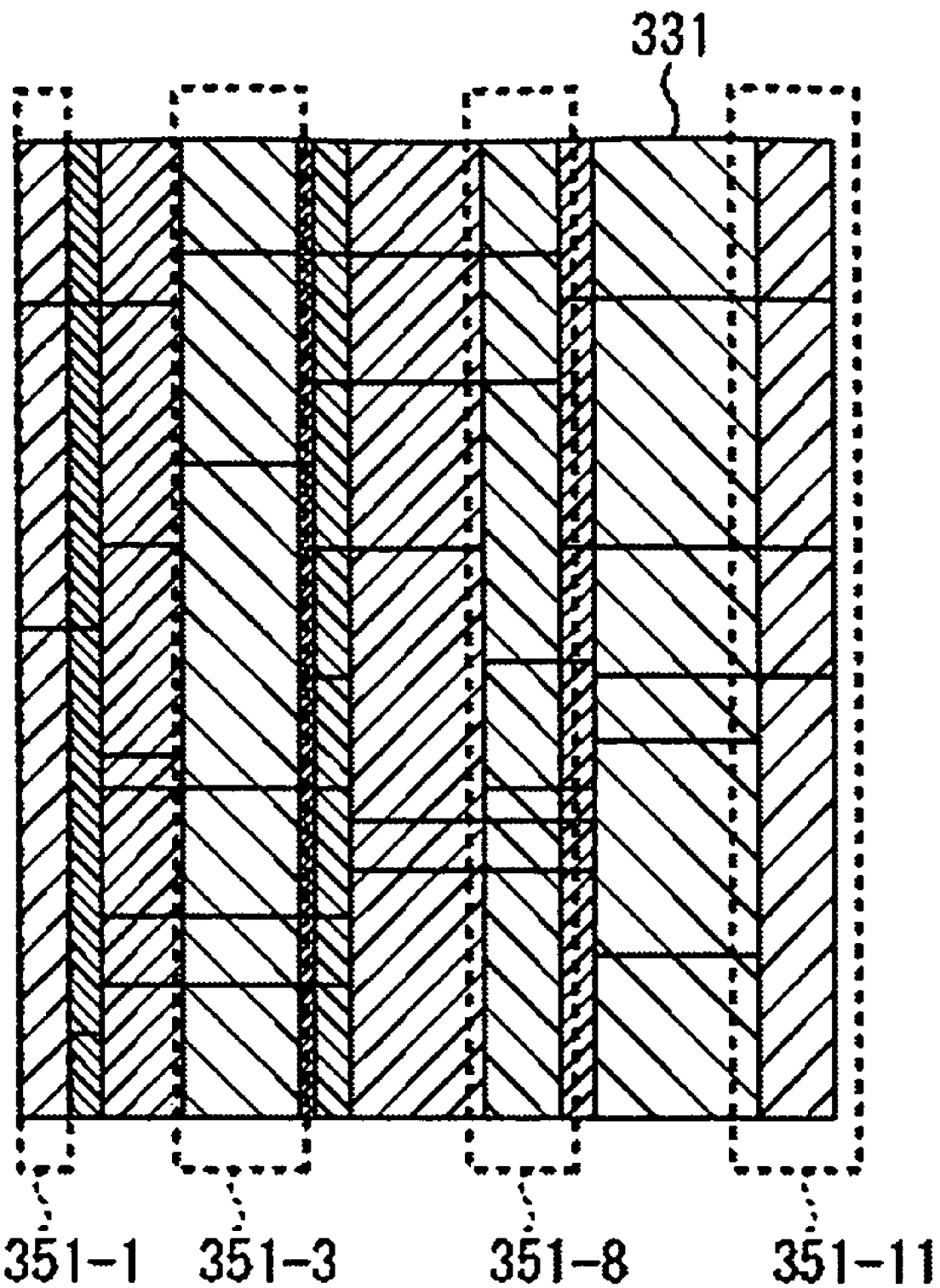
FIG. 24 illustrates the detection of areas having similar color distributions.

In step S81 of FIG. 23, the similar-area substituting unit 303 compares the color distributions of the areas of the image 331 in the vertical direction shown in FIG. 22 by performing horizontal scanning so as to detect areas having similar color distributions. For example, the similar-area substituting unit 303 searches for areas having similar arrays in the vertical direction by DP matching. For example, the similar-area substituting unit 303 detects, as shown in FIG. 24, areas having similar color distributions in the vertical direction as areas 351-1, 351-3, 351-8, and 351-11.

Figure 25:
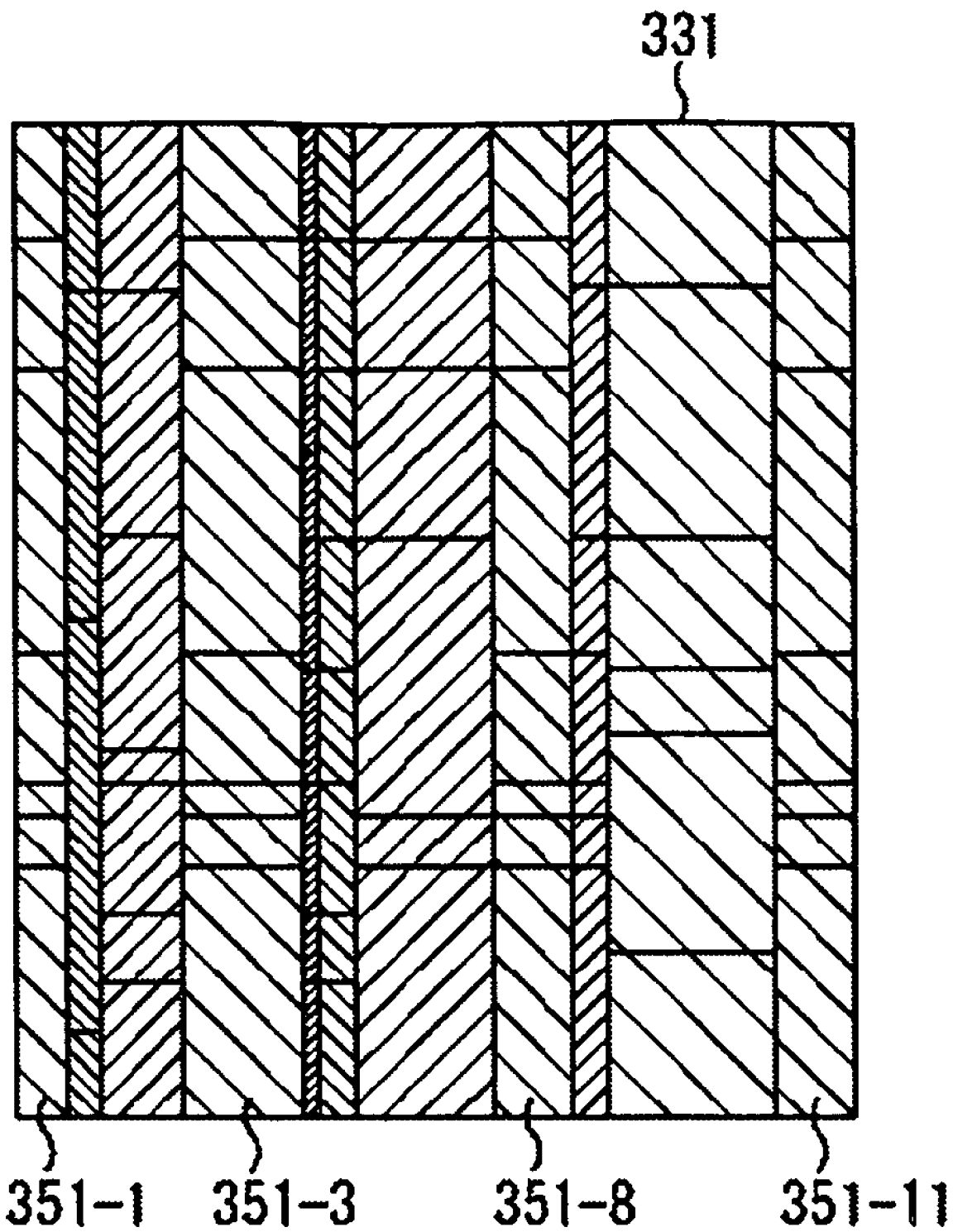
FIG. 25 illustrates areas substituted by a representative color distribution.

In step S82, the similar-area substituting unit 303 substitutes the areas having similar color distributions by a representative color distribution. More specifically, the similar-area substituting unit 303 determines a representative color in each area of the similar areas detected in step S81, and substitutes the color distribution containing the highest proportion of the representative color for the color distributions of the other areas. For example, if the area 351-8 in FIG. 24 is the representative color distribution, the similar-area substituting unit 303 substitutes, as shown in FIG. 25, the color distributions of the other areas 351-1, 351-3, and 351-11 by the color distribution of the area 351-8. That is, a plurality of similar areas are substituted by the representative area. Accordingly, the color distributions of the areas 351-1, 351-3, and 351-11 become the same color distribution of the areas 351-8.

Details of the processing in step S82 are given below with reference to FIGS. 26A through 27C.

Figure 26A:
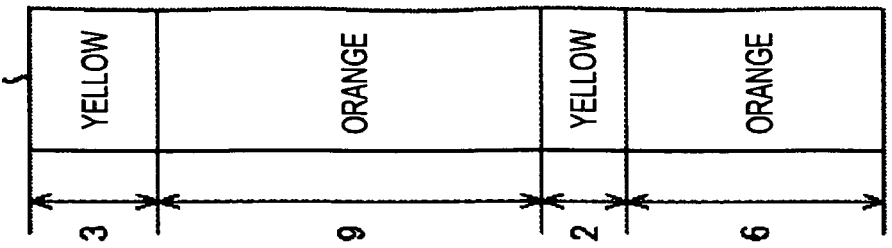
FIGS. 26A, 26B, and 26C illustrate the representative color.
Figure 26B:
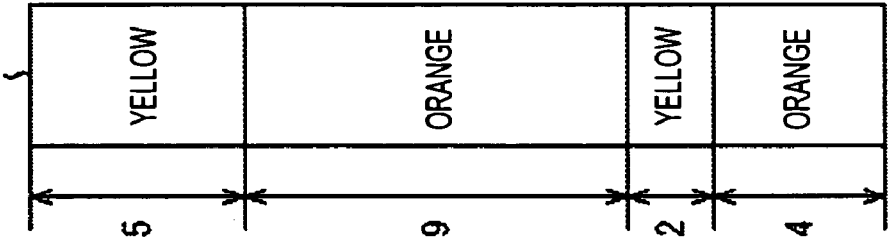
Figure 26C:
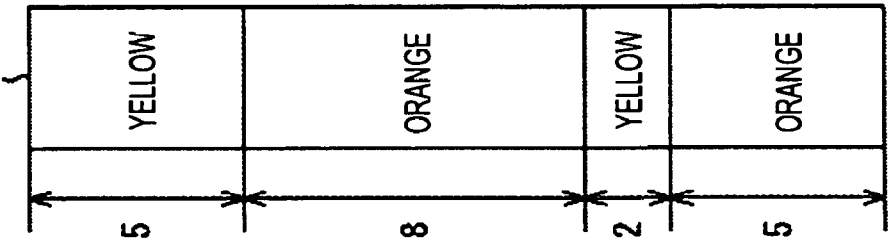

FIGS. 26A, 26B, and 26C illustrate example of vertical areas 361-1, 361-2, and 361-3, respectively. The areas 361-1, 361-2, and 361-3 are detected as similar areas by DP matching in step S81. In FIGS. 26A through 27C, the entire units (entire proportion) of each of the areas 361-1, 361-2, and 361-3 are defined as 20. More specifically, the size of the unit is equal for all the areas 361-1, 361-2, and 361-3, and the number of units represents the proportion of the color in the area.

In the area 361-1, from the top, five units are yellow, eight units are orange, two units are yellow, and five units are orange. In the area 361-2, from the top, five units are yellow, nine units are orange, two units are yellow, and four units are orange. In the area 361-3, from the top, three units are yellow, nine units are orange, two units are yellow, and six units are orange.

In this case, in the area 361-1, the entire units of yellow are 7(=5+2) (i.e., 7/20), and the entire units of orange are 13(=8+5) (i.e., 13/20). In the area 361-2, the entire units of yellow are 7(=5+2) (i.e., 7/20), and the entire units of orange are 13(=9+4) (i.e., 13/20). In the area 361-3, the entire units of yellow are 5(=3+2) (i.e., 5/20), and the entire units of orange are 15(=9+6) (i.e., 15/20).

In step S82, the similar-area substituting unit 303 determines the proportion of each color forming the similar areas, and sets the color having the highest proportion to be the representative color. In the example in FIGS. 26A through 26C, the similar-area substituting unit 303 sets the representative color of each of the areas 361-1 through 361-3 to be orange.

Figure 27A:
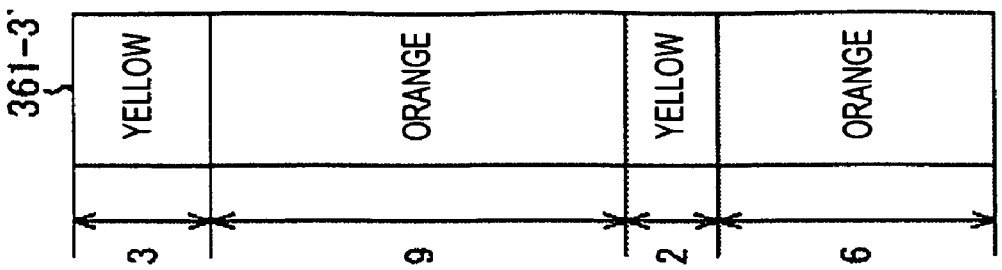
FIGS. 27A, 27B, and 27C illustrate areas substituted by the representative color distribution.
Figure 27B:
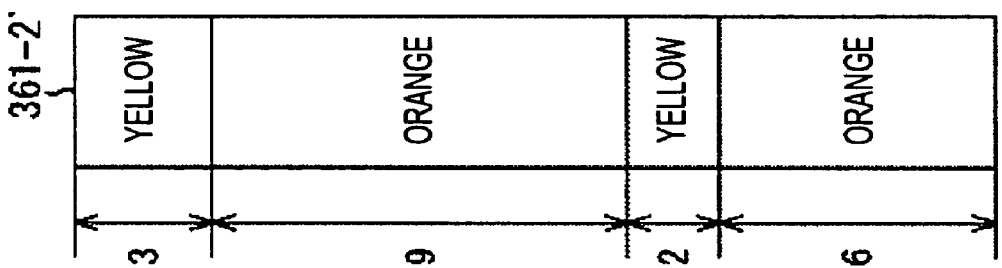
Figure 27C:
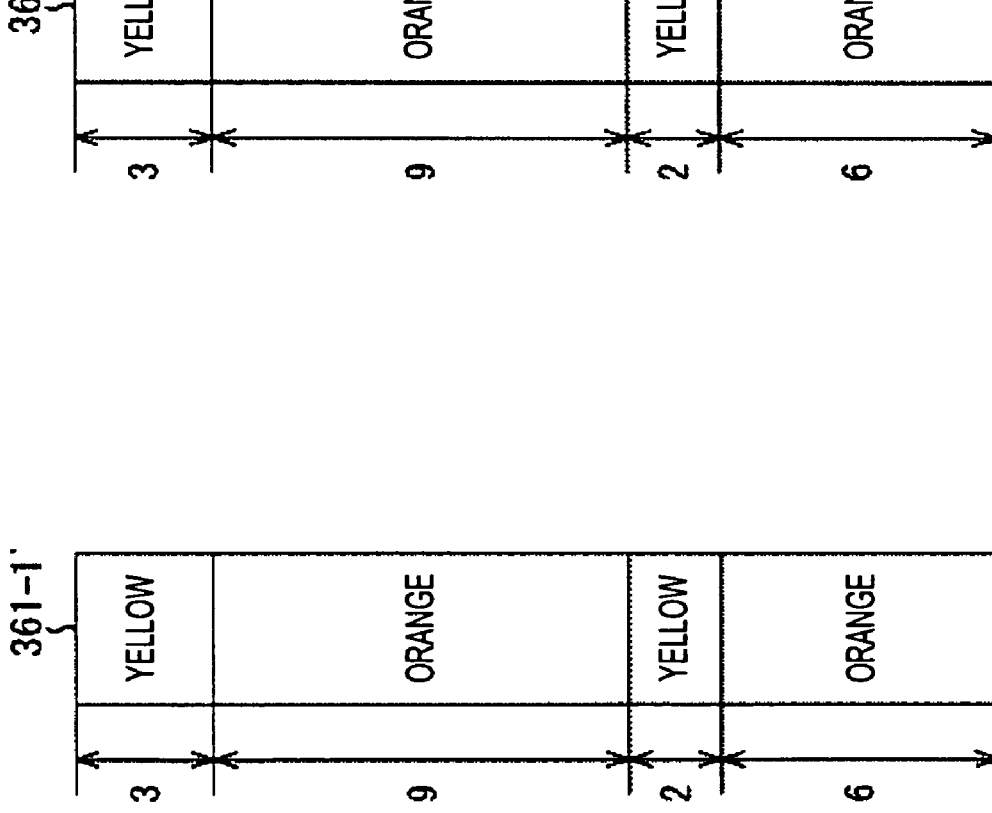

The similar-area substituting unit 303 then detects the color distribution of the area containing the representative color at the highest proportion among the areas 361-1 through 361-3. In the example shown in FIGS. 26A through 26C, the area containing orange at the highest proportion is the area 361-3 (the proportion of orange is 15). Then, the similar-area substituting unit 303 sets the color distribution of the area 361-3 as the representative color distribution, and substitutes the color distributions of the other areas 361-1 and 361-2 by the representative color distribution. That is, by substituting the color distributions of the areas 361-1 and 361-2 by the color distribution of the area 361-3, the areas 361-1, 361-2, and 361-3 are changed into areas 361-1', 361-2', and 361-3', as shown in FIGS. 27A, 27B, and 27C, respectively.

In step S83 of FIG. 23, the similar-area substituting unit 303 scans all the blocks (image formed of a plurality of small blocks) in the horizontal direction. In step S84, the similar-area substituting unit 303 integrates adjacent small blocks having similar colors. For example, the similar-area substituting unit 303 integrates adjacent small blocks having similar colors as a result of substituting the color distributions by the representative color distribution in step S82.

In step S85, the similar-area substituting unit 303 outputs information concerning the resulting image to the consecutive-area extracting unit 304, and the process returns to step S64 of FIG. 18.

According to the processing shown in FIG. 23, the color distributions of the vertical similar areas can be substituted by the representative color distribution by performing horizontal scanning, and more specifically, the image 331 is scanned in the horizontal direction, and areas whose color distributions are similar in the vertical direction are substituted by the representative color distribution. Then, adjacent small blocks having similar colors can be integrated.

In step S65, the similar-area substituting unit 303 substitutes areas whose color distributions are similar in the horizontal direction by a representative color distribution by performing vertical scanning. Details of this processing are similar to those of the processing shown in FIG. 23. In this case, however, in step S81, the horizontal color distributions of the areas are compared, and in step S83, all the blocks (image formed of a plurality of small blocks) are scanned in the vertical direction. According to this processing, the substitution of the color distributions described with reference to FIGS. 26A through 27C is performed in the horizontal direction. Then, similar areas in the horizontal direction can be substituted, and adjacent small blocks having similar colors can be integrated. In step S64, the image 331 is scanned in the vertical direction, and similar areas in the horizontal direction are substituted by the representative color distribution. The resulting information is then supplied to the consecutive-area extracting unit 304.

In step S66, based on the information obtained as a result of steps S64 and S65, the consecutive-area extracting unit 304 extracts areas having a certain or greater length of the same color as consecutive areas. More specifically, the consecutive-area extracting unit 304 extracts areas having a certain or greater length (or width) in the horizontal direction or in the vertical direction as consecutive areas.

A specific example of the extraction of consecutive areas is as follows.

Figure 28:
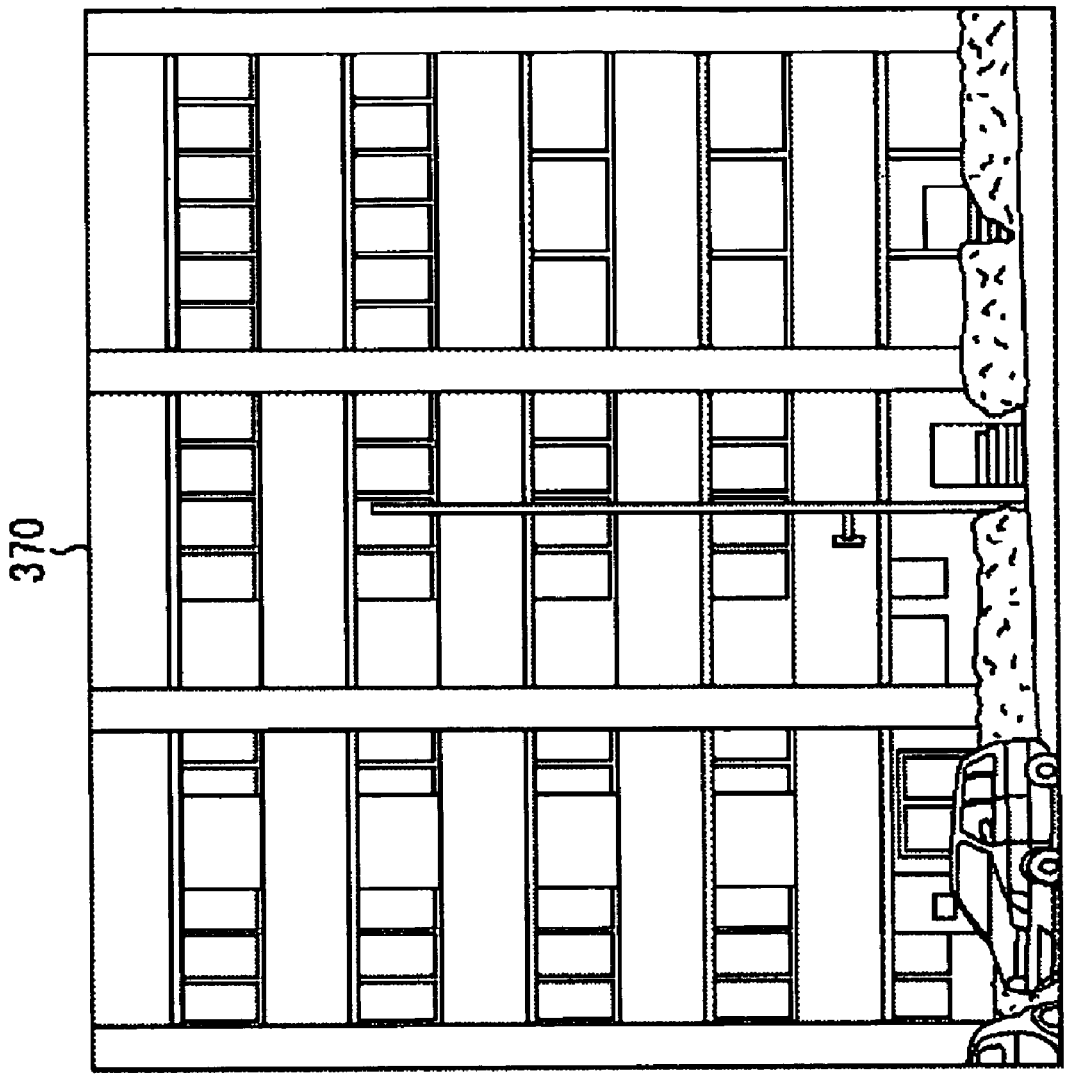
FIG. 28 illustrates an example of an image input.
Figure 29:
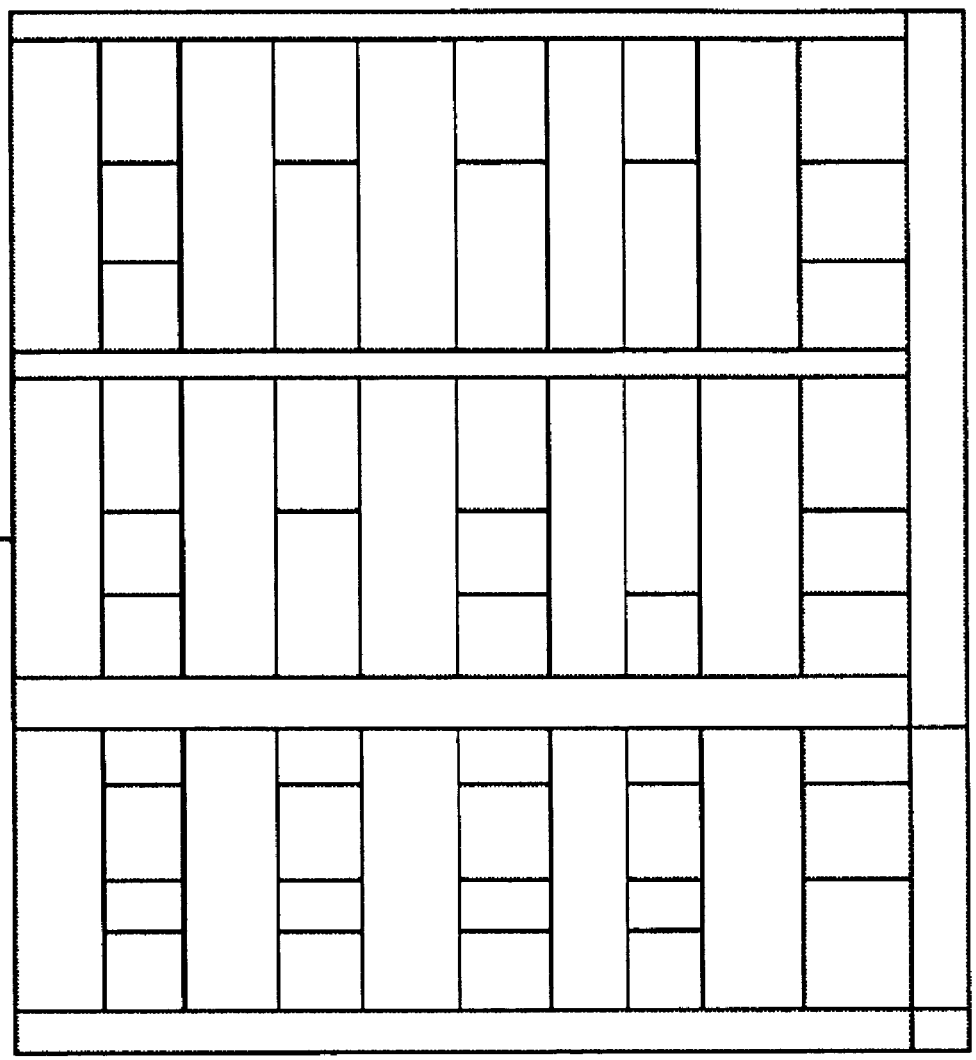
FIG. 29 illustrates blocks divided into a plurality of areas based on the color distributions of the image.
Figure 30:
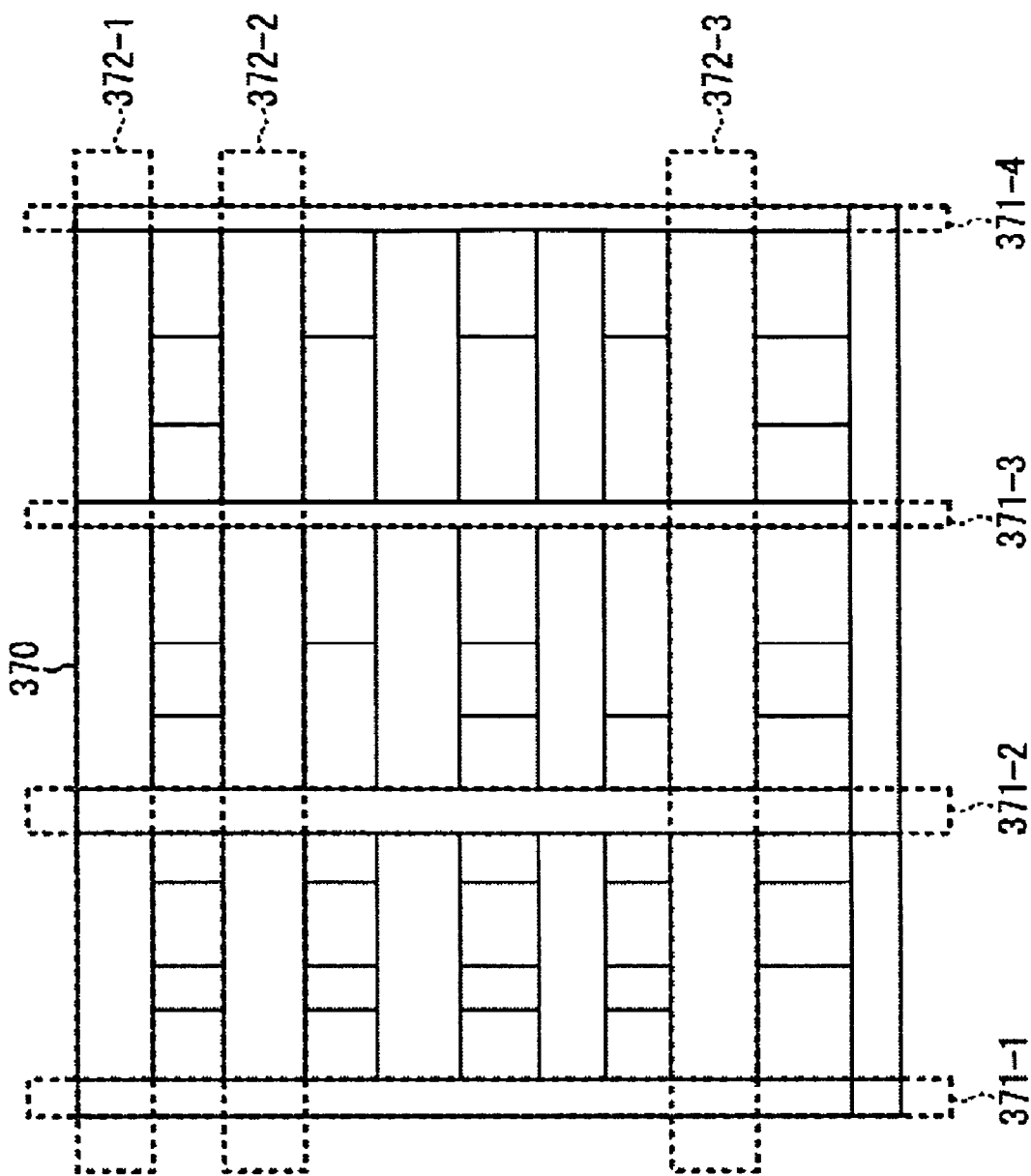
FIG. 30 illustrates the integration of similar blocks in the horizontal and vertical directions.

It is now assumed that data indicating an image 370 shown in FIG. 28 is input into the image processing system 1 (repeating-cycle extracting device 11) shown in FIG. 1. As a result of the processing until step S63 by the repeating-cycle extracting device 11, the block forming device 12, and the consecutive-area extracting device 13, the image 370 is divided, as in the image 370 shown in FIG. 29. That is, in the image 370 shown in FIG. 29, the image has been divided into blocks based on the repeating cycle, and the blocks have further been divided into a plurality of areas based on the color distributions of the blocks. Then, by performing the processing shown in FIG. 23, similar areas are substituted by the representative color distribution by performing horizontal scanning, and adjacent small blocks having similar colors are integrated (step S64), resulting in areas 371-1 through 371-4 shown in FIG. 30. Then, similar areas are substituted by the representative color distribution by performing vertical scanning, and adjacent small blocks having similar colors are integrated (step S65), resulting in areas 372-1 through 372-3 in FIG. 30.

Figure 31:
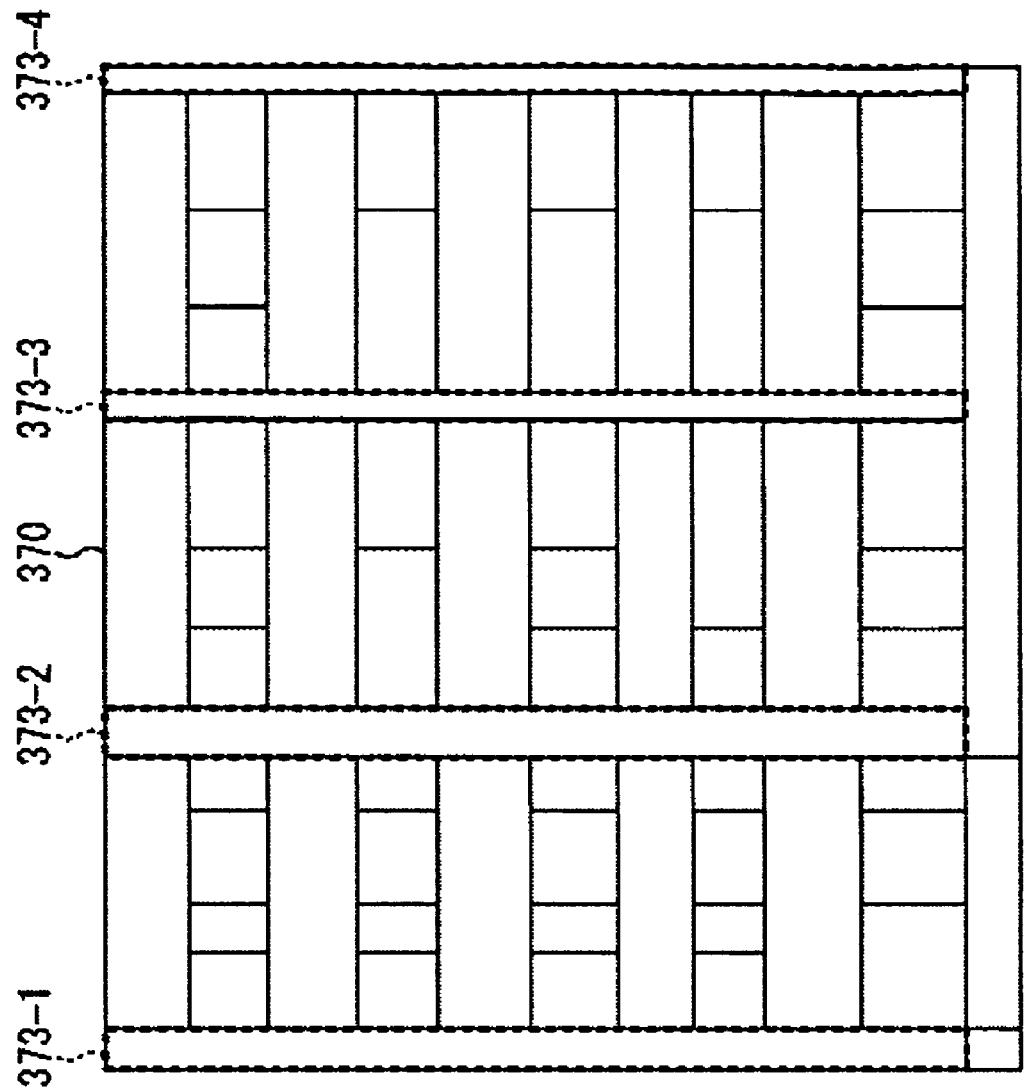
FIG. 31 illustrates the integration of consecutive areas in the vertical direction.
Figure 32:
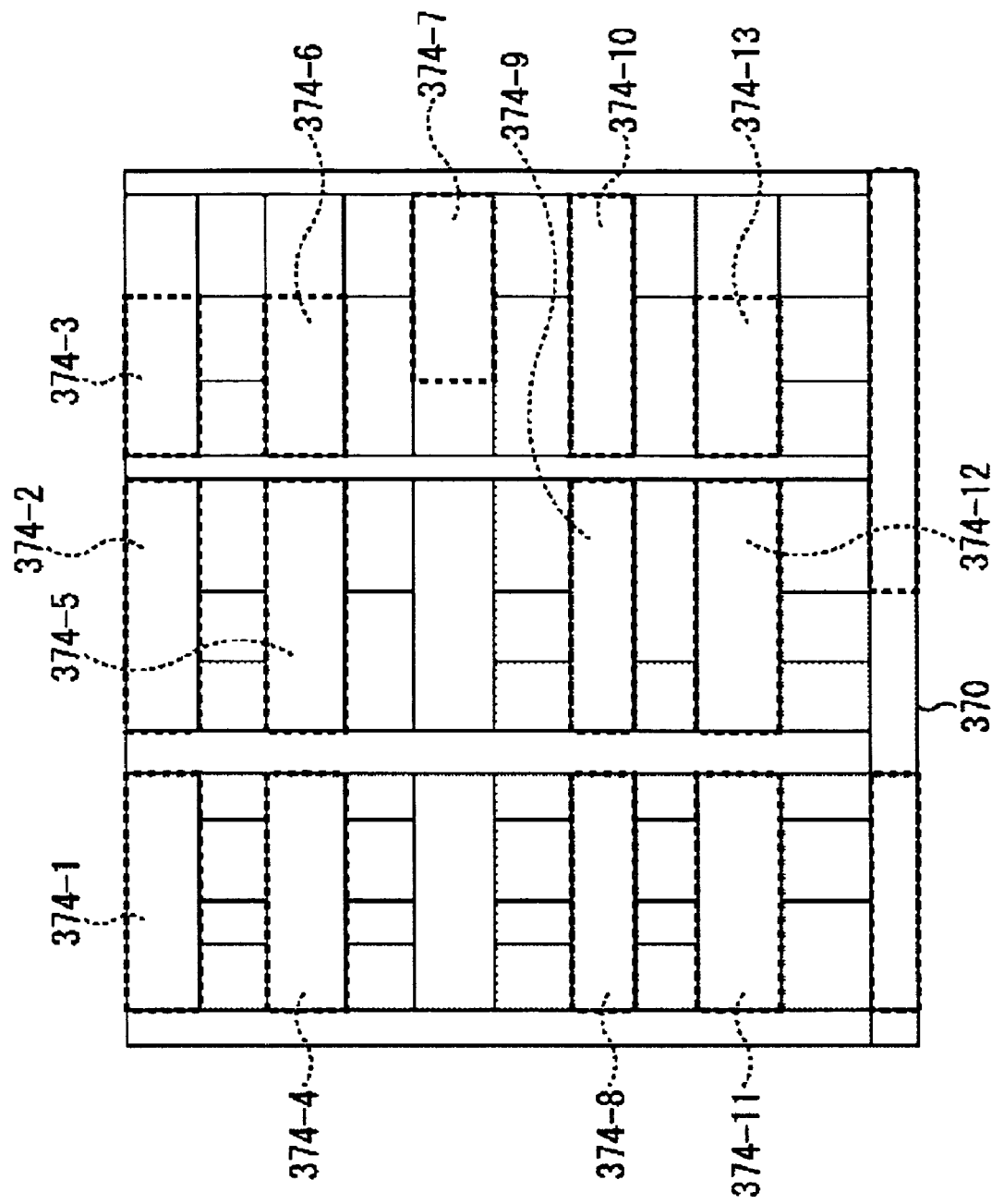
FIG. 32 illustrates the integration of consecutive areas in the horizontal direction.

The consecutive-area extracting unit 304 then extracts consecutive areas 373-1 through 373-4 having a certain or greater vertical length, respectively, as shown in FIG. 31, from the consecutive areas 371-1 through 371-4. The consecutive-area extracting unit 304 also extracts consecutive areas 374-1 through 374-13, as shown in FIG. 32, having a certain or greater horizontal length from the consecutive areas 372-1 through 372-3. Accordingly, the vertical consecutive areas 373-1 through 373-4 and the horizontal consecutive areas 374-1 through 374-13 are extracted.

In step S67 of FIG. 18, the consecutive area integrator 305 integrates the consecutive areas extracted in step S66. More specifically, a plurality of areas extracted as consecutive areas are integrated into a single consecutive area.

In step S68, the output unit 306 outputs information concerning the integrated consecutive area including at least the consecutive area data 23. The image based on the consecutive area information output from the output unit 306 is the block image, such as that shown in FIG. 32, i.e., the image having integrated blocks based on the features of the image. Step S67 may be omitted, in which case, the output unit 306 may output data indicating the image calculated in steps S62 through 65, together with data indicating the consecutive areas extracted in step S66 (consecutive area data 22).

According to the processing shown in FIG. 18, consecutive areas in the horizontal and vertical directions can be extracted from the image containing repeating components. Consecutive areas in the horizontal and vertical directions can also be extracted from a block image.

Based on the features of the image, consecutive areas can be extracted from the image having divided blocks (for example, an image formed of a plurality of first blocks), and then, the consecutive areas can be integrated (for example, an image formed of a plurality of second blocks). The blocks corresponding to the consecutive areas can be stored by decreasing the amount of image data.

According to the consecutive-area extracting device 13 discussed with reference to FIGS. 18 through 32, the area generator 302 divides an input image output from the block forming device 12 into small areas by the horizontal boundaries or the vertical boundaries of the second blocks generated as a result of integrating the first blocks (steps S62 and S63 of FIG. 18). Then, the similar-area substituting unit 303 substitutes an area having the highest proportion of a predetermined statistically representative color (for example, the mode, median, or average value) for the other areas (steps S64 and S65 of FIG. 18). The consecutive-area extracting unit 304 then extracts areas having a predetermined or greater length among the substituted areas (step S66 of FIG. 18). As a result, consecutive areas in the horizontal and vertical directions can be extracted from the image containing repeating components, and consecutive areas of the block image can also be extracted. Instead of extracting consecutive areas from the areas substituted by the similar-area substituting unit 303, the consecutive-area extracting unit 304 may simply extract consecutive areas having a predetermined or greater length.

Based on the consecutive area data 23 and the block image data 22 output from the consecutive-area extracting device 13, the block image reflecting the consecutive areas can be generated.

The configurations of the texture generator 14 and the image reproduction device 15 and the texture generating processing and the image reproduction processing are discussed below.

Figure 33:
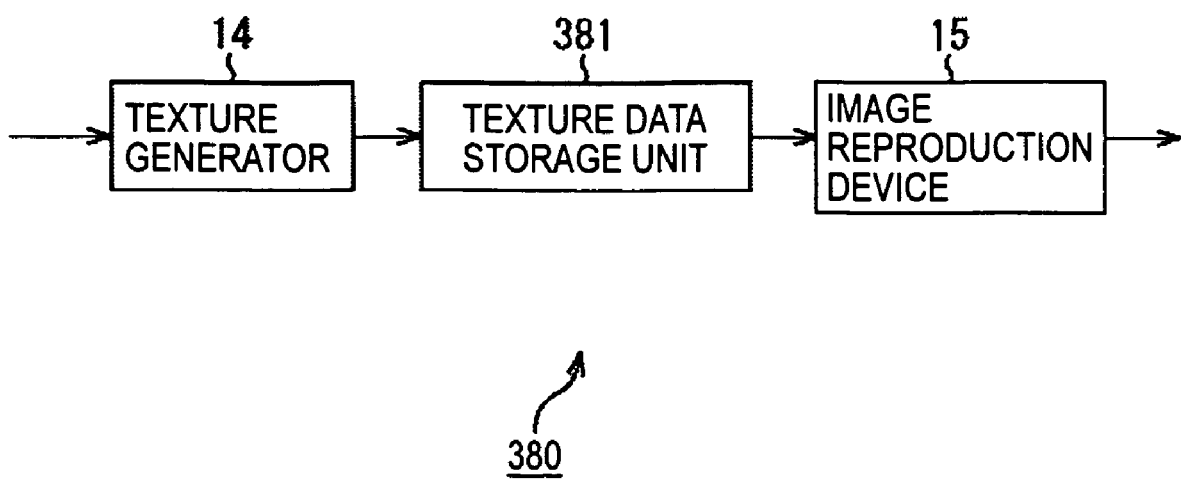
FIG. 33 is a block diagram illustrating an example of the functional configuration of a texture processing system according to an embodiment of the present invention.

FIG. 33 is a block diagram illustrating an example of the configuration of a texture processing system 380.

The texture processing system 380 includes a texture data storage unit 381 in addition to the texture generator 14 and the image reproduction device 15.

The texture generator 14 extracts repeating components of an image and also adjusts the repeating components to generate the texture data 24, and supplies it to the texture data storage unit 381. The texture data storage unit 381 stores the texture data 24 or a file based on the texture data 24. The image reproduction device 15 reproduces a block image based on the texture data 24 (or the file based on the texture data 24) stored in the texture data storage unit 381. In the following example, the file based on the texture data 24 is used.

The configurations of the texture generator 14 and the image reproduction device 15 shown in FIG. 33 are as follows.

Figure 34:
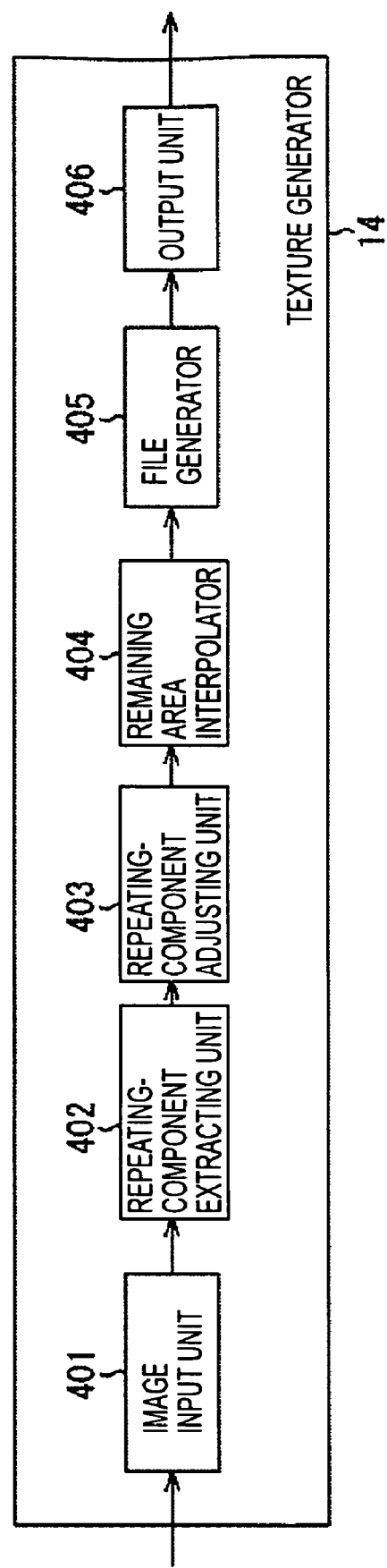
FIG. 34 is a block diagram illustrating an example of the functional configuration of a texture generator.

FIG. 34 is a block diagram illustrating an example of the functional configuration of the texture generator 14 shown in FIG. 33.

The texture generator 14 includes an image input unit 401, a repeating-component extracting unit 402, a repeating-component adjusting unit 403, a remaining area interpolator 404, a file generator 405, and an output unit 406.

The image input unit 401 reads image data to expand information concerning image blocks (start positions, block sizes (row, column), and colors (R, G, B)). This information includes the consecutive area data 23 output as a result of the processing shown in FIG. 18. That is, the consecutive area data 23 indicating integrated consecutive areas of the block image data 22 is input into the image input unit 401.

The repeating-component extracting unit 402 forms the image blocks into groups in the horizontal and vertical directions, and extracts groups having similar color distributions. The repeating-component extracting unit 402 supplies the extracted groups to the repeating-component adjusting unit 403.

The repeating-component adjusting unit 403 determines the representative height and the representative appearance interval (interval between blocks) from the extracted groups. Then, the repeating-component adjusting unit 403 adjusts the positions and lengths of the groups based on the determined representative height and the representative appearance interval, and relocates the adjusted groups.

The repeating-component extracting unit 402 preferentially extracts repeating components having a large number of repetitions, and then shifts to the processing of the repeating-component adjusting unit 403. The repeating-component extracting unit 402 extracts repeating components until there are no repeating components in the image. For repeating components having the largest number of repetitions, the repeating-component adjusting unit 403 adjusts the positions and the lengths of the groups based on the representative height and the representative appearance interval, and relocates the adjusted groups. For other repeating components, the repeating-component adjusting unit 403 relocates the repeating components based on, not only the representative height and the representative appearance interval, but also the positional relationship with the groups that have already been located.

The remaining area interpolator 404 locates the remaining groups in the areas where no group is located by the repeating-component adjusting unit 403, i.e., in the remaining areas. More specifically, the remaining area interpolator 404 detects the positional relationship of the areas where no group is located (i.e., whether the remaining area is sandwiched between repeating areas having relocated groups). The remaining area interpolator 404 then extracts the optimal groups (the representative value of the areas without repeating components) from the block image based on the relocated groups sandwiching the remaining area and the height of the remaining area where no group is located, and locates the optimal groups. The remaining areas include repeating areas and non-repeating areas, though details are given below. In the following example, the remaining area interpolator 404 interpolates the two types of remaining areas.

The file generator 405 generates a file based on texture data including group data adjusted by the repeating-component adjusting unit 403 and group data interpolated and located by the remaining area interpolator 404, and outputs the file to the output unit 406.

The output unit 406 outputs the file of the texture data supplied from the file generator 405 to the texture data storage unit 381.

The texture data storage unit 381 stores the supplied texture data file. Accordingly, the texture data is stored in the texture data storage unit 381 as a file.

In this embodiment, data including the consecutive area data 23 output from the consecutive area extracting unit 13 is input into the image input unit 401 shown in FIG. 34. Alternatively, only the block image data 22 output from the block forming device 12 without the consecutive area data 23 may be input into the image input unit 401.

Figure 35:
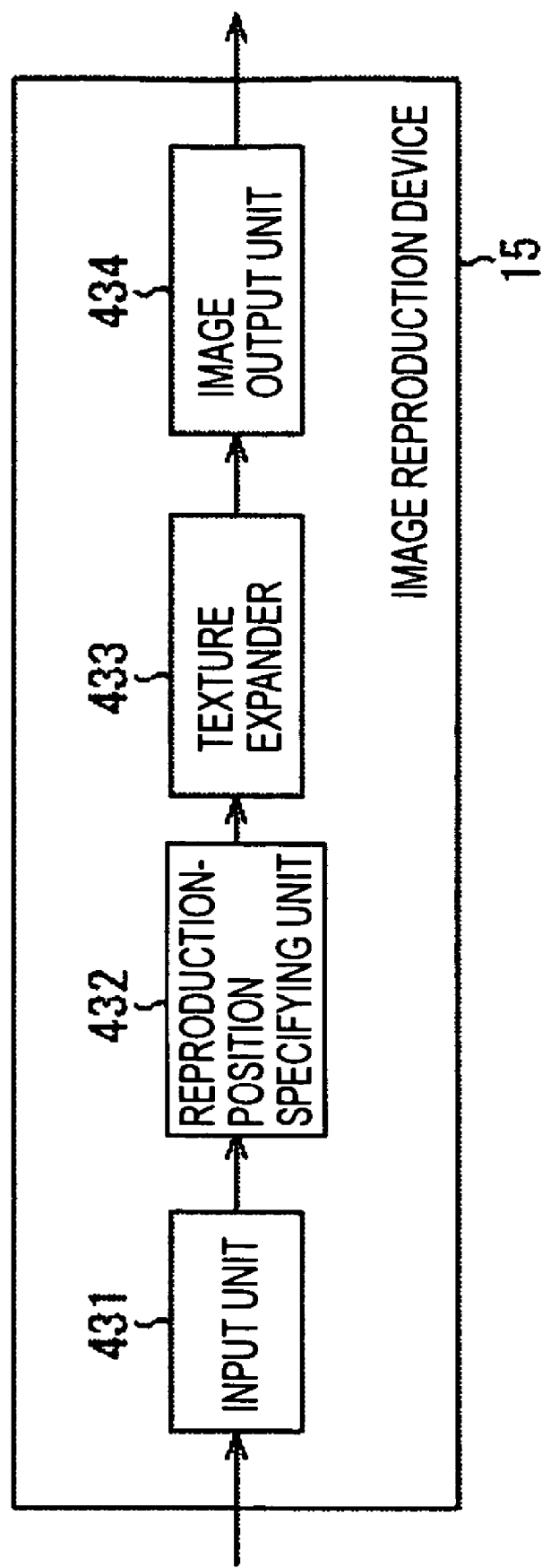
FIG. 35 is a block diagram illustrating an example of the functional configuration of an image reproduction device.

FIG. 35 is a block diagram illustrating an example of the functional configuration of the image reproduction device 15 shown in FIG. 33.

The image reproduction device 15 includes an input unit 431, a reproduction-position specifying unit 342, a texture expander 433, and an image output unit 434.

The input unit 431 reads the texture data file from the texture data storage unit 381 shown in FIG. 33, and extracts the information from the file. The input unit 431 also supplies the extracted information to the reproduction-position specifying unit 432.

If the information written into the extracted file indicates repeating groups (or repeating remaining groups) which are not yet expanded into the memory, the reproduction-position specifying unit 432 specifies the reproduction position of each group based on repeating-component information. The reproduction-position specifying unit 432 also specifies the reproduction positions of the blocks of the specified groups based on the block information.

The texture expander 433 expands the blocks based on the reproduction position of each group specified by the reproduction-position specifying unit 432, thereby expanding the address and color information of the blocks into the memory. If the extracted information indicates repeating groups whose reproduction positions have been specified, the texture expander 433 refers to only the start positions of the group information expanded into the memory so as to expand the block information.

The expansion of the groups into the memory is performed by specifying the reproduction positions of the groups based on the start positions and heights of the groups and by scanning information concerning the blocks in the groups. The reproduction-position specifying unit 432 specifies the reproduction positions of the blocks based on the start positions and heights of the blocks, and the texture expander 433 expands the addresses at the specified reproduction positions and the color information contained in the block information into the memory. The image output unit 434 generates an image to be displayed based on the information expanded into the memory and outputs the resulting image.

Details of the texture generating processing in step S14 of FIG. 2 are described below with reference to the flowchart of FIG. 36. This processing is performed by the texture generator 14 shown in FIG. 34.

In step S91, the image input unit 401 receives the input of an image. For example, the image input unit 401 reads the supplied image data and expands information concerning the image blocks (start positions, block sizes (row, column), and colors (R, G, B)). This information includes the consecutive area data 23 output by the processing shown in FIG. 18. That is, the image input unit 401 receives the input of the consecutive area data 23 having the integrated consecutive areas of the block image data 22, and expands the image block information. The image input unit 401 then supplies the expanded image block information to the repeating-component extracting unit 402.

In step S92, the repeating-component extracting unit 402 forms the image blocks into groups in the horizontal and vertical directions based on the image block information expanded by the image input unit 401, and extracts repeating components. More specifically, the repeating-component extracting unit 402 forms repeating components having many number of repetitions into groups in the horizontal and vertical directions from the image block information, and preferentially extracts the repeating components from such groups. In the first cycle of step S92, repeating components having the largest number of repetitions are formed into groups and are extracted. For example, in the expanded image 71 shown in FIG. 37, the repeating-component extracting unit 402 forms areas 74-1 through 74-13 having the largest number of repetitions into groups, and are extracted. The areas 74-1 through 74-13 are hereinafter simply referred to as the "area 74" unless it is necessary to distinguish the individual areas 74-1 through 74-13.

In step S93, the repeating-component extracting unit 402 determines whether repeating components have been extracted in step S92. If it is determined that repeating components have been extracted, the process proceeds to step S94.

In step S94, the repeating-component adjusting unit 403 calculates the repeating interval of the extracted image. For example, the repeating-component adjusting unit 403 calculates the representative height and appearance interval. Since, in the first cycle of step S92, the repeating components having the largest number of repetitions are extracted, in the first cycle of step S94, the repeating-component adjusting unit 403 calculates the representative height and appearance interval of the extracted repeating components. The representative height is the average, median, or mode value (i.e., a statistically representative value) of the vertical heights of the areas 74-1 through 74-13 shown in FIG. 37. The representative appearance interval is the average, median, or mode value of the intervals appearing in the corresponding two areas of the areas 74-1 through 74-13.

Figure 37:
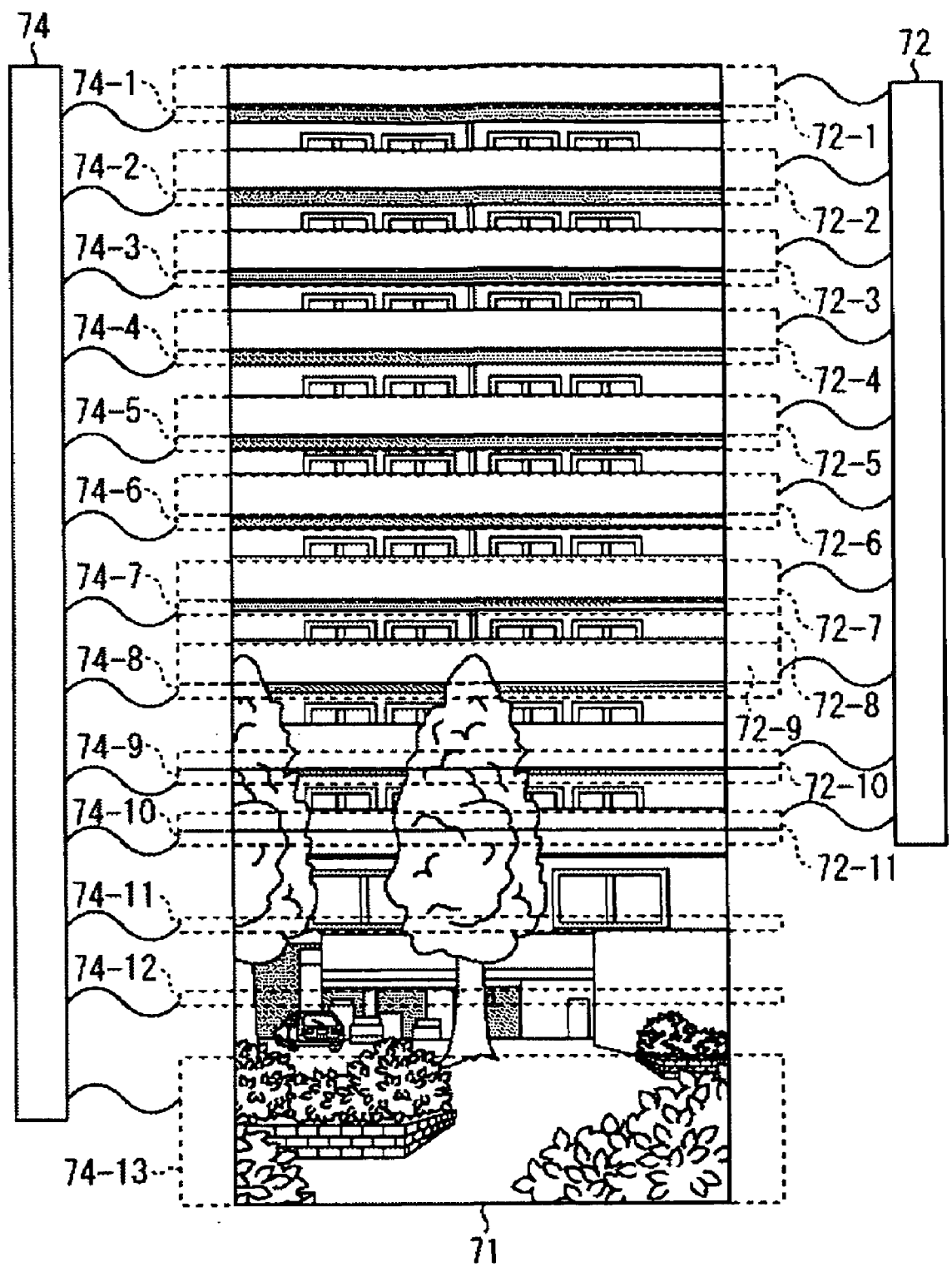
FIG. 37 illustrates repeating components of an image to be extracted.
Figure 38:
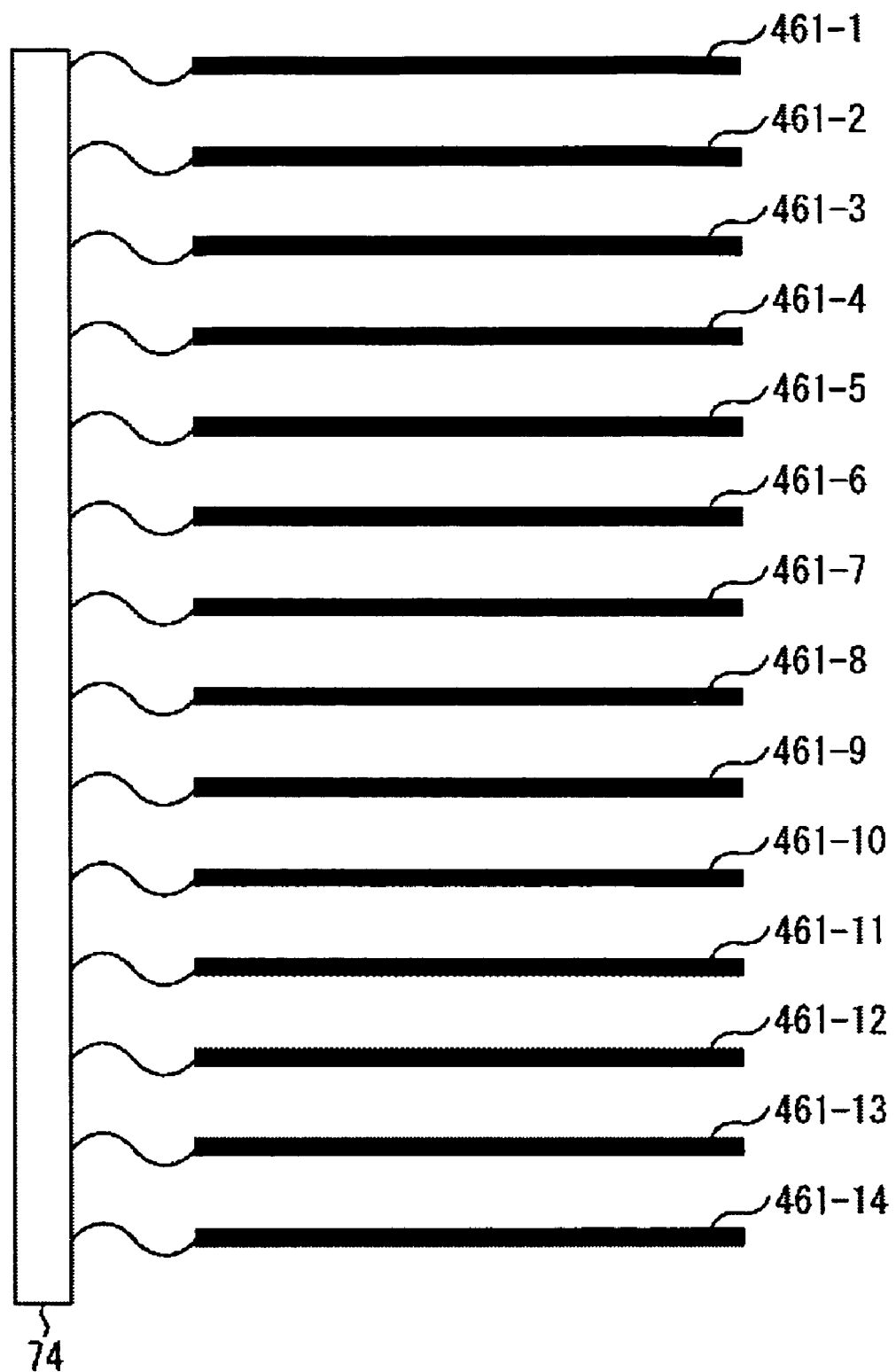
FIG. 38 illustrates relocated repeating areas.

In step S95, the repeating-component adjusting unit 403 relocates the repeating components. More specifically, the repeating-component adjusting unit 403 relocates the repeating components based on the representative height and repeating interval calculated in step S94. As a result of this processing, the areas 74-1 through 74-13 shown in FIG. 37 are relocated to areas 461-1 through 461-14 shown in FIG. 38. In the image shown in FIG. 38, areas (groups) having the largest number of repetitions are relocated based on the representative height and repeating interval.

Figure 39:
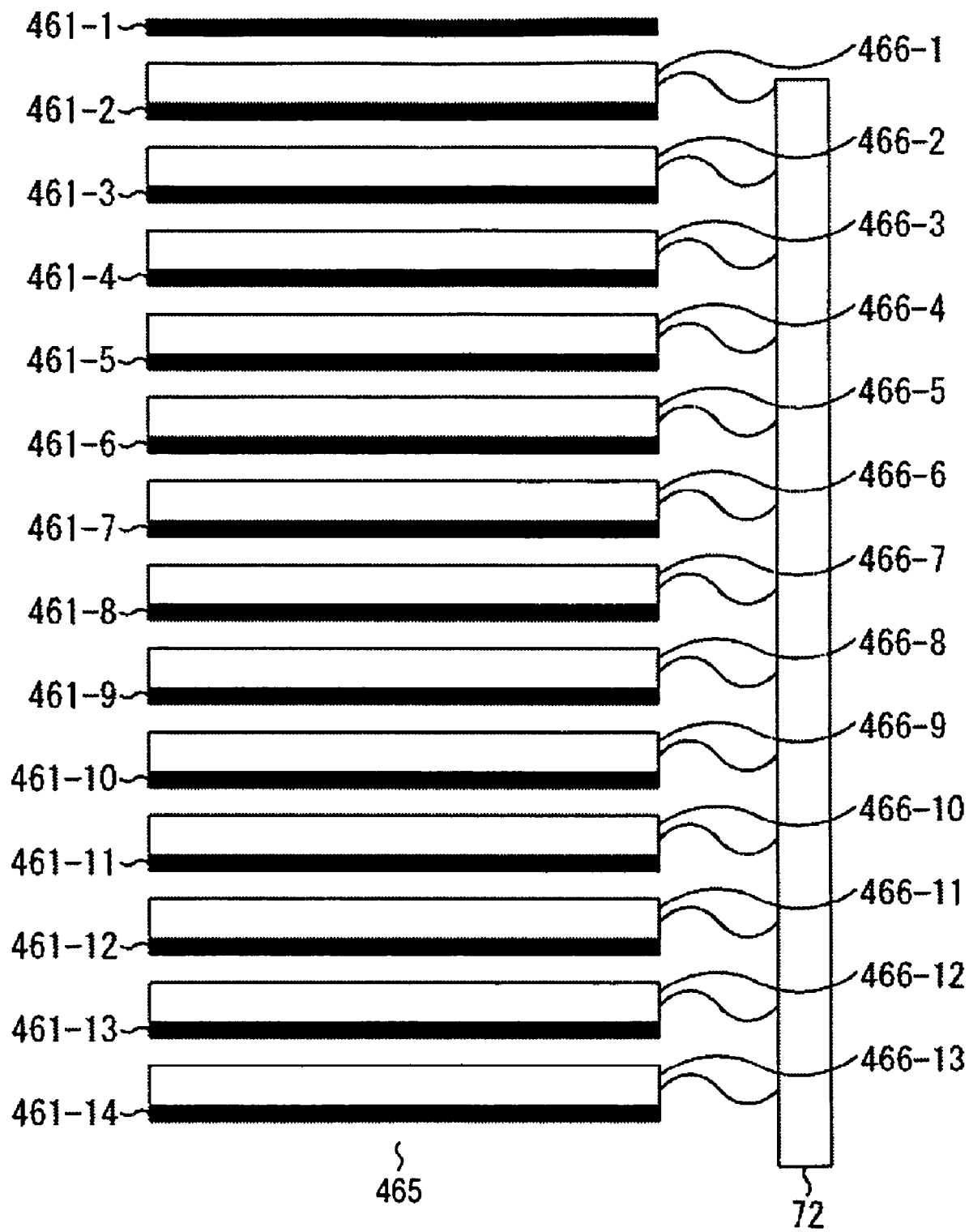
FIG. 39 illustrates the relocation of repeating areas of the image.

Then, the process returns to step S92, and steps S92 through S95 are repeated. That is, in the second cycle of step S92, the repeating-component extracting unit 402 extracts areas 72-1 through 72-11 having the second largest number of repetitions from the image 71 shown in FIG. 37. Then, in step S93, it is determined that repeating components have been extracted, and in the second cycle of step S94, the repeating-component adjusting unit 403 calculates the repeating interval of the extracted image. That is, the repeating-component adjusting unit 403 calculates the representative height and repeating interval of the areas 72-1 through 72-11 shown in FIG. 37. Then, in step S95, the repeating-component adjusting unit 403 relocates the repeating components. In the second cycle of step S95, the repeating-component adjusting unit 403 adjusts and relocates the repeating components based on, not only the representative height and appearance interval calculated in step S94, but also the positional relationship with the groups that have been relocated in the first cycle of step S95. After this processing, areas 466-1 through 466-13 are relocated, as shown in FIG. 39, by considering the positional relationship with the areas 461-1 through 461-14 that have been relocated in the first cycle of step S95. An image 465 shown in FIG. 39 is the image obtained by relocating the areas 466-1 through 466-13 having the second largest number of repetitions based on the representative height and appearance interval of the areas 466-1 through 466-13 and the positional relationship with the relocated groups (the areas 461-1 through 461-14 having the largest number of repetitions). Then, the process returns to step S92. Since there is no repeating components in the image 71 shown in FIG. 37, it is determined in step S93 that repeating components have not been extracted.

Figure 40:
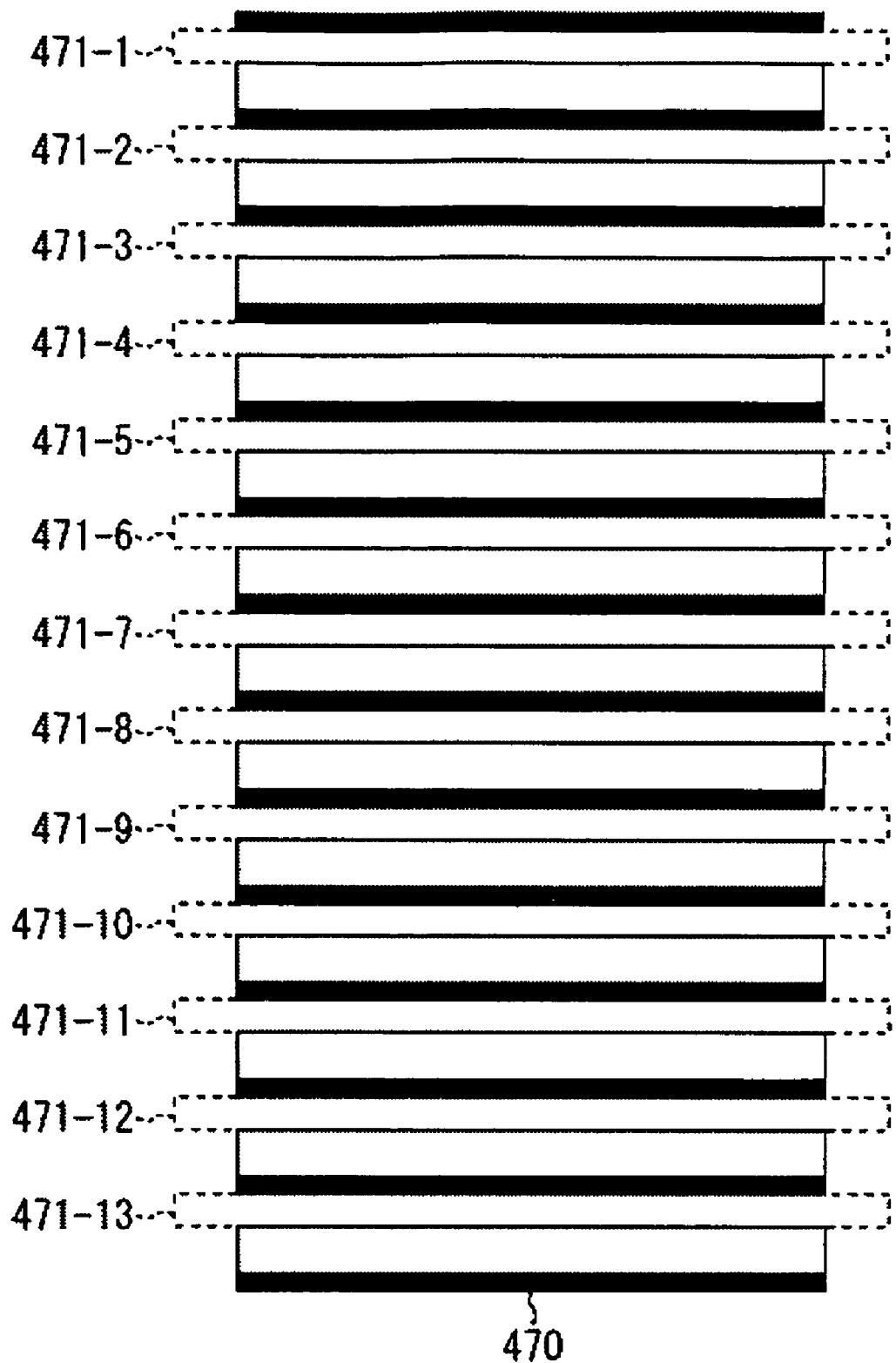
FIG. 40 illustrates relocated repeating remaining areas.

In step S93, if it is determined that repeating components have not been extracted, i.e., that there are no repeating components, in step S96, the remaining area interpolator 404 detects the positional relationship of the areas that have not been relocated by the processing of step S95. For example, the remaining area interpolator 404 detects areas without relocated groups which are vertically sandwiched between repeating areas. In the example shown in FIG. 40, the remaining area interpolator 404 detects areas 471-1 through 471-13 as remaining areas, and also detects that the remaining areas 471-1 through 471-13 are sandwiched between the area 74 having the largest number of repetitions and the area 72 having the second largest number of repetitions. The remaining area interpolator 404 detects the positional relationship of each of areas 491 and 492 shown in FIG. 41 in which no group has been relocated.

In step S97, the remaining area interpolator 404 determines whether the remaining area detected in step S96 is a repeating remaining area. More specifically, the remaining area interpolator 404 determines whether there is any area sandwiched between repeating areas. In the example shown in FIG. 37, areas (i.e., areas 471-1 through 471-13 in FIG. 41) between the areas 74-1 through 74-13 and the areas 72-1 through 72-11 are found to be repeating remaining areas. If it is determined in step S97 that there is a repeating remaining area, in step S98, the remaining area interpolator 404 relocates the repeating remaining area as repeating components. The areas relocated in step S98 are sandwiched between repeating areas relocated before and are vertically or horizontally adjacent to such repeating areas. The number of groups relocated is not necessarily one and may be plural. After step S98, the process returns to step S96, and steps S96 through S98 are repeated until all repeating remaining areas have been relocated.

Figure 41:
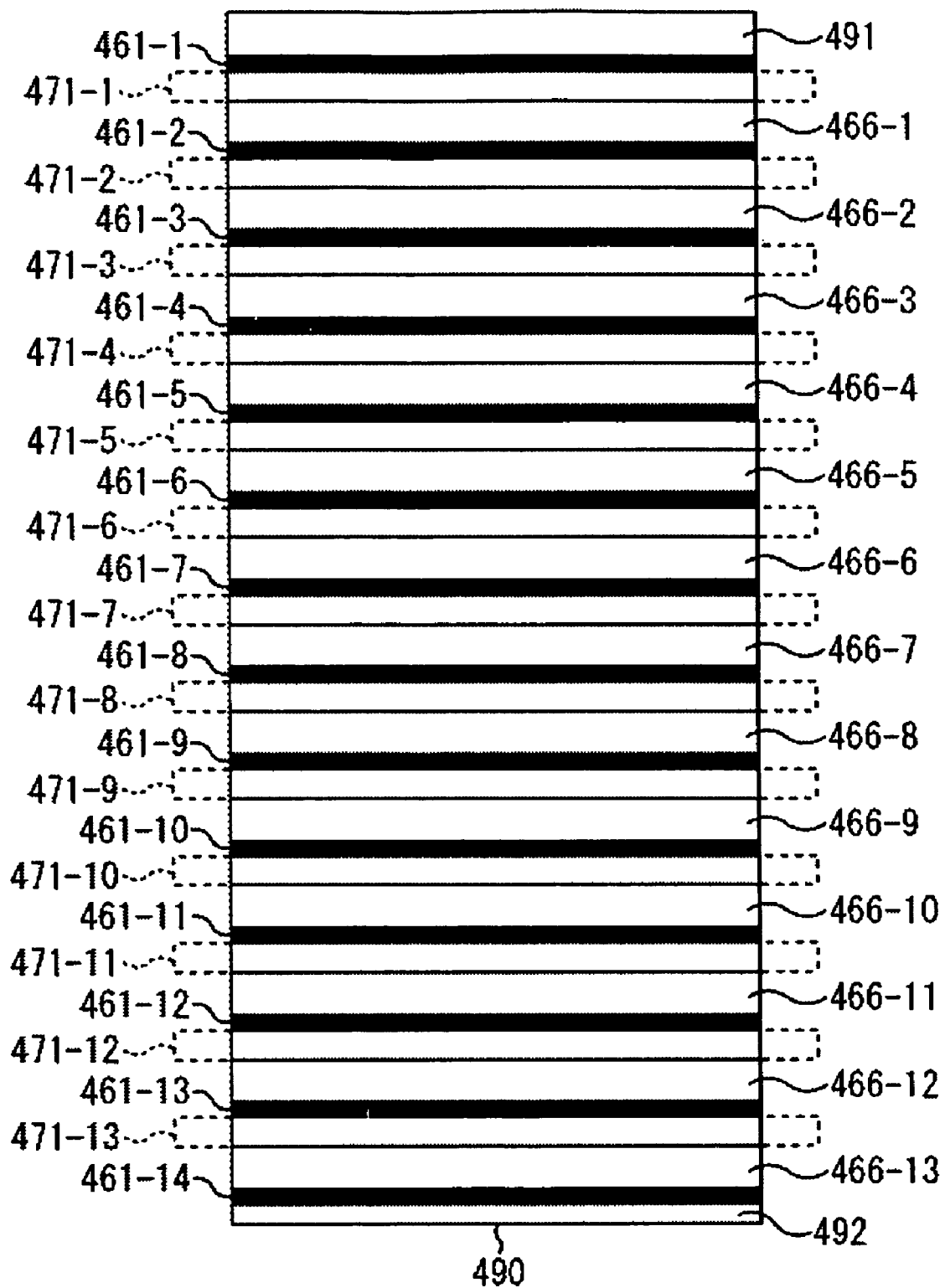
FIG. 41 illustrates remaining areas.

If it is determined in step S97 that there is no repeating remaining area, in step S99, the remaining area interpolator 404 extracts and locates optimal groups from the block image, for example, the image 71 shown in FIG. 37, based on the positional relationship of the area without relocated groups detected in step S96. In the example shown in FIG. 40, the areas in which groups are relocated are the area group 74, the area group 72, and the group of areas 471-1 through 471-13 (repeating remaining group). In this case, in step S96, the remaining area interpolator 404 has compared the image 71 shown in FIG. 37 with the image 470 shown in FIG. 40 and has detected the area groups that are not contained in the image 470. Accordingly, in step S99, the areas 491 and 492 are located, as shown in FIG. 41, and an image 490 is generated. According to this processing, texture (data) including repeating components of the image and information concerning the positional features of the repeating components is generated.

In step S100, the file generator 405 executes file generating processing to generate a file of the texture data. Details of the file generating processing are discussed below with reference to the flowchart of FIG. 42. The file generated by the file generator 405 is supplied to the output unit 406.

In step S101, the output unit 406 outputs the file generated in step S100, and the processing is completed. Then, the process returns to step S14 of FIG. 2.

Figure 36:
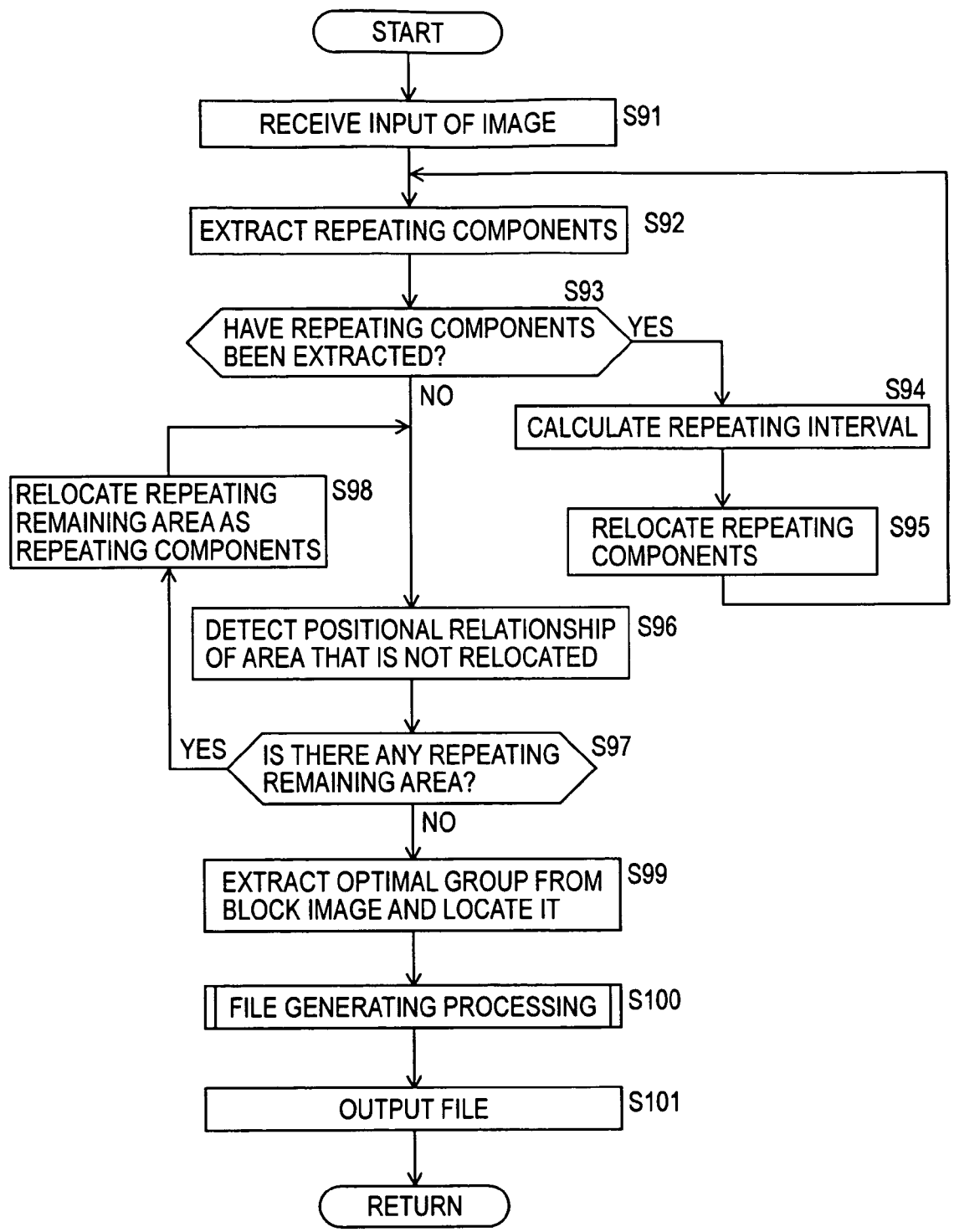
FIG. 36 is a flowchart illustrating details of texture generating processing in step S14 of FIG. 2.

According to the processing shown in FIG. 36, a file of the image data (texture data 24) relocated based on repeating components is generated and output. The image, for example, the image 490 shown in FIG. 41, generated by being relocated based on the repeating interval until step S99 is hereinafter also referred to as "texture".

In the processing shown in FIG. 36, the repeating remaining areas are processed such that they are distinguished from the repeating areas. However, the repeating remaining area may be processed as a repeating area. More specifically, if a repeating remaining area is extracted in step S92 of FIG. 36, it is determined in step S93 that repeating components have been extracted, and then, the repeating remaining area is relocated in steps S94 and 95. In this case, steps S97 and S98 are skipped.

Details of the file generating processing by the file generator 405 shown in FIG. 34 in step S100 of FIG. 36 are described below with reference to the flowchart of FIG. 42. This processing is started when the texture data generated in step S91 through S99 of FIG. 36 is input into the file generator 405.

In step S121, the file generator 405 detects groups. More specifically, the file generator 405 scans the texture image (image formed of groups adjusted by the repeating-component adjusting unit 403 and groups generated by repeating remaining areas and remaining areas interpolated and located by the remaining area interpolator 404, for example, the image 490 shown in FIG. 41) in the vertical direction, for example, from the top, to detect groups in the horizontal direction. In the example shown in FIG. 41, each of the areas 461-1 through 461-14, the areas 466-1 through 466-13, the areas 471-1 through 471-13, the area 491, and the area 492 is detected as one group. For example, the area 461-1 is defined as one group formed of a plurality of blocks.

In step S122, the file generator 405 determines a target group from the plurality of horizontal groups detected in step S121. The file generator 405 sets, for example, the area 461-1 to be the target group.

In step S123, the file generator 405 determines whether there are repeating components in the target group, in this case, the area 461-1, determined in step S122. Since the area 461-1 is repeated until the area 461-14, it is determined in step S123 that there are repeating components.

If it is determined in step S123 that there are repeating components in the target group, in step S124, the file generator 405 writes the start position, the length, the number of repetitions, and the repeating interval of the group into the file. For example, for the areas 461-1 through 461-14, the start position of the group, for example, the top left of the area 461-1, is set as the start position of the area 461-1, the number of repetitions is 14, which is equal to the number of areas 461-1 through 461-14, and the repeating interval is the interval of the corresponding two areas of the areas 461-1 through 461-14. In this case, the repeating interval calculated in step S94 of FIG. 36 may be used.

In step S125, the file generator 405 scans the blocks in the target block in the horizontal direction to write the start position, the length, and the color of each block into the file. For example, the file generator 405 scans the area (group) 461-1 in the horizontal direction to write the start position, the length, and the color of each block into the file. The color of the area 461-1 is represented by R, G, and B.

In steps S124 and S125, the information concerning the texture of the areas 461-1 through 461-14 is written as the file. That is, in step S124, the position, length, etc., of each of the areas 461-1 through 461-14 are written. Since the areas 461-1 through 461-14 are detected as the same repeating components, the configuration of the blocks is the same. Accordingly, the start position, the length, and the color of the representative area, in this case, the area 461-1, are written into the file. Thus, texture information for reproducing the entire texture of the areas 461-1 through 461-14 shown in FIG. 41 is written into the file.

After step S125, the file generator 405 determines in step S126 whether the texture information of all the groups has been written into the corresponding files. In the example shown in FIG. 41, although the texture information of the groups of the areas 461-1 through 461-14 has been written, the texture information of the groups of the areas 491, 492, 466-1 through 466-13, and 471-1 through 471-13 has not been written, and thus, the file generator 405 determines in step S126 that not all the texture information has been written.

In this case, the process proceeds to step S127 in which the file generator 405 determines the subsequent target horizontal group, for example, the area 466-1 shown in FIG. 41.

Then, the process returns to step S123, and steps S123 through s126 are similarly repeated. In the second cycle of step S123, it is determined that the target area 466-1 shown in FIG. 41 has repeating components, i.e., the areas 466-1 through 466-13, and in steps S124 and S125, texture information for reproducing the entire texture of the areas 466-1 through 466-13 is written into the file. If it is determined in the second cycle of step S126 that the texture information of all the groups has not been written into the file, the subsequent target horizontal group, for example, the area 471-1 shown in FIG. 41, is determined in step S127.

The process then returns to step S123 to determine whether the target horizontal group has repeating components. In this case, since the area 471-1 shown in FIG. 41 is found to be a repeating remaining area and is relocated in steps S97 and S98, it is determined in step S123 that the target group has repeating components. Then, in the third cycle of steps S124 and S125, texture information for reproducing the entire texture of the areas 471-1 through 471-13 is written. If each of the areas 471-1 through 471-13 includes two groups, there are two items of group information concerning the representative area 471-1 (two repeating remaining areas 513 shown in FIG. 43, which are discussed below). In the third cycle of step S126, it is determined that the texture information of all the groups has not been written into the file, and in step S127, the subsequent target horizontal group, for example, the area 491 shown in FIG. 41, is determined.

Then, the process is returned to step S123, and steps S123 through S126 are similarly repeated. In the fourth cycle of step S123, the target area 491 does not contain repeating components (the area 491 is found to be a non-repeating remaining area in step S99 of FIG. 36). The process then proceeds to step S128.

In step S128, the file generator 405 writes the start position and the length of the area 491 into the file.

In step S129, the file generator 405 scans the blocks in the target group 491 in the horizontal direction to write the start position, the length, and the color of each block of the area 491 into the file. The color of the area 491 is represented by R, G, and B.

In steps S128 and S129, the information concerning the texture of the area 491 is written as a file. That is, in step S128, the start position and length of the area 491 shown in FIG. 41 are written, and in step S129, the start position, length, and color of each block in the area 491 are written. By this processing, texture information for reproducing the texture of the area 491 is written into the file. If a target horizontal group does not contain repeating components, the number of repetitions and the repeating interval are not written into the file since they are not necessary.

After step S129, the process proceeds to step S126 to determine whether the texture information of all the groups has been written into the file. In this case, since the texture information of the area 492 has not been written into the file, the process proceeds to step S127 in which the subsequent target horizontal group, for example, the area 492 shown in FIG. 41, is determined. The process then returns to step S123.

Steps S123 through S129 after it is determined in step S127 that the area 492 is set to be target group are similar to those for the area 491, and thus, an explanation thereof is omitted. Then, it is determined in step S126 that the information of all the groups is written into the file, and the process proceeds to step S130.

In step S130, the file generator 405 supplies the data written in steps S121 through S129 as one file to the output unit 406. Then, the process returns to step S100 of FIG. 36.

Figure 42:
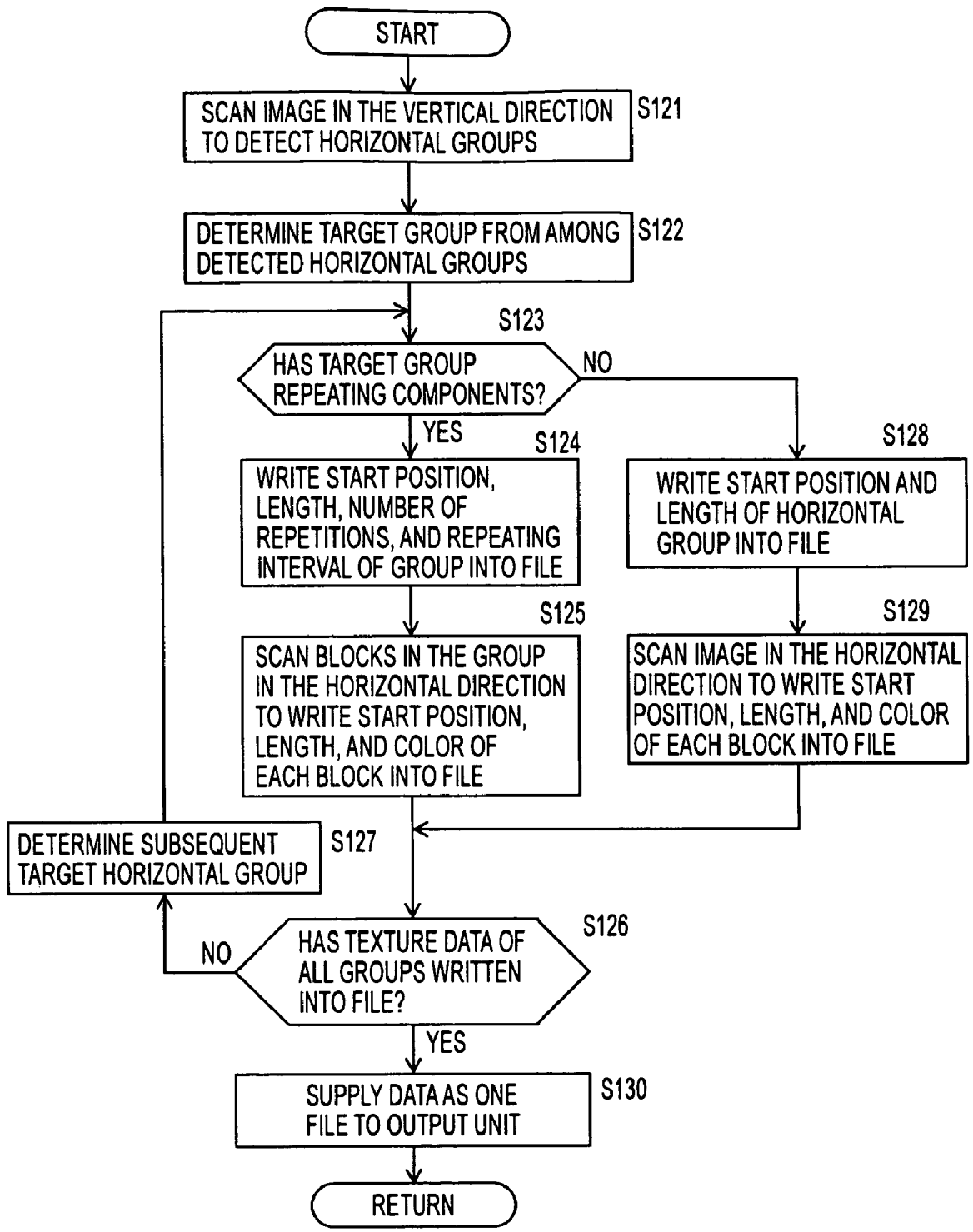
FIG. 42 is a flowchart illustrating details of file generating processing in step S100 of FIG. 36.

According to the processing shown in FIG. 42, a file can be generated such that texture information is indicated for each group containing repeating components. The configuration of this file is, for example, as that shown in FIG. 43.

A file 510 shown in FIG. 43 includes repeating-component information 511-1 and 511-2 (hereinafter simply referred to as the "repeating-component information 511" unless it is necessary to distinguish the individual items of information), repeating remaining area information 513-1 and 513-2 (hereinafter simply referred to as the "repeating remaining area information 513" unless it is necessary to distinguish the individual items of information), and remaining area information 515-1 and 515-2 (hereinafter simply referred to as the "remaining area information 515" unless it is necessary to distinguish the individual items of information). Block information 512-1-1 through 512-1-3 is written into the repeating-component information 511-1 in association with each other.

Block information 512-2-1 through 512-2-4 is written into the repeating-component information 511-2 in association with each other. Block information 514-1-1 through 514-1-7 is written into the repeating remaining area information 513-1 in association with each other. Block information 514-2-1 through 514-2-4 is written into the repeating remaining area information 513-2 in association with each other. Block information 516-1-1 through 516-1-5 is written into the remaining area information 515-1 in association with each other. Block information 516-2-1 through 516-2-3 is written into the remaining area information 515-2 in association with each other. The block information 512-1-1 through 512-1-3 and 512-2-1 through 512-2-4 are hereinafter simply referred to as the "block information 512" unless it is necessary to distinguish the individual items of information. The block information 514-1-1 through 514-1-7 and 514-2-1 through 514-2-4 are hereinafter simply referred to as the "block information 514" unless it is necessary to distinguish the individual items of information. The block information 516-1-1 through 516-1-5 and 516-2-1 through 516-2-3 are simply referred to as the "block information 516" unless it is necessary to distinguish the individual items of information.

The block information 512, 514, or 516 includes, as shown in FIG. 44, start position information, length information, and color information. It is now assumed that the block information shown in FIG. 44 is contained in the block information 512-1-1 through 512-1-3, 512-2-1 through 512-2-4, 514-1-1 through 514-1-7, 514-2-1 through 514-2-4, 516-1-1 through 516-1-5, and 516-2-1 through 516-2-3.

The file 510 is generated as a result of performing the processing shown in FIG. 42 on the image 490 shown in FIG. 41. More specifically, in the first cycle of step S124 of FIG. 42, the start position, the length, the number of repetitions, and the repeating interval of the groups of the areas 461-1 through 461-14 shown in FIG. 41 are written into the repeating-component information 511-1 shown in FIG. 43 as the start position information, the length information, the number-of-repetition information, and the repeating interval information, respectively. Then, in the first cycle of step S125, the start position, the length, and the color of each block of the area 461-1 are written into the block information 512-1-1 through 512-1-3 shown in FIG. 43 as the start position information, the length information, and the color information (FIG. 44), respectively. The group of the area 461-1 includes three blocks in the vertical direction, and thus, items of information concerning the three blocks are written as the block information 512-1-1 through 512-1-3. As stated above, since the areas 461-1 through 461-14 shown in FIG. 41 are found to be the same repeating components, the configuration of the blocks in the group is the same. Accordingly, by merely storing the block information corresponding to the repeating-component information 511-1 in association with each other, the texture information for reproducing the texture of the areas 461-1 through 461-14 shown in FIG. 41 is written into the file.

Figure 43:
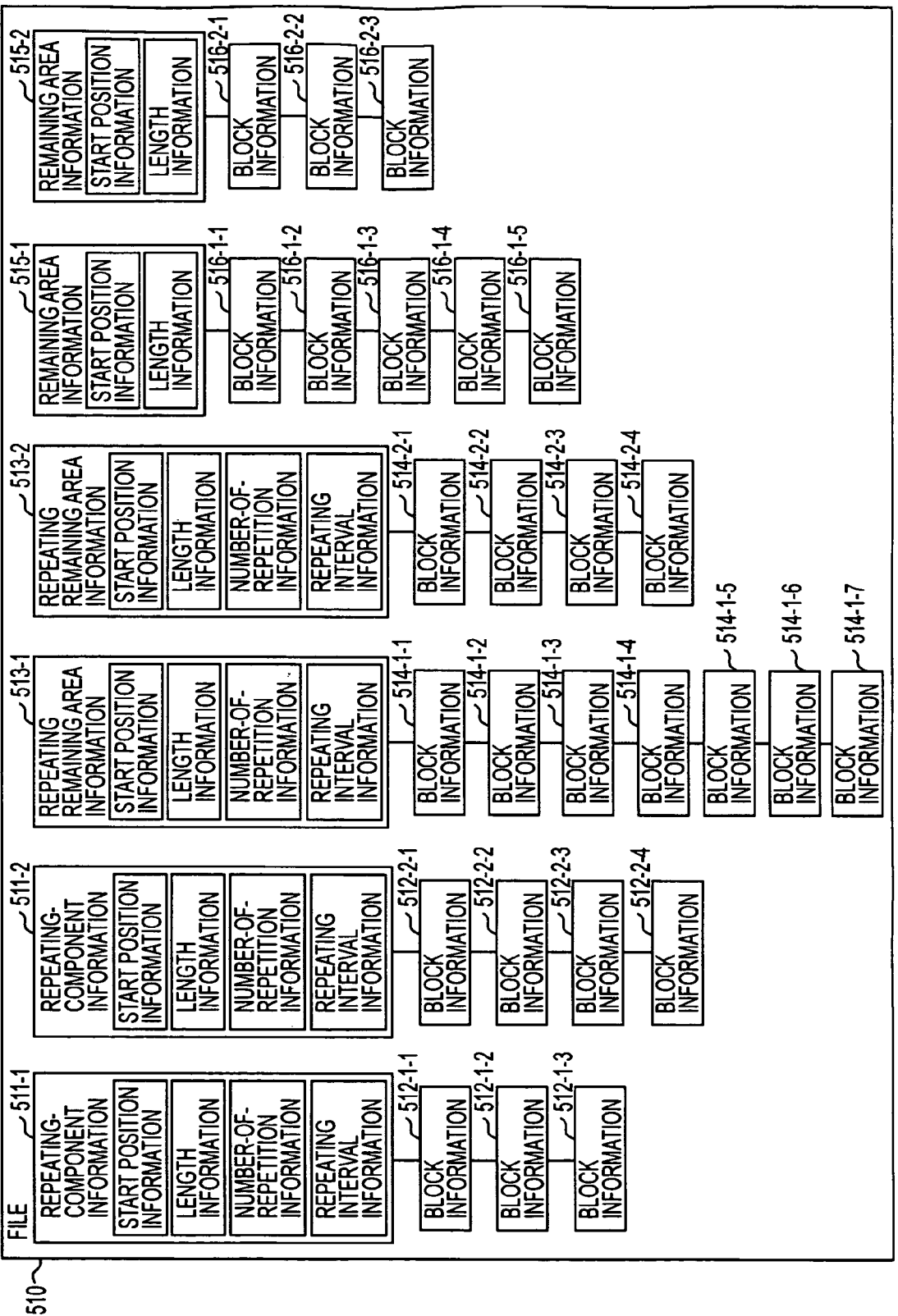
FIG. 43 illustrates an example of the file structure.

Similarly, in the second cycle of step S124 in FIG. 42, the start position, the length, the number of repetitions, and the repeating interval of the groups of the areas 466-1 through 466-13 are written into the repeating-component information 511-2 shown in FIG. 43. Then, in the second cycle of step S125, the start position, the length, and the color of each block of the area 466-1 are written into the block information 512-2-1 through 512-2-4 shown in FIG. 43 as the start position information, the length information, and the color information, respectively, in association with the repeating-component information 511-2. In this case, each of the areas 466-1 through 466-13 includes four vertical blocks.

In the third cycle of step S124 in FIG. 42, the start position, the length, the number of repetitions, and the repeating interval of the groups of the areas 471-1 through 471-13 shown in FIG. 41 are written into the repeating remaining area information 513-1 and 513-2 shown in FIG. 43 as the start position information, the length information, the number-of-repetition information, and the repeating interval information, respectively. Then, in the third cycle of step S125, the start position, the length, and the color of each block are written into the block information 514-1-1 through 514-1-7 and block information 514-2-1 through 514-2-4 shown in FIG. 43 in association with the repeating remaining area information 513-1 and 513-2 as the start position information, the length information, and the color information, respectively. The area 471-1 includes two groups, i.e., one group (repeating remaining area information 513-1) formed of seven vertical blocks and the other group (repeating remaining area information 513-2) formed of four vertical blocks.

Subsequently, in the first cycle of steps S128 and S129, information concerning the areas 491 in FIG. 41 is written as the remaining area information 515-1 and block information 516-1-1 through 516-1-5, and in the second cycle of steps S128 and S129, information concerning the area 492 in FIG. 41 is written as the remaining area 515-2 and block information 516-2-1 through 516-2-3. Then, in step S130 in FIG. 42, the file 510 shown in FIG. 43 is supplied to the output unit 406 as one file.

According to the processing shown in FIG. 42, the start position information, the length information, the number-of-repetition information, and the repeating interval information of groups containing repeating components are written, and thus, merely by writing the block information (for example, the block information 512-1-1 through 512-1-3) corresponding to one group (area), the texture image can be reproduced. As a result, the amount of information written into the file 510 can be decreased. That is, since it is only necessary for repeating areas that the block information of the representative area be written into the file, the amount of information to be written into the file can be smaller than that when block information concerning all the areas is written into the file.

When one area is formed of two groups, information concerning the area is written into the file at one time in steps S124 and S125 or in steps S128 and S129. However, the processing may be repeated for each group to write corresponding information into the file. In this case, for example, if one area is formed of five groups, the processing of steps S124 and S125 or steps S128 and S129 is repeated five times.

Figure 45:
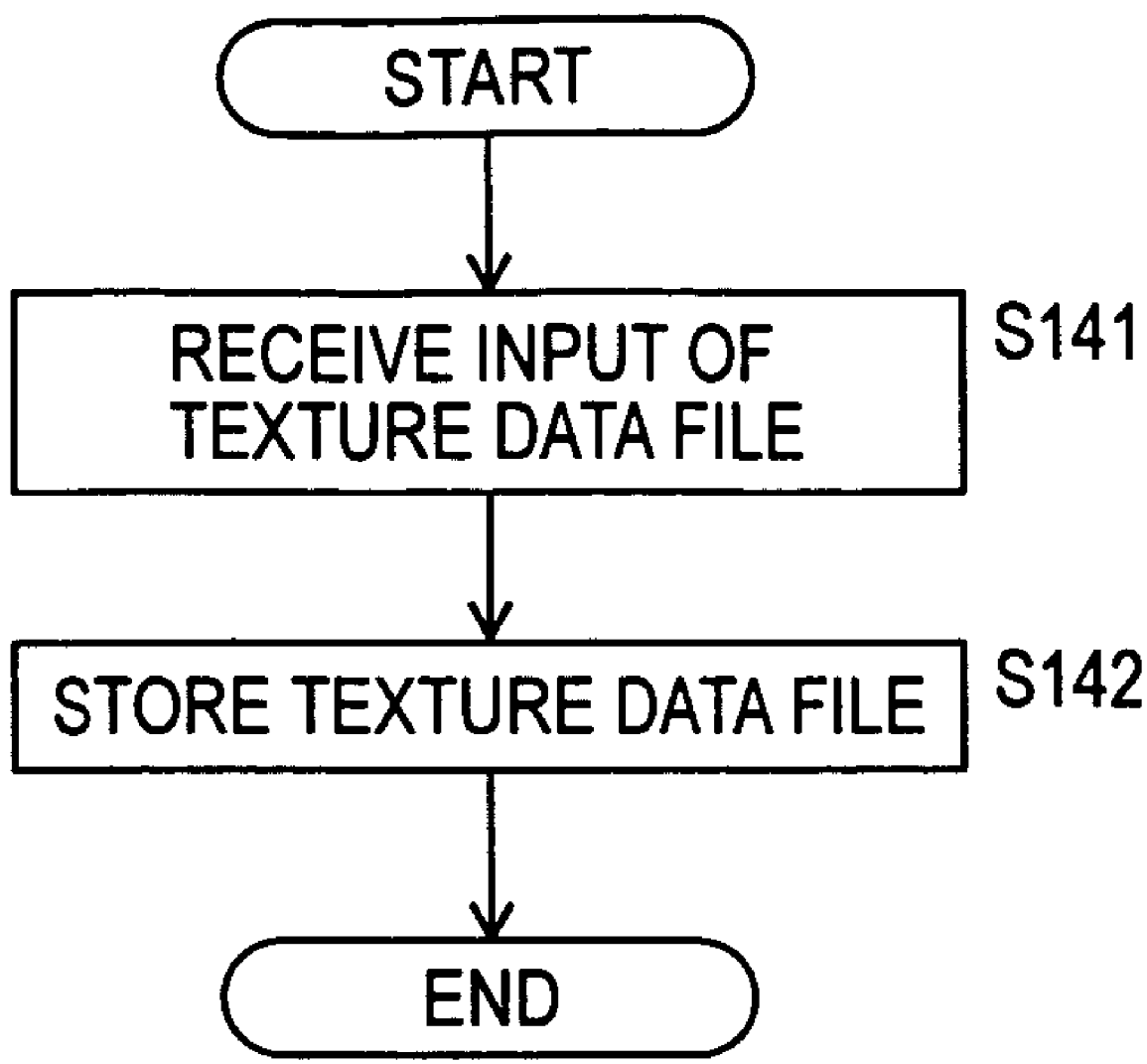
FIG. 45 is a flowchart illustrating texture storage processing.

The file storage processing by the texture data storage unit 381 shown in FIG. 33 is discussed below with reference to the flowchart of FIG. 45. This processing is performed after the texture generator 14 performs the processing shown in FIG. 36, and more specifically, after the texture generator 14 writes the texture information into the file and outputs the file.

In step S141, the texture data storage unit 381 receives the input of the texture data file, for example, the file 510 shown in FIG. 43.

In step S142, the texture data storage unit 381 stores the texture data file therein, and the processing is completed.

The texture data file is stored in the texture data storage unit 381 as discussed above.

Figure 46:
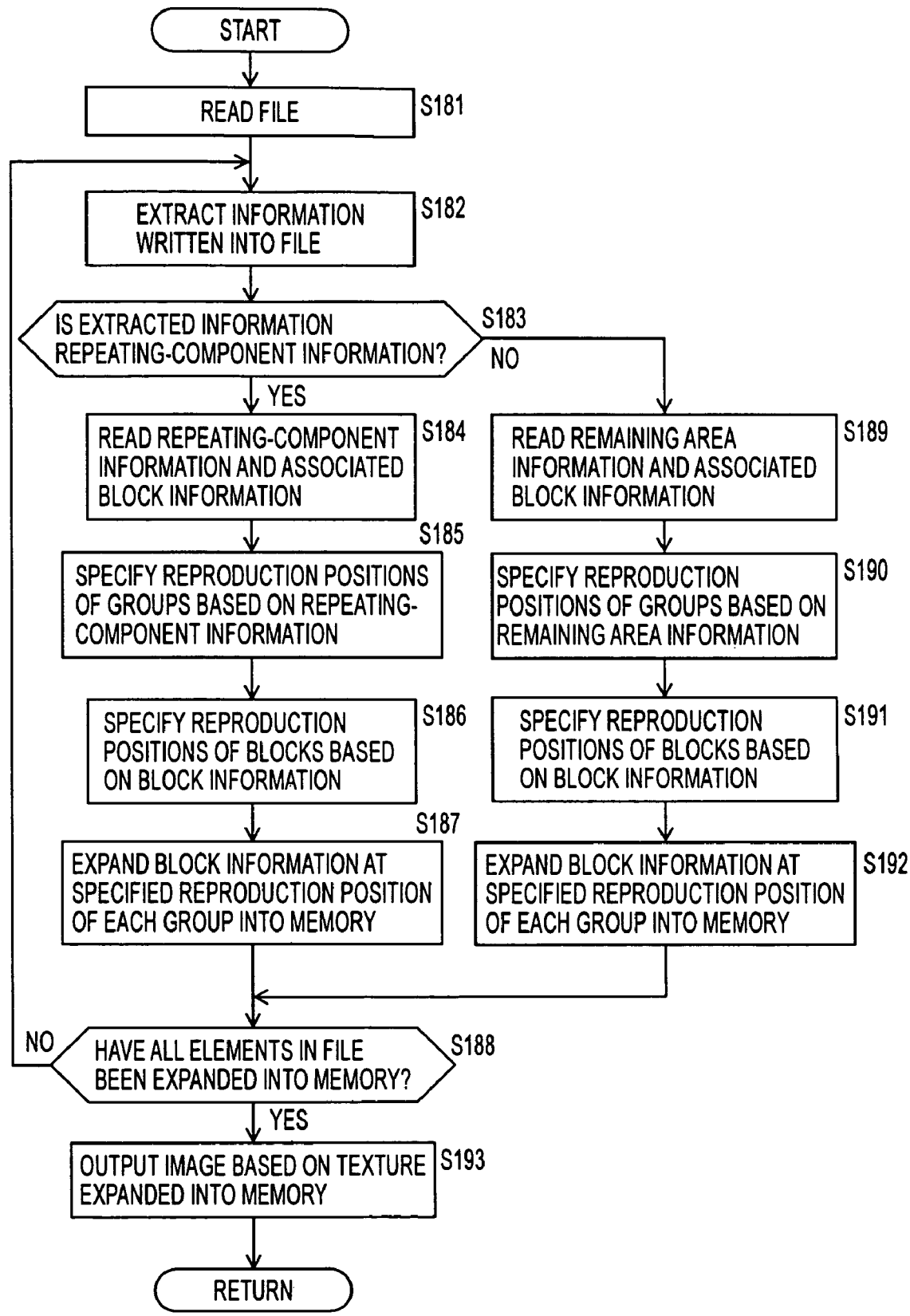
FIG. 46 is a flowchart illustrating image reproduction processing in step S15 of FIG. 2.

A description is now given, with reference to the flowchart of FIG. 46, of the image reproduction processing based on the texture data file stored in the texture data storage unit 381. This processing is performed by the image reproduction device 15 shown in FIG. 35 after the processing shown in FIG. 45, and more specifically, after storing the texture data in the texture data storage unit 381.

In step S181, the input unit 431 reads the texture data file, for example, the file 510 shown in FIG. 43, from the texture data storage unit 381.

In step S182, the input unit 431 extracts the information from the file. For example, the input unit 431 extracts the repeating-component information 511-1 and the associated block information 512-1-1 through 512-1-3 of the file 510 shown in FIG. 43.

In step S183, the reproduction-position specifying unit 432 determines whether the information extracted in step S182 is repeating-component information. For example, if the repeating-component information 511-1 and the associated block information 512-1-1 through 512-1-3 of the file 510 or the repeating remaining area information 513-1 and the associated block information 514-1-1 through 514-1-7 are extracted, the reproduction-position specifying unit 432 determines that the extracted information is repeating-component information since it contains the number-of-repetition information and repeating interval information. If, for example, the remaining area information 515-1 and the associated block information 516-1-1 through 516-1-5 are extracted, the reproduction-position specifying unit 432 determines that the extracted information is not repeating-component information since it does not contain number-of-repetition information or repeating interval information. That is, the information read in step S182 could be repeating-component information or repeating remaining area information, which is found to be repeating-component information, or remaining area information, which is found to be non-repeating-component information.

If it is determined in step S183 that the extracted information is repeating-component information, the process proceeds to step S184. In step S184, the reproduction-position specifying unit 432 reads the information extracted in step S182, i.e., the repeating-component information and the associated block information, for example, the repeating-component information 511-1 and the associated block information 512-1-1 through 512-1-3 shown in FIG. 43.

In step S185, the reproduction-position specifying unit 432 specifies the reproduction positions of the groups based on the repeating-component information. In the example shown in FIG. 43, the reproduction-position specifying unit 432 specifies the reproduction positions of a plurality of groups based on the repeating-component information 511-1, and more specifically, based on the start position information, the length information, the number-of-repetition information, and the repeating interval information of the repeating-component information 511-1, thereby specifying the positions of the areas 461-1 through 461-14 shown in FIG. 41.

In step S186, the reproduction-position specifying unit 432 specifies the reproduction positions of the blocks based on the block information. In the example shown in FIG. 43, the reproduction-position specifying unit 432 specifies reproduction positions of the blocks forming the groups (areas 461-1 through 461-14) based on the block information 512-1-1 through 512-1-3, and more specifically, based on the start position information and the length information written into the block information 512-1-1 through 512-1-3.

In step S187, the texture expander 433 expands the block information at the reproduction positions of the groups specified in steps S185 and S186. In the example shown in FIG. 43, color information written into the block information 512-1-1 through 512-1-3 is expanded into the memory for the three blocks associated with the repeating-component information 511-1. The expansion of information is to designate addresses or color information to be reproduced rather than generating an image on the screen. Since the reproduction positions of the blocks of the areas 461-1 through 461-14 are also specified in step S186, the texture expander 433 expands the color information, thereby reproducing the areas 461-1 through 461-14 shown in FIG. 41.

In step S188, the texture expander 433 determines whether all elements (information) in the file have been expanded into the memory. In this case, since the repeating information 511-2, the repeating remaining area information 513-1 and 513-2, and the remaining area information 515-1 and 515-2 are not expanded into the memory, the result of step S188 becomes NO.

Then, the process returns to step S182. In step S182, the input unit 431 extracts information that has not been expanded into the memory, for example, the repeating-component information 511-2 and the associated block information 512-2-1 through 512-2-4, from the file. In this case, the second cycle of steps S183 through S188 is similar to the first cycle of steps S183 through S188, and an explanation thereof is thus omitted. According to the processing until the second cycle of step S187, in addition to the areas 461-1 through 461-14 shown in FIG. 41, the areas 466-1 through 466-13 are reproduced.

It is then determined in step S188 that not all the elements in the file have been expanded into the memory, and the process returns to step S182. In the third cycle of step S182, the repeating remaining area information 513-1 and the associated block information 514-1-1 through 514-1-7 shown in FIG. 43 are extracted. The third cycle of steps S183 through S188 are similar to those of the first or second cycle of steps S183 through S188, and an explanation thereof is thus omitted.

It is then determined in step S188 that not all the elements in the file have been expanded into the memory, and the process returns to step S182. In the fourth cycle of step S182, the repeating remaining area information 513-2 and the associated block information 514-2-1 through 514-2-4 are extracted. The fourth cycle of steps S183 through S188 are similar to those of the first, second, or third cycle of steps S183 through S188, and an explanation thereof is thus omitted. According to the processing of the third cycle of steps S182 through S188 and the processing of the fourth cycle of steps S182 through S187, the areas 471-1 through 471-13 are reproduced in addition to the areas 461-1 through 461-14 and the areas 466-1 through 466-13. That is, since the area 471 is formed of two groups, i.e., the two repeating remaining area information 513-1 and 513-2, the processing of steps S182 through S188 is repeated twice (third and fourth cycles), thereby reproducing the area 471. It is then determined in step S188 that not all the elements in the file have been expanded into the memory, and the process then returns to step S182.

In the fifth cycle of step S182, the input unit 431 extracts the remaining area information 515-1 and the associated block information 516-1-1 through 516-1-5 shown in FIG. 43. Then, in step S183, the reproduction-position specifying unit 432 determines whether the remaining area information 515-1 and the associated block information 516-1 through 516-15 extracted in step S182 are repeating-component information. In this case, it is determined that the remaining area information 515-1 and the associated block information 516-1 through 516-15 are not repeating-component information since no number-of-repetition information or repeating interval information is set.

Then, the process proceeds to step S189 in which the reproduction-position specifying unit 432 reads the remaining area information 515-1 and the associated block information 516-1 through 516-15 extracted in step S182.

In step S190, the reproduction-position specifying unit 432 specifies the reproduction positions of the groups based on the remaining area information, and more specifically, based on the start position information and the length information of the remaining area information 515-1, thereby specifying the position of the area 91 shown in FIG. 41.

In step S191, the reproduction-position specifying unit 432 specifies the reproduction positions of the blocks based on the block information 516-1-1 through 516-1-5, and more specifically, based on the start position information and the length information written into the block information 516-1-1 through 516-1-5.

In step S192, the texture expander 433 expands the block information at the reproduction positions of the groups specified in steps S190 and S191. Since the area 491 is formed of five blocks, the color information written into the block information 516-1-1 through 516-1-5 is expanded into the memory. The expansion of information is to designate addresses or color information to be reproduced rather than generating an image on the screen. Then, the area 491 shown in FIG. 41 is reproduced.

Then, the texture expander 433 determines in step S188 whether all the elements (information) have been expanded into the memory. In this case, since the remaining area information 515-2 and the associated block information 516-2-1 through 516-2-3 are not expanded, the outcome of step S188 becomes NO, and the process returns to step S182.

In the sixth cycle of step S182, the remaining area information 515-2 and the associated block information 516-2-1 through 516-2-3 are extracted. Then, steps S183, S189 through S192, and S188 are similar to those when the remaining area information 515-1 is extracted, and an explanation thereof is thus omitted. As a result, the area 492 shown in FIG. 41 is expanded. It is then determined in step S188 that all the elements in the file have been expanded into the memory, and the process proceeds to step S193.

In step S193, the image output unit 434 outputs an image based on the texture (group and block information) expanded into the memory by the texture expander 433. That is, image data to be displayed on the screen is generated based on the addresses and color information to be reproduced, and is then output. In this example, the image 490 (texture) shown in FIG. 41 is output. Then, the process is returned to step S15 shown in FIG. 2.

According to the processing shown in FIG. 46, the image can be reproduced based on the texture data file.

As discussed with reference to FIGS. 33 through 46, texture can be generated and processed while maintaining the features of the texture by repeating components and associated components. Since a file can be formed from the texture generated based on the repeating components, the memory capacity can be saved, and the processing cost can be decreased.

According to the texture generator 14 discussed with reference to FIGS. 33 through 46, the repeating-component extracting unit 402 extracts repeating components (repeatedly appearing, similar image components) from the image (for example, step S92 in FIG. 36). Then, the repeating-component adjusting unit 403 adjusts the arrangement of the repeating components by equally locating the repeating components at regular intervals (for example, steps S94 and S95 in FIG. 36). Then, the remaining area interpolator 404 interpolates the representative value of the areas without repeating components in the areas in which repeating components are not located (for example, steps S98 and S99 in FIG. 36). The file generator 405 then generates feature information concerning the features of the repeating components and the location thereof of the interpolated image (for example, step S100 in FIG. 36). Thus, the texture can be generated and processed while maintaining the features of the texture.

According to the image reproduction device 15 discussed with reference to FIGS. 33 through 46, feature information concerning the features of repeatedly appearing, similar components and the locations thereof is obtained, and the image is reproduced based on the obtained feature information. Thus, the texture can be generated and processed while maintaining the features of the texture by the repeating components and the associated components. Since a file is formed based on the texture generated based on the repeating components, the memory capacity can be saved, and the processing cost can be decreased. Additionally, according to the image reproduction device 15, the plain image can be reproduced based on the features of the texture by the repeating components and the associated components.

The texture generator 14 shown in FIG. 33 generates a file of the texture data and the texture data storage unit 381 stores the texture data file therein. However, instead of the file, the texture data (i.e., texture data including the feature information indicating the repeating components and the locations thereof generated until step S99 of FIG. 36) may be simply stored in the texture data storage unit 381. In this case, step S100 in FIG. 36 is omitted, and the texture data itself is handled rather than the texture data file in the processing of FIG. 45. In step S181 in FIG. 46, the texture data itself is read rather than the file.

Figure 47:
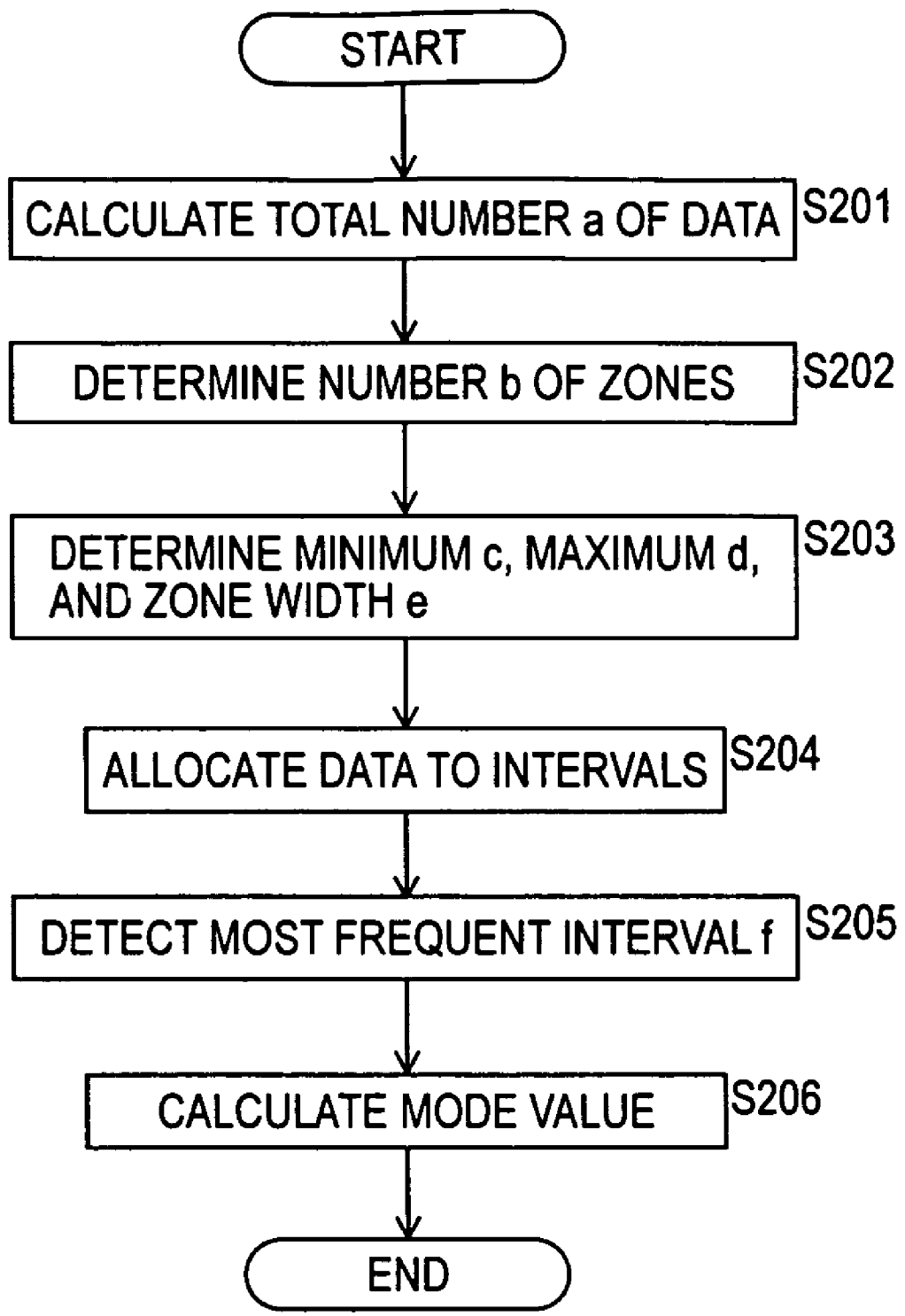
FIG. 47 is a flowchart illustrating mode value calculating processing.
Figure 48:
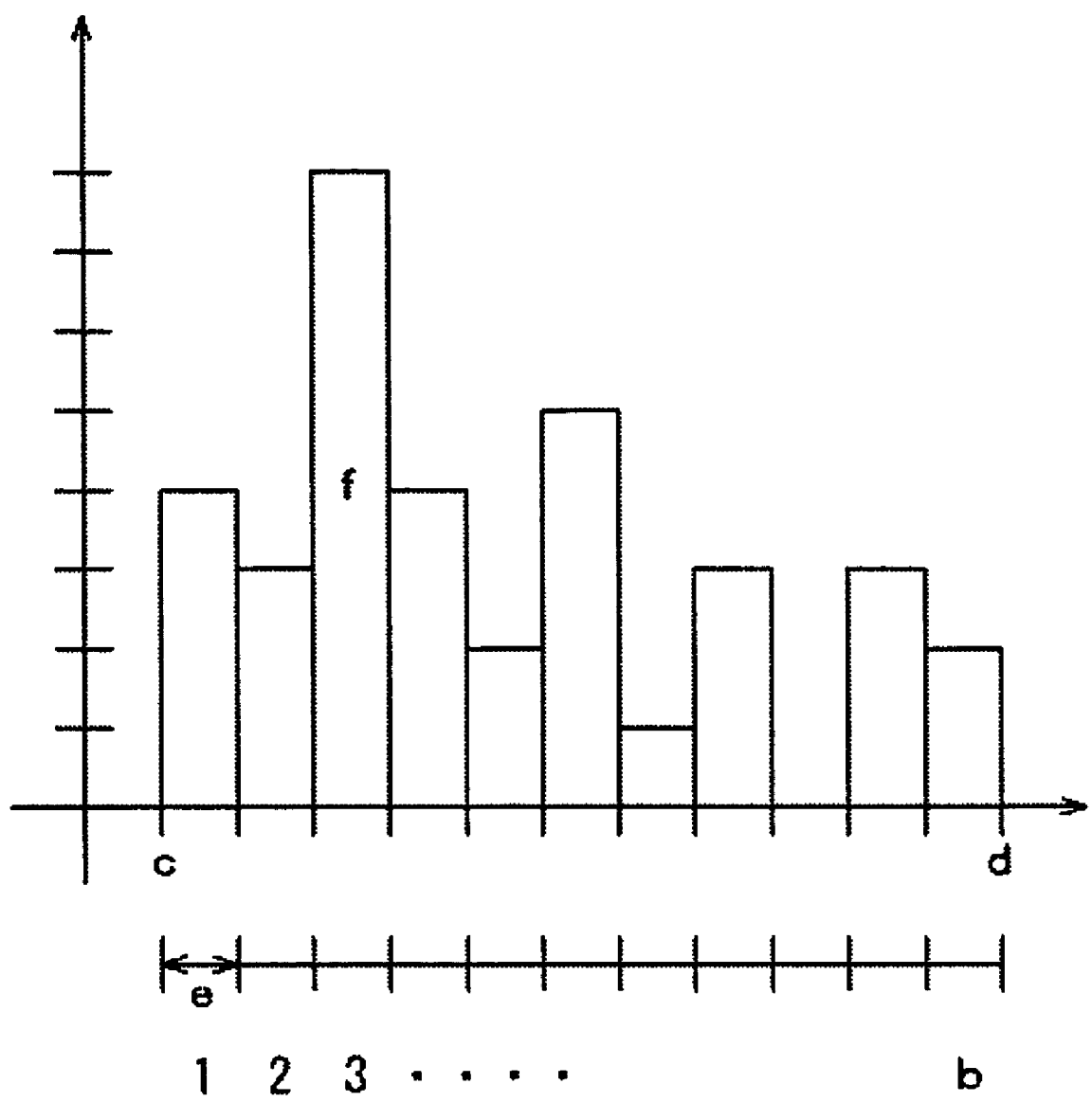
FIG. 48 illustrates the calculation of a mode value.

An example of the calculating method for a mode value is described below with reference to FIGS. 47 and 48. In this case, the mode value calculated in step S36 of FIG. 7 is discussed.

In step S201, the edge appearance interval calculator 53 calculates the total number a of data. In the example shown in FIG. 9, the edge appearance interval calculator 53 calculates all edge pairs (all combinations of two edges) of the plurality of edges as the total number a of data.

In step S202, the edge appearance interval calculator 53 sets the number b of intervals. More specifically, the edge appearance interval calculator 53 determines the number of divisions (number b of zones) by using the Zeller's formula. For example, if a histogram shown in FIG. 48 is formed, the number b of zones is set to be 11.

In step S203, the edge appearance interval calculator 53 sets the minimum value c, the maximum value d, and the zone width e. In the example shown in FIG. 9, the interval 101-1 is set to be the minimum value c, the interval 101-11 is set to be the maximum value d, and the length from the minimum value c to the maximum value d is divided by the number b of zones set in step S202, resulting in the zone width e.

In step S204, the edge appearance interval calculator 53 allocates the data to the zones. Then, the intervals 101-1 through 101-11, 102-1 through 102-3, 103-1, 103-2, and 104-1 shown in FIG. 9 are allocated, as indicated in FIG. 48.

Then, in step S205, the edge appearance interval calculator 53 detects the most frequent zone f. In the example shown in FIG. 48, the zone having the largest number of intervals is set to be the most frequent zone f. A predetermined range is allowed for the intervals fallen in the most frequent zone f, and thus, the intervals are not equal.

In step S206, the edge appearance interval calculator 53 calculates the mode value. More specifically, the edge appearance interval calculator 53 calculates the mode value by the following equation: mode value=minimum value c+2.5×zone width e (minimum value c+2×zone width e<mode value<minimum value c+3×zone width e). Then, the processing is completed.

According to the processing discussed with reference to FIGS. 47 and 48, the mode value is calculated by the histogram. Since all the intervals included in a predetermined range on the histogram are set to be the mode value, as shown in FIG. 48, the mode value is represented by a predetermined range.

The foregoing processing is described below with reference to FIGS. 1 and 49.

Figure 49:
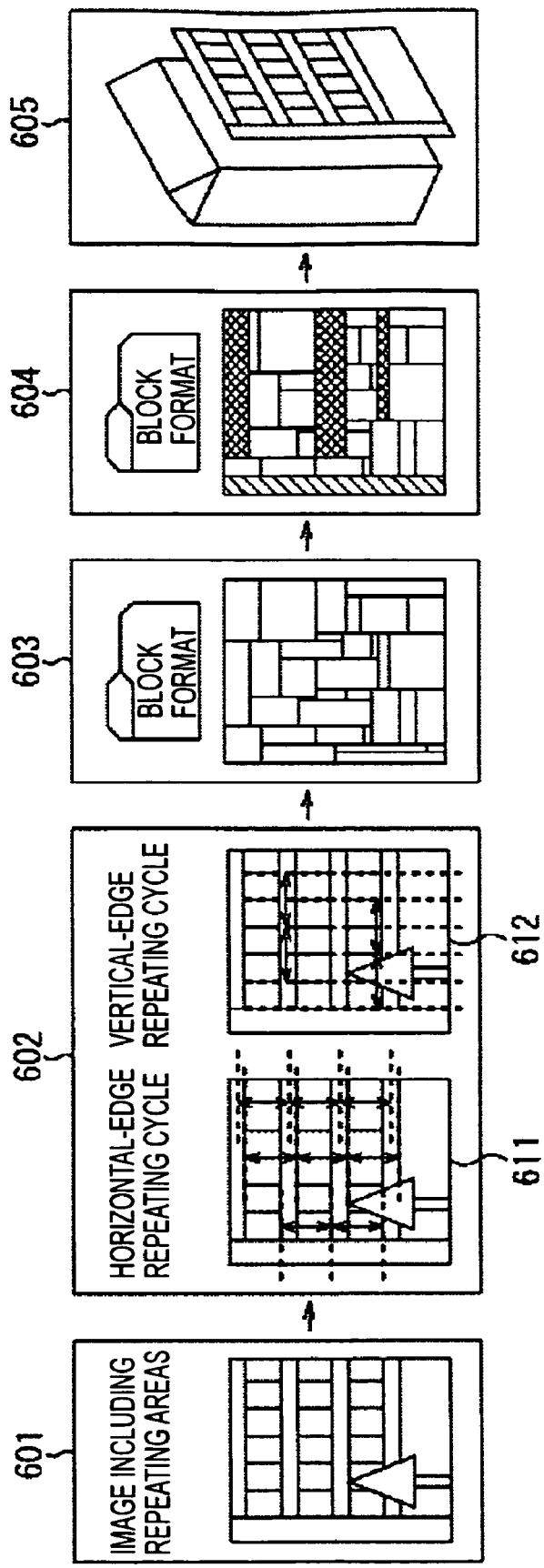
FIG. 49 illustrates the overall flow of an embodiment of the present invention.

Information indicating an image 601 including repeating areas shown in FIG. 49 is input into the repeating-cycle extracting device 11. The repeating-cycle extracting device 11 extracts horizontal-edge repeating cycle data 611 and vertical-edge repeating cycle data 612 from the image 601, and outputs the data 611 and 612 to the block forming device 12 as repeating cycle data 602 (repeating cycle data 21 shown in FIG. 1). The block forming device 12 forms the image 602 into blocks based on the repeating cycle data 602 containing the horizontal-edge repeating cycle data 611 and the vertical-edge repeating cycle data 612, and outputs the block image to the consecutive-area extracting device 13 as block image data 603 (block image data 22 shown in FIG. 1). The consecutive-area extracting device 13 divides the blocks into areas based on the block image data 603 and integrates similar areas into image data 604 (consecutive area data 23 shown in FIG. 1), and outputs the image data 604 to the texture generator 14.

The texture generator 14 generates texture data image file 605 (texture data 24 shown in FIG. 1) reflecting repetitions based on the image data 604 (consecutive area data 23). In this case, the texture data storage unit 381 may store the texture data file therein. The image reproduction device 15 then reproduces the image based on the texture data image file 605.

As discussed above, the repeating-cycle extracting device 11 can extract a repeating cycle based on the repeating components of the major edges of the image. The block forming device 12 can generate a block image formed of blocks having desired sizes containing the features of the repeating components of the image, thereby making it possible to decrease the amount of image data. The consecutive-area extracting device 13 can extract consecutive areas in the image to generate an image having the integrated consecutive areas. The texture generator 14 can generate an image file of the texture data reflecting repetitions, thereby making it possible to save the memory capacity and to decrease the processing cost. Additionally, the size of the texture data image file can be smaller than the input image. Since the image reproduction device 15 reproduces the image based on the texture data, the image reflecting the features of the texture can be generated and reproduced quickly.

Figure 50:
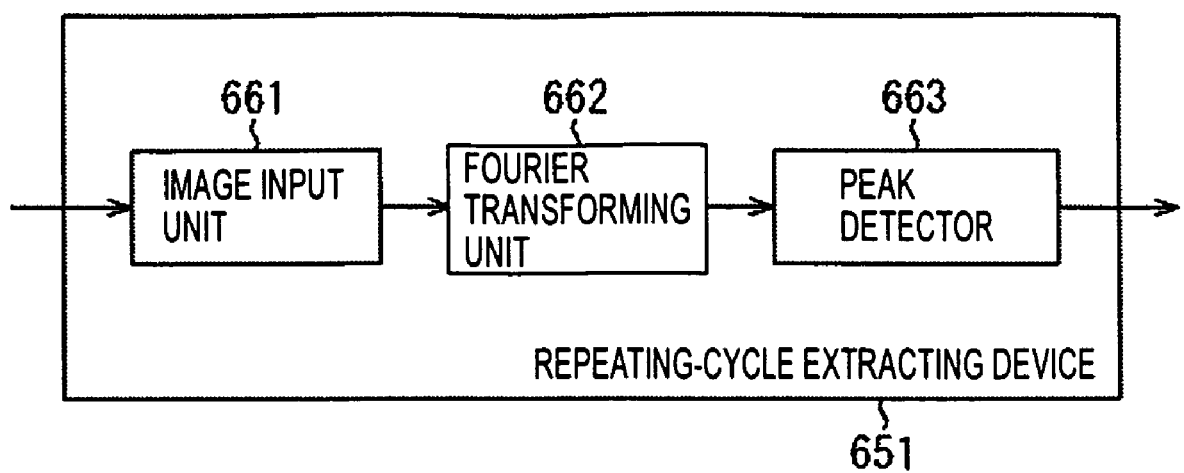
FIG. 50 is a block diagram illustrating an example of the functional configuration of a repeating-cycle extracting device.
Figure 51:
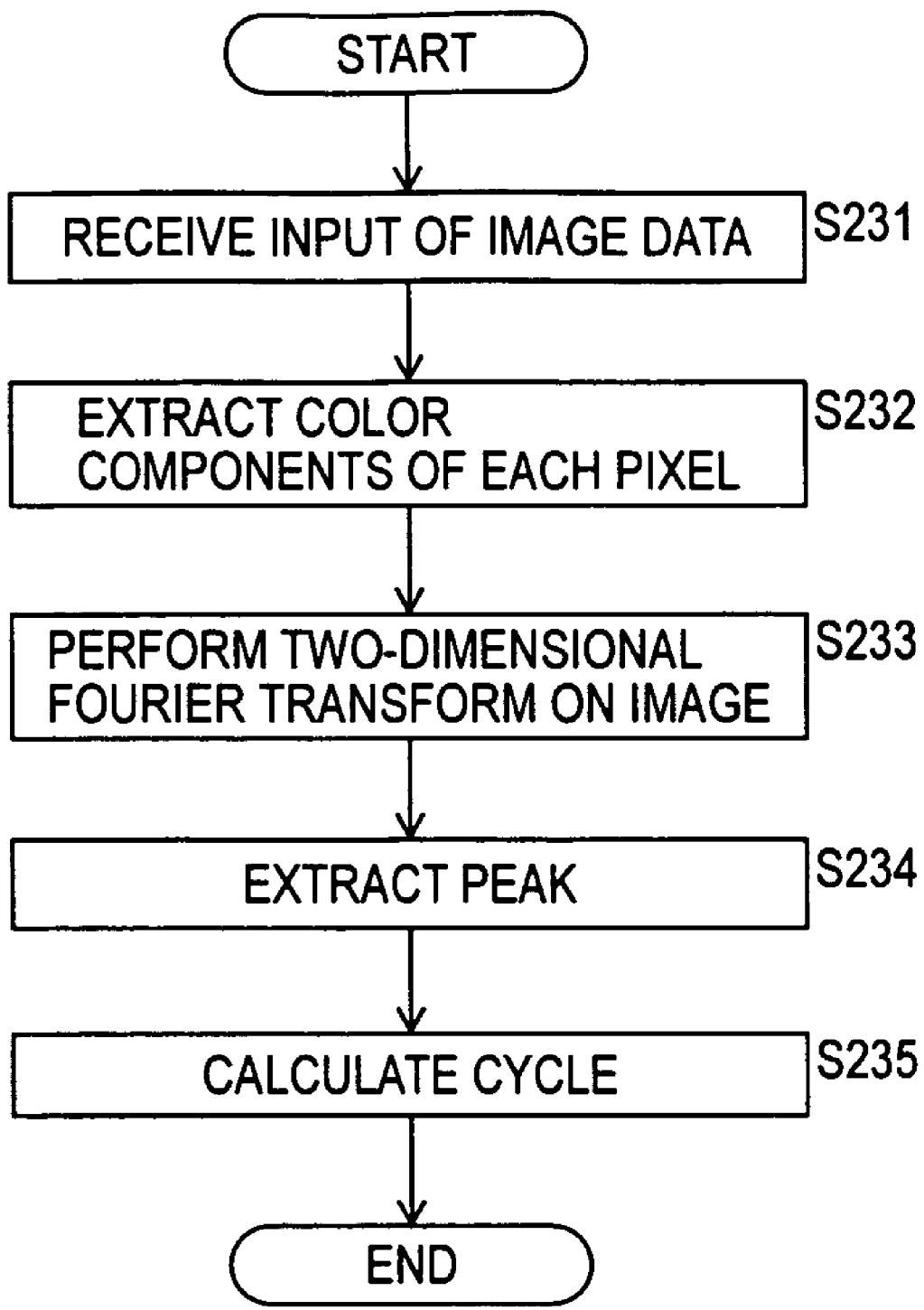
FIG. 51 is a flowchart illustrating repeating-cycle extracting processing.

For example, a repeating-cycle extracting device 651 shown in FIG. 50 includes an image input unit 661, a Fourier transforming unit 662, and a peak detector 663, and extracts a repeating cycle by performing the processing shown in FIG. 51.

In FIG. 51, in step S231, the image input unit 661 receives the input of image data. Then, in step S232, the image input unit 661 extracts color components of each pixel. In step S233, the Fourier transform unit 662 performs two-dimensional Fourier transform on the image. In step S234, the peak detector 663 extracts the peak. In step S235, the peak detector 663 calculates the cycle.

According to the configuration and the processing shown in FIGS. 50 and 51, the single major edge cycle can be calculated. In contrast, in the repeating-cycle extracting device 11 discussed with reference to FIGS. 3 through 11, a plurality of major edge cycles can be found.

Figure 52:
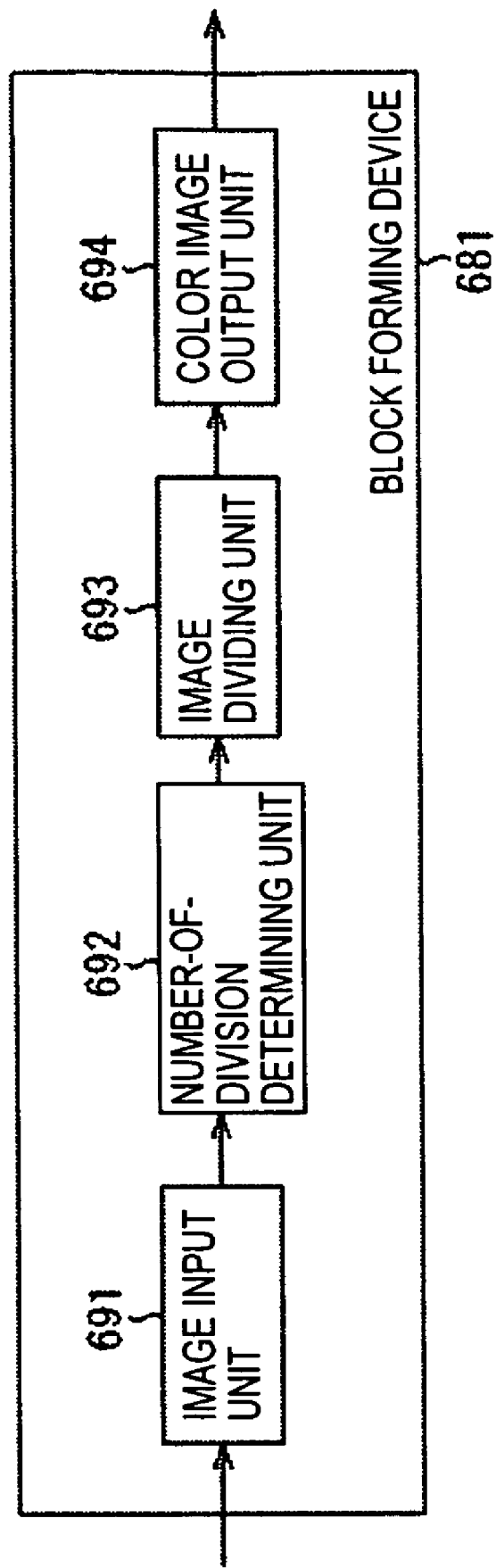
FIG. 52 is a block diagram illustrating an example of the functional configuration of a block forming device.
Figure 53:
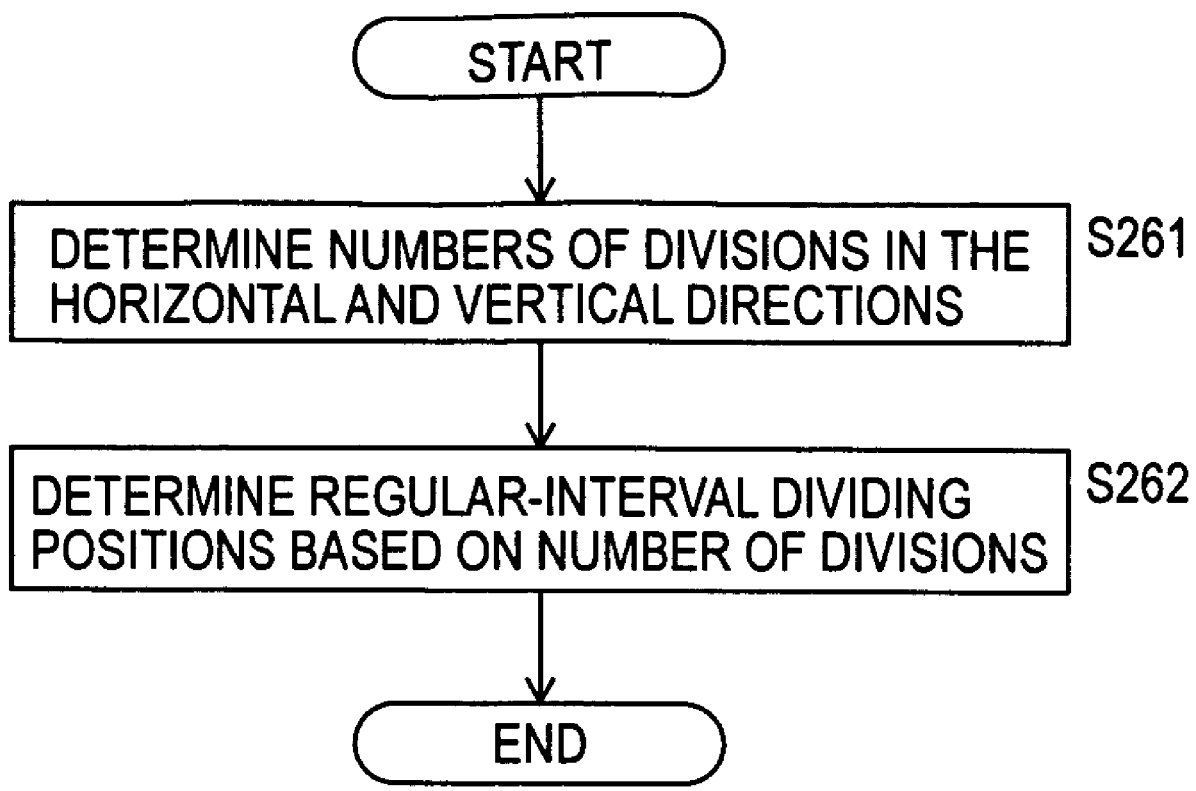
FIG. 53 is a flowchart illustrating block forming processing.

A block forming device 681 shown in FIG. 52 includes an image input unit 691, a number-of-division determining unit 692, an image dividing unit 693, and a color image output unit 694, and forms the image into blocks by performing the processing shown in FIG. 53.

In FIG. 53, in step S261, the number-of-division determining unit 692 determines the number of divisions in the horizontal direction and the vertical direction based on the image input into the image input unit 691. Then, in step S262, the image dividing unit 693 sets the regular-interval dividing positions based on the number of divisions.

According to the configuration and the processing shown in FIGS. 52 and 53, the image can be divided at regular intervals. According to the block forming device 12 discussed with reference to FIGS. 12 through 16, the image can be divided into blocks having desired sizes by reflecting the features of the image. According to the consecutive-area extracting device 13 discussed with reference to FIGS. 17 through 32, consecutive areas in the horizontal direction and the vertical directions can be extracted from the image, and the image can be formed into blocks based on the consecutive areas. By the application of this technique to an image of a building, the image can be divided into parts, such as windows or walls, and the divided parts can be reused.

Figure 54:
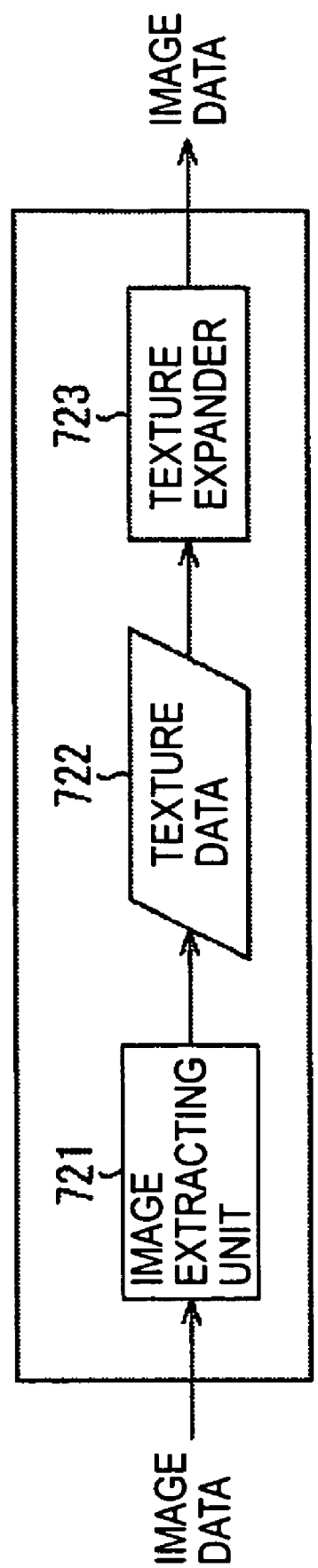
FIG. 54 illustrates the extraction of an image and the expansion of texture.
Figure 55:
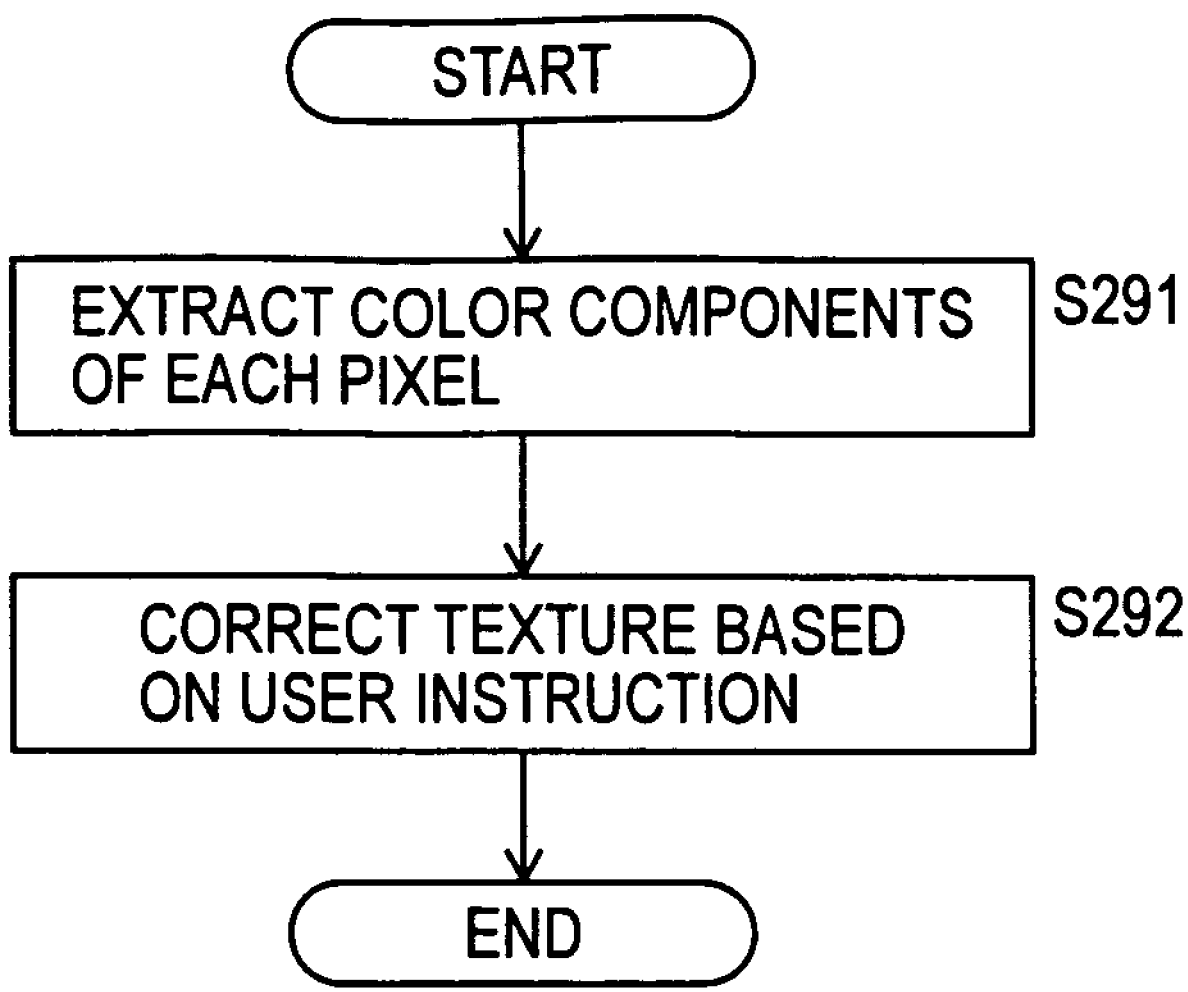
FIG. 55 is a flowchart illustrating image extraction processing.
Figure 56:
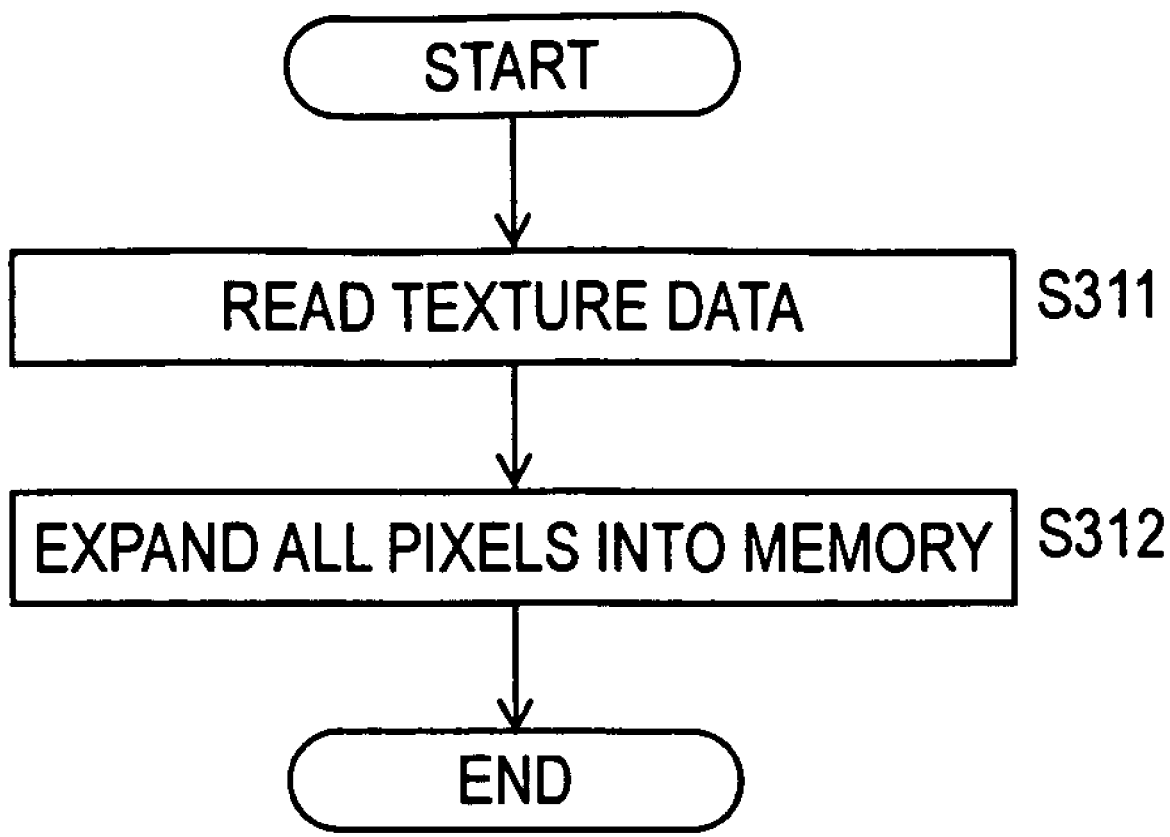
FIG. 56 is a flowchart illustrating texture expansion processing.

In the configuration shown in FIG. 54 in which texture data 722 is output from an image extracting unit 721 and is input into a texture expander 723, the image can be extracted and texture can be expanded by performing the processing shown in FIGS. 55 and 56.

In FIG. 55, in step S291, the image extracting unit 721 extracts color components of each pixel. Then, in step S292, the image extracting unit 721 modifies texture based on a user's instruction, and then outputs the modified texture as the texture data 722.

In FIG. 56, in step S311, the texture expander 723 reads the texture data 722, and in step S312, the texture expander 723 expands all the pixels into the memory.

According to the configuration and processing shown in FIGS. 54 and 55, the texture can be modified in response to a user's instruction. According to the texture generator 14 discussed with reference to FIGS. 33 through 46, texture data can be generated based on the repeating components contained in an image, and since a texture data file is formed based on repetitions, the memory capacity can be saved. According to the image reproduction device 15 discussed with reference to FIGS. 33 through 46, the image can be reproduced based on the texture data. According to the texture generator 14 and the image reproduction device 15, when forming a map based on an image, a plain map can be formed without impairing the atmosphere of a building. Since the texture file is formed based on repetitions, the memory capacity can be saved, and the processing cost can be reduced. The file size is smaller compared to when the input image is stored.

According to the texture generator 14, when forming a three-dimensional map, since texture data is generated based on repetitions of an image photographed by a digital still camera, and unnecessary information, for example, telegraph wires, trees, and shadows, contained in the image can be excluded from the resulting texture data. This saves the user removing the unnecessary information by the input operation. Thus, the three-dimensional map can be generated at low cost without the need for the user to take any trouble. In the image reproduction device 15, the image without unnecessary information can be reproduced based on this texture data, thereby making it possible to form a plain map. Additionally, since the texture generator 14 generates a texture data file based on the features of repeating components while preventing the multiple writing of repeating components (groups) into the file, the amount of data in a database is not increased. When generating an image used for a general-purpose map, the image provided with only the features is simpler when adding character information or icons on the map than an ordinary image. Thus, a plain map can be provided for the user.

In the above-described example, in the image processing system 1 shown in FIG. 1, the repeating cycle data 21 is supplied to the block forming device 12 from the repeating-cycle extracting device 11, and the block forming device 12 forms the image into blocks based on the repeating cycle data 21. Alternatively, a mosaic image photographed by a digital still camera may be input into the block forming device 12 and is formed into blocks. As a specific example of the mosaic image data, low-resolution mosaic image data is described below with reference to FIGS. 57 through 72.

Figure 57:
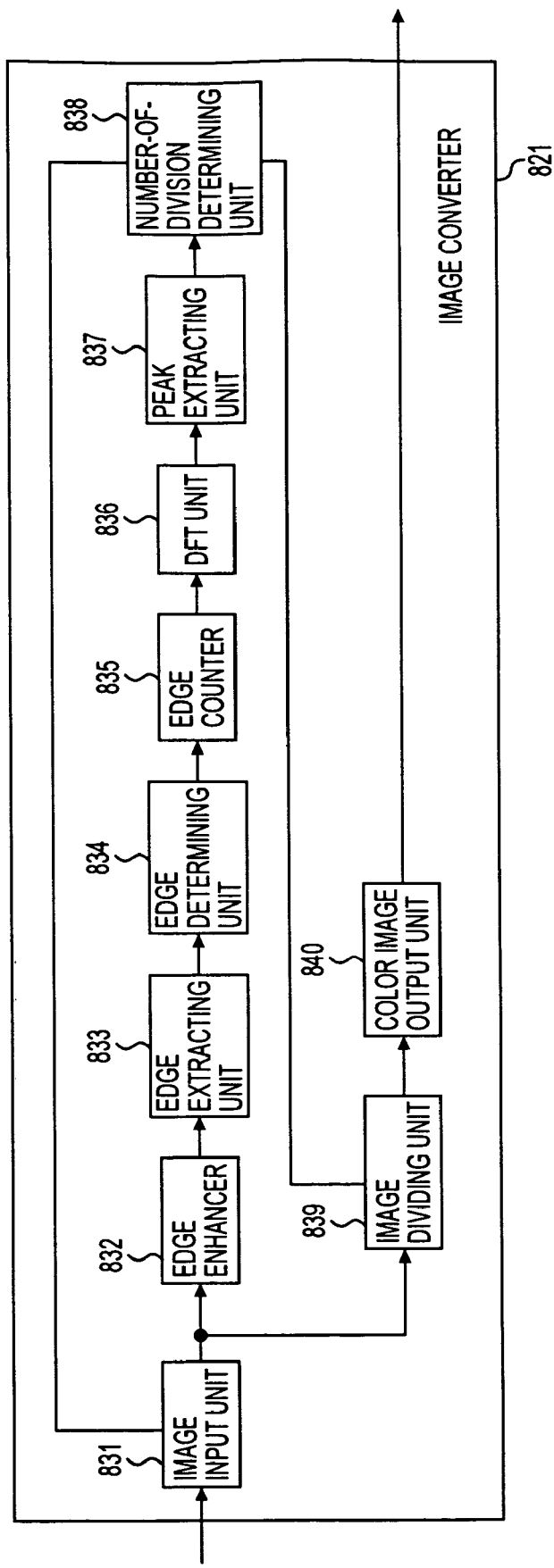
FIG. 57 is a block diagram illustrating an example of the configuration of an image converter.

FIG. 57 is a block diagram illustrating an example of the configuration of an image converter 821 for converting images.

In this image converter 821, an input image is converted into a low-resolution image which is recognizable by the human eye.

An image input unit 831 receives an input image, detects the image size (the number of pixels in the horizontal and vertical directions), and outputs the image size to a number-of-division determining unit 838. The image input unit 831 also separates the input image into red (R), green (G), and blue (B) components to determine the luminance, and outputs information concerning the determined luminance to an edge enhancer 832. The image input unit 831 outputs the received input image to an image dividing unit 839.

The edge enhancer 832 performs processing on the input image by using an edge enhancement filter to enhance the edges of the input image, and outputs the resulting input image to an edge extracting unit 833. The edge enhancement filter is, for example, a Laplacian filter. However, the edge enhancement filter is not restricted to this type, and may be another filter as long as the filter can enhance edges. Details of the edge enhancement filter are described below.

The edge extracting unit 833 performs edge extracting filtering processing on the image with enhanced edges input from the edge enhancer 832 to generate an image formed of only edges (for example, a binary image in which the pixel values of the pixels forming the edges are 1, and the other pixels are 0), and outputs the resulting image to an edge determining unit 834. The edge extracting filter may be, the Roberts edge detecting filter, the Prewitt edge detecting filter, or the Sobel edge detecting filter, and may be another filter as long as the filter can extract edges. Details of the edge extracting filter are described below.

The edge determining unit 834 determines whether each pixel of the image having edges extracted by the edge extracting filter and input by the edge extracting unit 833 is a pixel which is likely to be an edge, and outputs information concerning pixels which are likely to be edges to an edge counter 835. More specifically, if the pixel values of the pixels of the edges are 1 and the pixel values of the other pixels are 0, the pixel values of the pixels which are likely to be edges should be 1 after being processed by the edge enhancer 832 and the edge extracting unit 833. Accordingly, when the pixel value of each pixel is 1, the edge determining unit 834 regards the corresponding pixel as a pixel which is likely to be an edge, and outputs information concerning such pixels to the edge counter 835.

The edge counter 835 counts the number of pixels which are likely to be edges for each horizontal or vertical coordinate position of the image, and outputs the counting result to a discrete Fourier transform (DFT) unit 836.

The DFT unit 836 performs DFT processing on the pixels which are likely to be edges for each coordinate position in the horizontal or vertical direction input from the edge counter 835 so as to generate a power spectrum (sum of squares of Fourier series pair (pair of a real-part coefficient and an imaginary-part coefficient) as a result of performing DFT) in the vertical or horizontal direction with respect to the horizontal or vertical spatial frequency (reciprocal of the spatial cycle (interval) at which edges appear) corresponding to the edge cycle (spatial cycle (interval)), and outputs the power spectrum to a peak extracting unit 837.

The peak extracting unit 837 detects the spatial frequency, which is the peak position, from the power spectrum in the horizontal or vertical direction input from the DFT unit 836, and outputs information concerning the detected spatial frequency to the number-of-division determining unit 838.

The number-of-division determining unit 838 determines the numbers of divisions from the information concerning the image size input from the image input unit 831 and from the information concerning the spatial frequency, and outputs information concerning the numbers of divisions to the image dividing unit 839. That is, since the spatial frequency is the reciprocal of the edge appearance cycle, the number-of-division determining unit 838 determines the numbers of divisions of the image so that a mosaic block corresponding to the edges can be generated. More specifically, the number-of-division determining unit 838 founds the reciprocal of the spatial frequency to determine the edge cycle (represented by the number of pixels indicating the interval at which the edges appear), and determines the numbers of divisions by dividing the numbers of horizontal and vertical pixels of the image size by the number of pixels of the edge cycle.

The image dividing unit 839 divides the input image by the numbers of divisions in the horizontal and vertical directions input from the number-of-division determining unit 838, and outputs the divided image to a color image output unit 840. That is, the image dividing unit 839 divides the input image into a mosaic block-unit image by the numbers of divisions in the horizontal and vertical directions.

The color image output unit 840 sets, for example, the median value or the mode value, to be the representative value of the pixel values of all the pixels contained in each mosaic block image divided by the image dividing unit 839, and substitutes the pixel values of all the pixels by the representative value. By performing this processing on all the blocks forming the input image, the color image output unit 840 forms the input image into a low-resolution mosaic image and outputs it.

The mosaic image conversion processing performed by the image converter 821 shown in FIG. 57 is discussed below with reference to the flowchart of FIG. 58.

In step S421, the image input unit 831 receives an input image, detects the image size, and outputs the image size to the number-of-division determining unit 838, and also outputs the input image to the image dividing unit 839.

In step S422, the image input unit 831 separates each pixel of the image into R, G, and B components to determine the luminance, and outputs information concerning the luminance to the edge enhancer 832.

In step S423, the edge enhancer 832 performs edge enhancement processing on the input image by using an edge enhancement filter to enhance the edges of the input image, and outputs the resulting image to the edge extracting unit 833.

The edge enhancement filter used for the processing by the edge enhancer 832 is as follows.

Figure 59A:
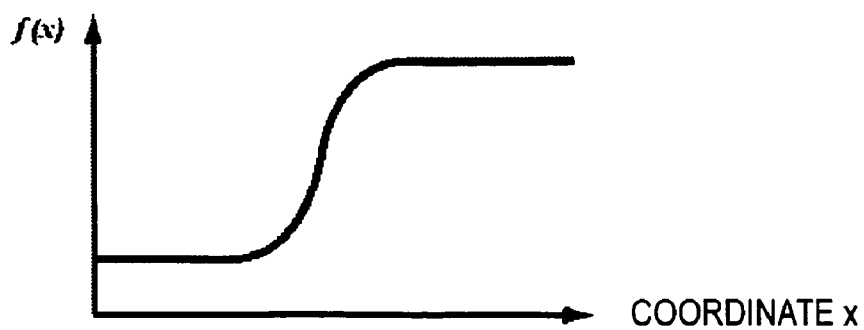
FIGS. 59A through 59D illustrate Laplacian filters.
Figure 59B:
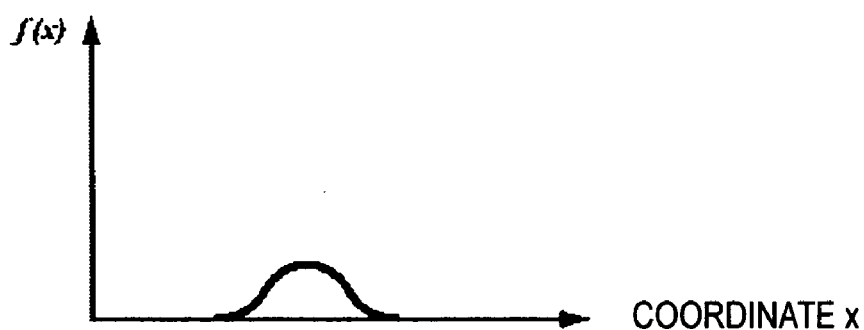
Figure 59C:
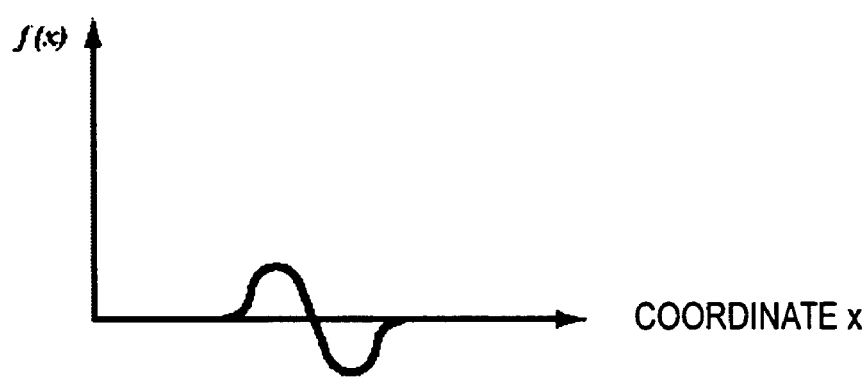
Figure 59D:
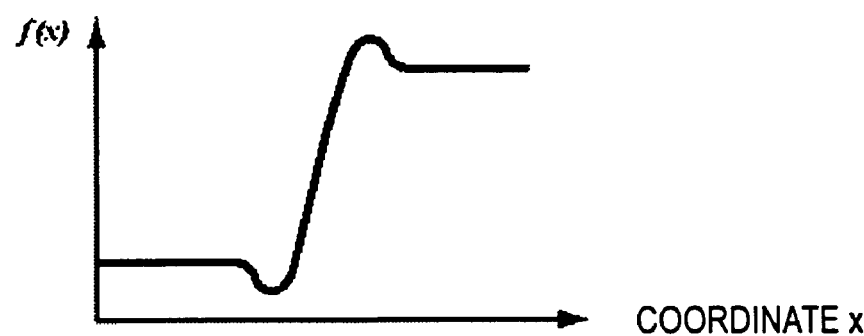

The edge enhancement filter is, for example, the above-described Laplacian filter. The operating principle of the Laplacian filter is as follows. If, for example, the luminance value f(x) of the input image forms an edge portion in the spatial direction x, as shown in FIG. 59A, (if a level difference is observed, as shown in FIG. 59A), the first derivative operation is conducted on f(x), resulting in the first derivative value f(x)' having a curve in the form of a projection, as shown in FIG. 59B. The second derivative value f(x)" is, as shown in FIG. 59C, a sine-wave curve. The second derivative value f(x)" is subtracted from the original luminance value f(x), resulting in a waveform shown in FIG. 59D. In this waveform, a recessed portion and a projection portion, which are not contained in the edge portion of the original image, are generated at the position at which the luminance value starts to change and at the position at which the luminance value finishes changing, respectively. As a result, a change in the density of the edge portion is enhanced.

A calculation method for pixel values to enhance edges by the Laplacian filter is discussed below.

Figure 60A:
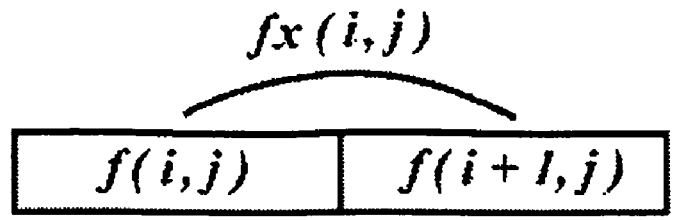
FIGS. 60A through 60D illustrate an approach to determining first derivatives and second derivatives.
Figure 60B:
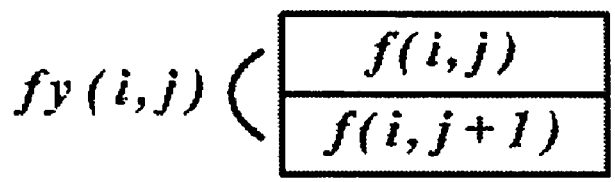

In the image digital processing, the first derivative value is found by the difference in the luminance values between pixels. That is, it is now assumed that pixels f(i,j),f(i+1,j) are disposed, as shown in FIG. 60A, in the horizontal direction and that pixels f(i,j),f(i,j+1) are disposed, as shown in FIG. 60B, in the vertical direction. When the first derivative value between horizontal pixels is fx(i,j), and when the first derivative value between vertical pixels is fy(i,j), the first derivative values are calculated according to equations (1) and (2).

$$fx(i,j)=f(i+1,j)-f(i,j) \quad (1)$$

$$fy(i,j)=f(i,j+1)-f(i,j) \quad (2)$$

Figure 60C:
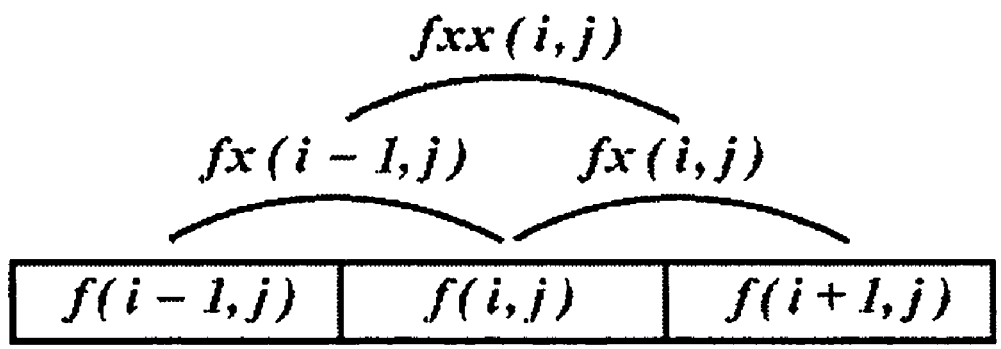
Figure 60D:
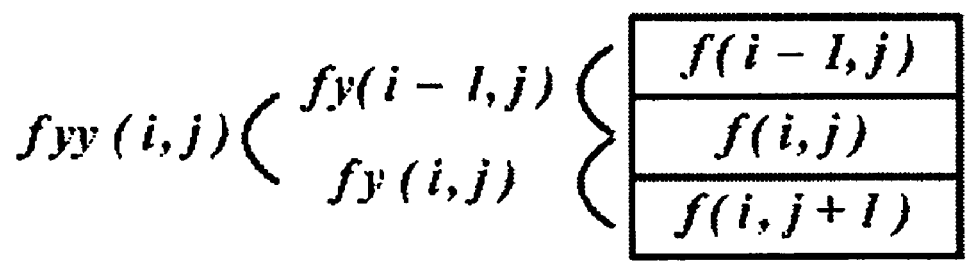
Figure 62A:
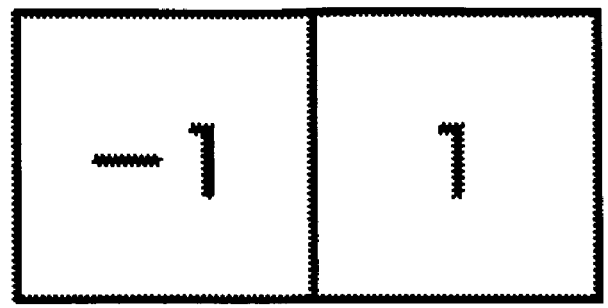
Figure 62B:
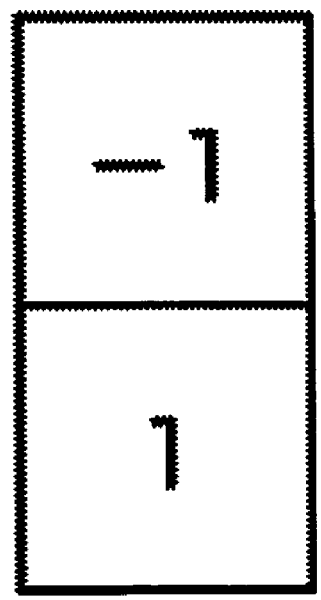

As the second derivative value, the difference of the first derivative value is used. That is, it is now assumed that pixels f(i−1,j),f(i,j),f(i+1,j) are disposed, as shown in FIG. 60C, in the horizontal direction and that pixels f(i,j−1),f(i,j),f(i,j+1) are disposed, as shown in FIG. 60D, in the vertical direction. When the second derivative value between horizontal pixels is fxx, and when the second derivative value between vertical pixels is fyy, the second derivative values can be calculated according to equations (3) and (4).

$$fxx(i,j) = fx(i,j) - fx(i+1,j) \quad (3)$$
$$= \{f(i+1,j) - f(i,j)\} - \{f(i,j) - f(i-1,j)\}$$
$$= f(i+1,j) - 2 \times f(i,j) + f(i-1,j)$$

$$fyy(i,j) = fy(i,j+1) - fy(i,j) \quad (4)$$
$$= \{f(i,j+1) - f(i,j)\} - \{f(i,j) - f(i,j-1)\}$$
$$= f(i,j+1) - 2 \times f(i,j) + f(i,j-1)$$

The Laplacian $\nabla 2 f(i,j)$ can be defined as expressed by equation (5) from the above-described relationships of the equations.

$$\nabla 2 f(i,j) = fxx(i,j) + fyy(i,j) \quad (5)$$
$$= f(i+1,j) - 2 \times f(i,j) + f(i-1,j) +$$
$$f(i,j+1) - 2 \times f(i,j) + f(i,j-1)$$
$$= f(i+1,j) + f(i-1,j) + f(i,j+1) +$$
$$f(i,j-1) - 4 \times f(i,j)$$

Accordingly, by subtracting the Laplacian ∇2f(i,j) from the original image f(i,j), the pixel value g(i,j) of the edge-enhanced image can be found from equation (6).

$$g(i,j) = f(i,j) - \nabla 2 f(i,j) \quad (6)$$
$$= f(i,j) - (f(i+1,j) + f(i-1,j) +$$
$$f(i,j+1) + f(i,j-1) - 4 \times f(i,j))$$
$$= -f(i+1,j) - f(i-1,j) - f(i,j+1) -$$
$$f(i,j-1) + 5 \times f(i,j))$$

Figures 61A, 61B:
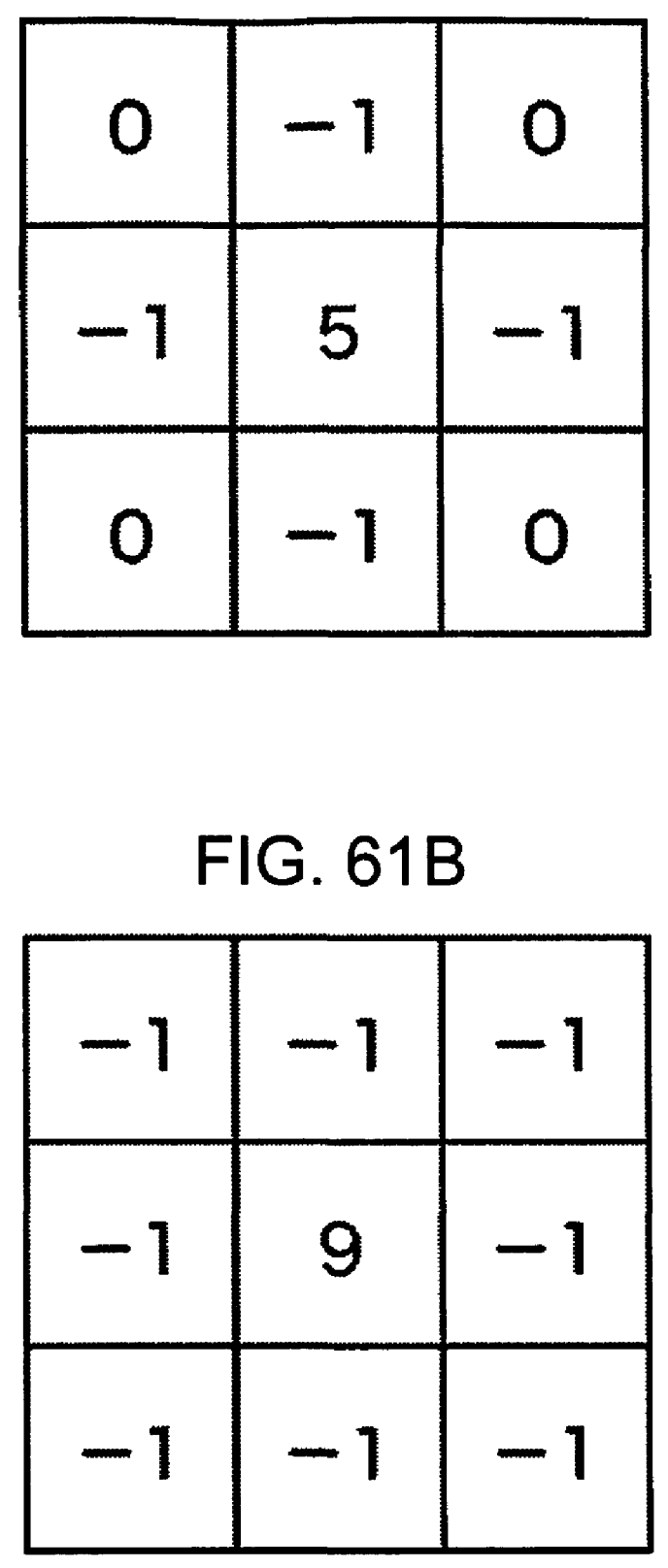

Equation (6) is a specific calculation for a subject pixel (center pixel), as shown in FIG. 61A, by a filter using second derivative values with respect to a total of four pixels disposed at the top, bottom, left, and right of the subject pixel (five pixels including the subject pixel). In FIG. 61A, a 3×3-pixel filter (Laplacian filter) including 0, −1, 0, −1, 5, −1, 0, −1, 0 from the top to the bottom and from the left to the right is used, and since the corner pixels are all 0, the filter practically includes only the five pixels formed of the subject pixel and the surrounding four pixels.

If the corner pixels are considered, a 3×3-pixel filter, as shown in FIG. 61B, including nine pixels, −1, −1, −1, −1, 9, −1, −1, −1, −1 from the top to the bottom and from the left to the right may be used.

The edge enhancement processing by the edge enhancer 832 is not restricted to the processing by using the Laplacian filter, and another type of processing may be performed as long as the edge portion of the input image can be enhanced. For example, the input image may be subjected to fast Fourier transform (FFT) processing and is enhanced by high frequency components in the spatial frequency range, and, the resulting image may be returned to the spatial range by performing inverse FFT, thereby enhancing the edge portion.

Figure 58:
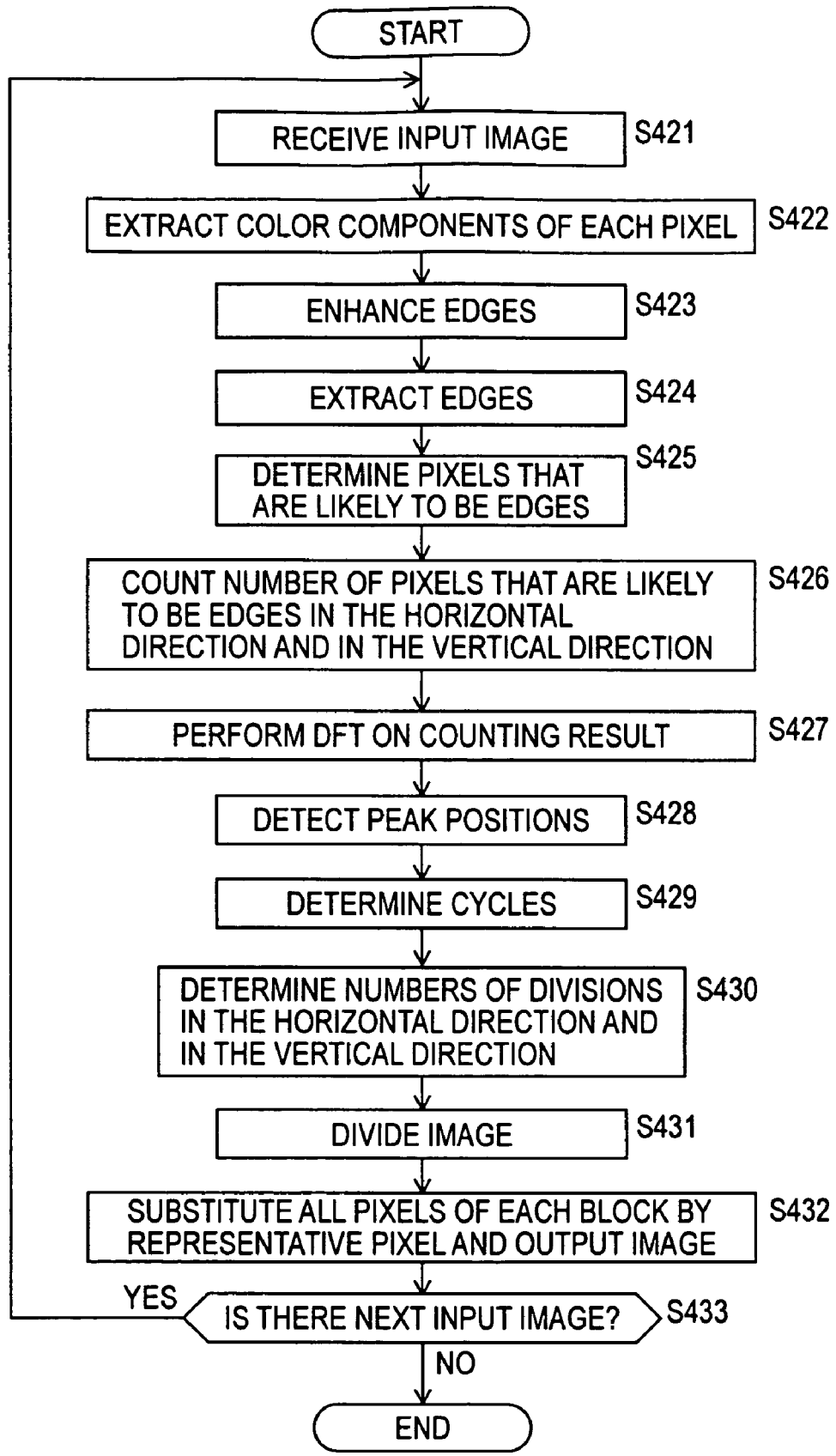
FIG. 58 is a flowchart illustrating image conversion processing performed by the image converter shown in FIG. 57.

Referring back to the flowchart of FIG. 58, in step S424, the edge extracting unit 833 extracts edges from the input image input from the edge enhancer 832 by using an edge extracting filter to generate an image formed of only edges, and outputs the resulting image to the edge determining unit 834. More specifically, the edge extracting unit 833 generates a binary image in which edge pixels are represented by 1 and the other pixels are indicated by 0.

The edge extracting filter is as follows.

As stated above, an edge is a portion in which the pixel values (in this case, the luminance) between adjacent pixels are sharply changed. Accordingly, the edge extracting unit 833 compares the difference of the pixel value between adjacent pixels, i.e., the value defined by equation (7) from the derivative value, with the threshold, and if the pixel value is not smaller than the threshold, the edge extracting unit 833 determines that the pixel is an edge portion.

$$|\nabla f(i,j)| = \sqrt{(fx2(i,j) + fy2(i,j))} \quad (7)$$

In equation (7), fx(i,j) and fy(i,j) are similar to the counterpart in equations (1) and (2), respectively. More specifically, the first derivative fx(i,j) in the horizontal direction is equal to the value obtained by multiplying the pixel values (luminance values) of adjacent pixels, such as those shown in FIG. 62A, by the values (i.e., −1, 1) indicated in FIG. 62A, and by adding the resulting values. Similarly, the first derivative fy(i,j) in the vertical direction is equal to the value obtained by multiplying the pixel values (luminance values) of adjacent pixels, such as those shown in FIG. 62B, by the values (i.e., −1, 1) indicated in FIG. 62B, and by adding the resulting values. The subject pixel may be any one of the pixels shown in FIG. 62A or 62B.

Since the calculation processing expressed by equation (7) for all the pixels is time-consuming, the following approximate expressions (8) and (9) may be used instead of equation (7) to facilitate the processing.

$$|\nabla f(i,j)| \approx |fx(i,j)| + |fy(i,j)| \qquad (8)$$

$$|\nabla f(i,j)| \approx \text{Max}|fx(i,j)|, |fy(i,j)| \qquad (9)$$

In equation (9), Max(A,B) indicates the greater value of A and B.

Figures 63A, 63B:
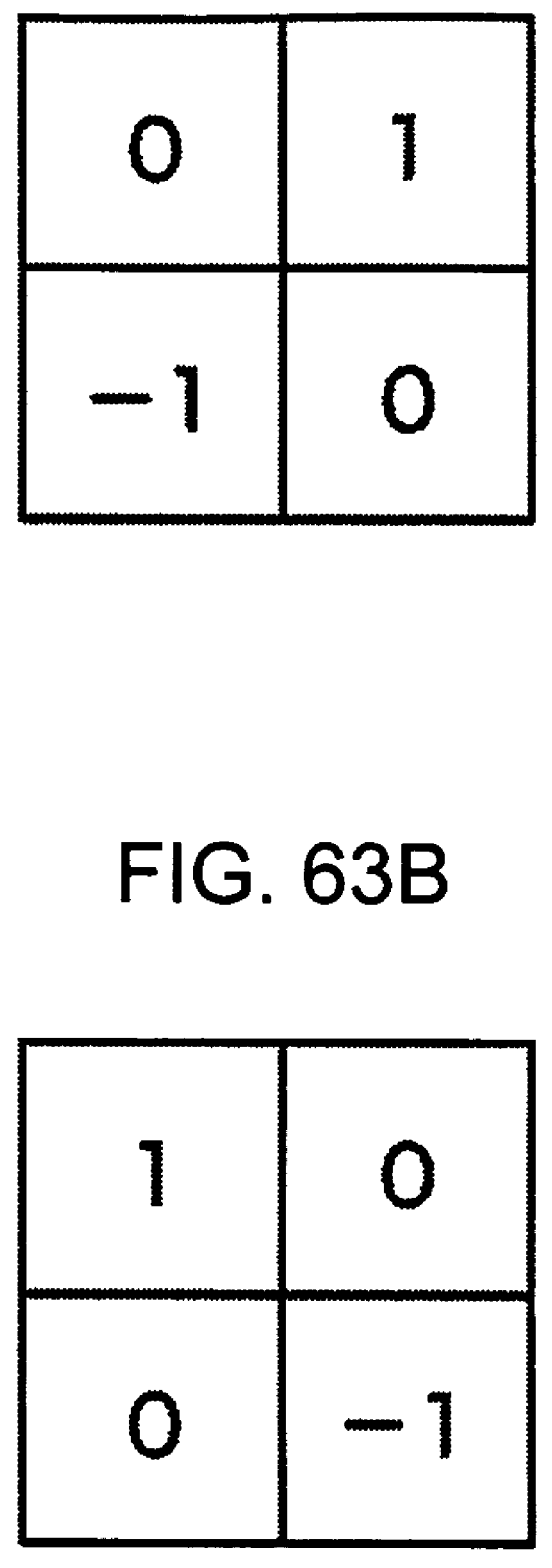

The edge extracting method when the left and right pixel values or the top and bottom pixel values are selected as adjacent pixels has been discussed. Alternatively, the edge portion may be extracted, as shown in FIGS. 63A and 63B, from the difference of the subject pixel with an obliquely adjacent pixel. In FIG. 63A, the subject pixel is the bottom left pixel or the top right pixel. In FIG. 63B, the subject pixel is the top left pixel or the bottom right pixel. The coefficients to be multiplied with each pixel value is, as shown in FIG. 63A, 0, 1, −1, 0 and is 1, 0, 0, −1, as shown in FIG. 63B, from the top to the bottom and from the left to the right.

The filter for extracting edges from the difference of the pixel value between obliquely adjacent pixels is referred to as the "Roberts edge detecting filter" (or simply the "Roberts filter").

When using the Roberts filter, the equation corresponding to the above-described equation (7) is equation (10).

$$|\nabla f(i,j)| = \sqrt{((f(i,j) - f(i+1,j+1))2 + (f(i+1,j) - f(i,j+1))2)} \qquad (10)$$

Accordingly, when using the Roberts filter, edges can be detected according to equation (10). Similarly, to facilitate the calculation in equation (10), the following approximate expressions (11) and (12) may be used instead of equation (10).

$$|\nabla f(i,j)| \approx |f(i,j) - f(i+1,j+1)| + |f(i+1,j) - f(i,j+1)| \qquad (11)$$

$$|\nabla f(i,j)| \approx \text{Max}(|fx(i,j) - f(i+1,j+1)|, |f(i+1,j) - f(i,j+1)|) \qquad (12)$$

Figures 64A, 64B:
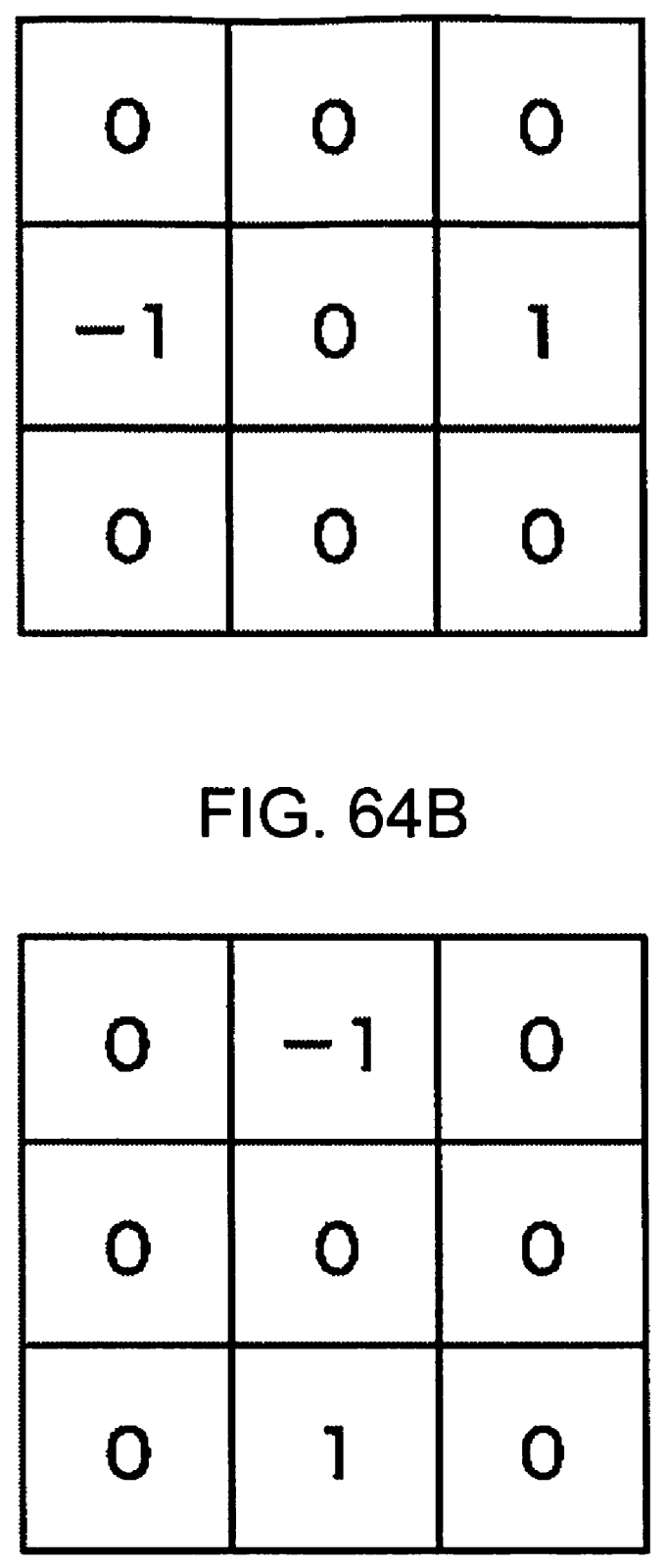

Edges can be found by the above-described methods. Strictly speaking, however, fx(i,j) in equation (1) is to find the first derivative value of fx(i+05,j) rather than the first derivative value of the subject pixel on the coordinates (i,j). Accordingly, the first derivative values in the horizontal and vertical directions of the subject pixel can be found from, as shown in FIG. 64A, the difference between pixels horizontally adjacent to the subject pixel (center pixel in FIG. 64A), and from, as shown in FIG. 64B, the difference between pixels vertically adjacent to the subject pixel (center pixel in FIG. 64B). That is, in FIG. 64A, the 3×3-pixel filter is used, and more precisely, the difference between pixels horizontally adjacent to the subject pixel is used as the first derivative in the horizontal direction of the subject pixel. Similarly, in FIG. 64B, the 3×3-pixel filter is used, and more precisely, the difference between pixels vertically adjacent to the subject pixel is used as the first derivative in the vertical direction of the subject pixel. According to the processing by using those filters, as the distance between the pixels to find the difference becomes larger, the influence of noise can be suppressed.

Figures 65A, 65B:
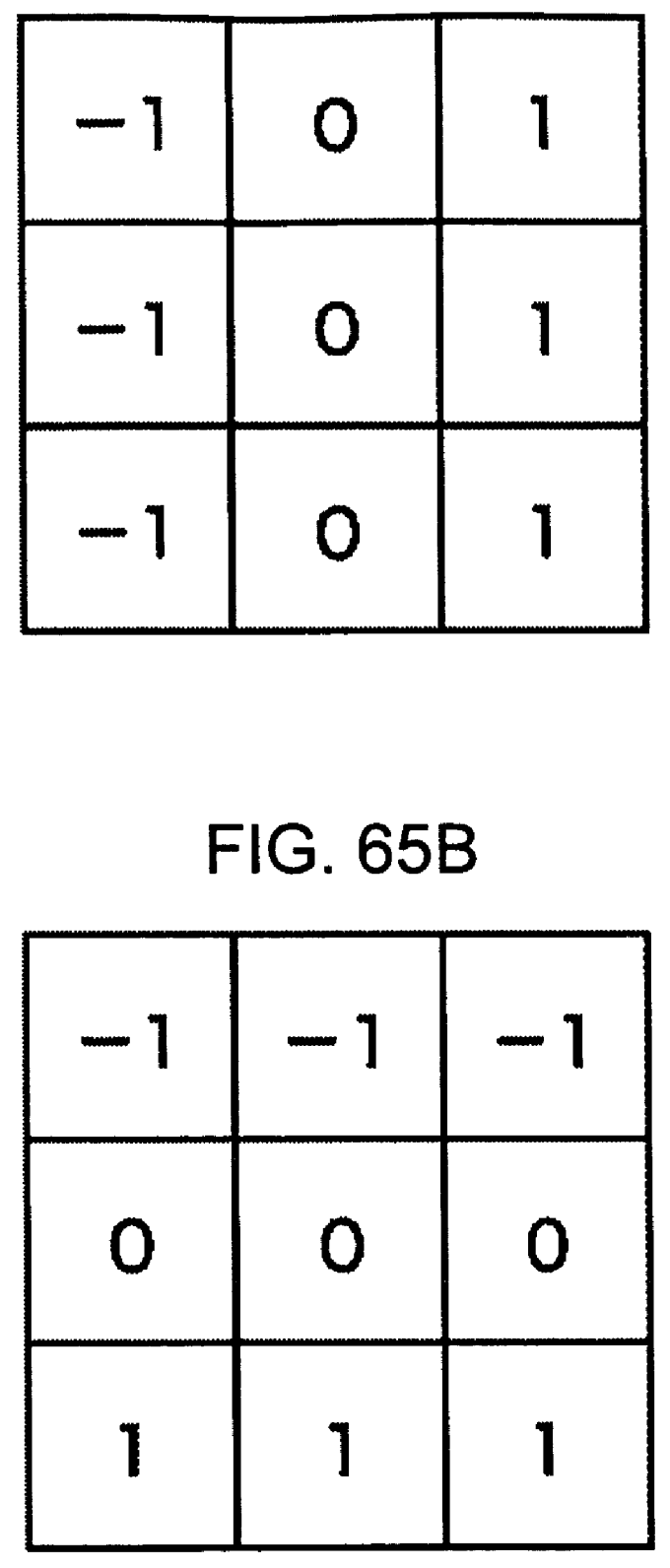

Alternatively, as shown in FIG. 65A, the difference between the sum of the pixels located at the top left, the left, and the bottom left adjacent to the subject pixel and the sum of the pixels located at the top right, the right, and the bottom right adjacent to the subject pixel may be found for the subject pixel, in which case, the smoothed first derivative in the horizontal direction can be found. In FIG. 65A, the individual pixel values are multiplied by the coefficients −1, 0, 1, −1, 0, 1, −1, 0, 1 from the top to the bottom and from the left to the right, and then, the resulting values are added.

Similarly, as shown in FIG. 65B, the difference between the sum of the pixels located at the top left, the top, and the top right adjacent to the subject pixel and the sum of the pixels located at the bottom right, the bottom, and the bottom left adjacent to the subject pixel may be found for the subject pixel, in which case, the smoothed first derivative in the vertical direction can be found. In FIG. 65B, the individual pixel values are multiplied by the coefficients −1, −1, −1, 0, 0, 0, 1, 1, 1 from the top to the bottom and from the left to the right, and then, the resulting values are added. The filters shown in FIGS. 65A and 65B are referred to as the "Prewitt edge detecting filters" (or simply the "Prewitt filters").

Figures 66A, 66B:
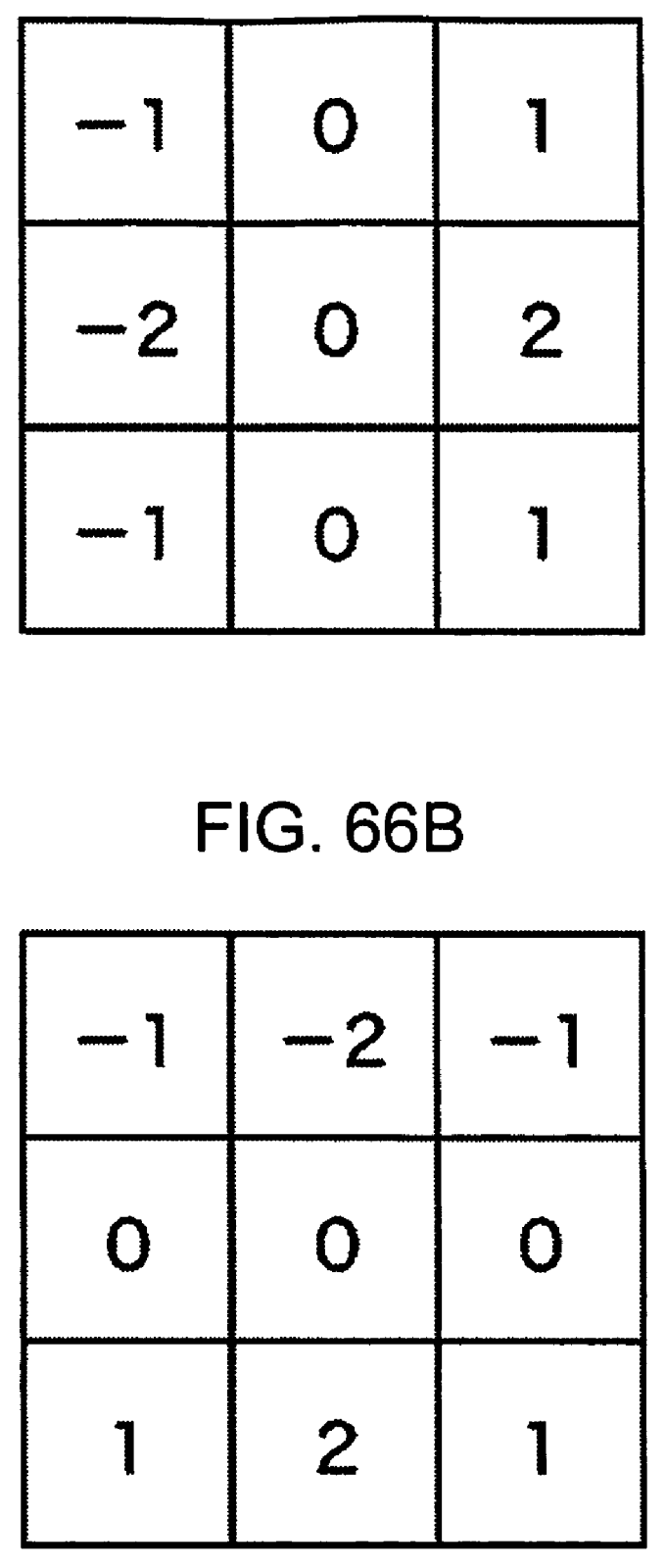

Alternatively, as shown in FIG. 66A, coefficients may be set by applying weights only to the pixel values of the pixels horizontally adjacent to the subject pixel. That is, in FIG. 66A, the individual pixel values are multiplied by the coefficients −1, 0, 1, −2, 0, 2, −1, 0, 1 from the top to the bottom and from the left to the right, and then, the resulting values are added.

Similarly, as shown in FIG. 66B, coefficients may be set by applying weights only to the pixel values of the pixels vertically adjacent to the subject pixel. That is, in FIG. 66B, individual pixel values are multiplied by the coefficients −1, −2, −1, 0, 0, 0, 1, 2, 1 from the top to the bottom and from the left to the right, and then, the resulting values are added.

According to the processing by using the filters shown in FIGS. 66A and 66B, large weights can be applied to the pixel values of the pixels most closely adjacent to the subject pixel, thereby detecting edges more precisely. The filters shown in FIGS. 66A and 66B are referred to as the "Sobel edge detecting filters" (or simply "Sobel filters").

Figure 67:
FIG. 67 illustrates an example of an input image.
Figure 68:
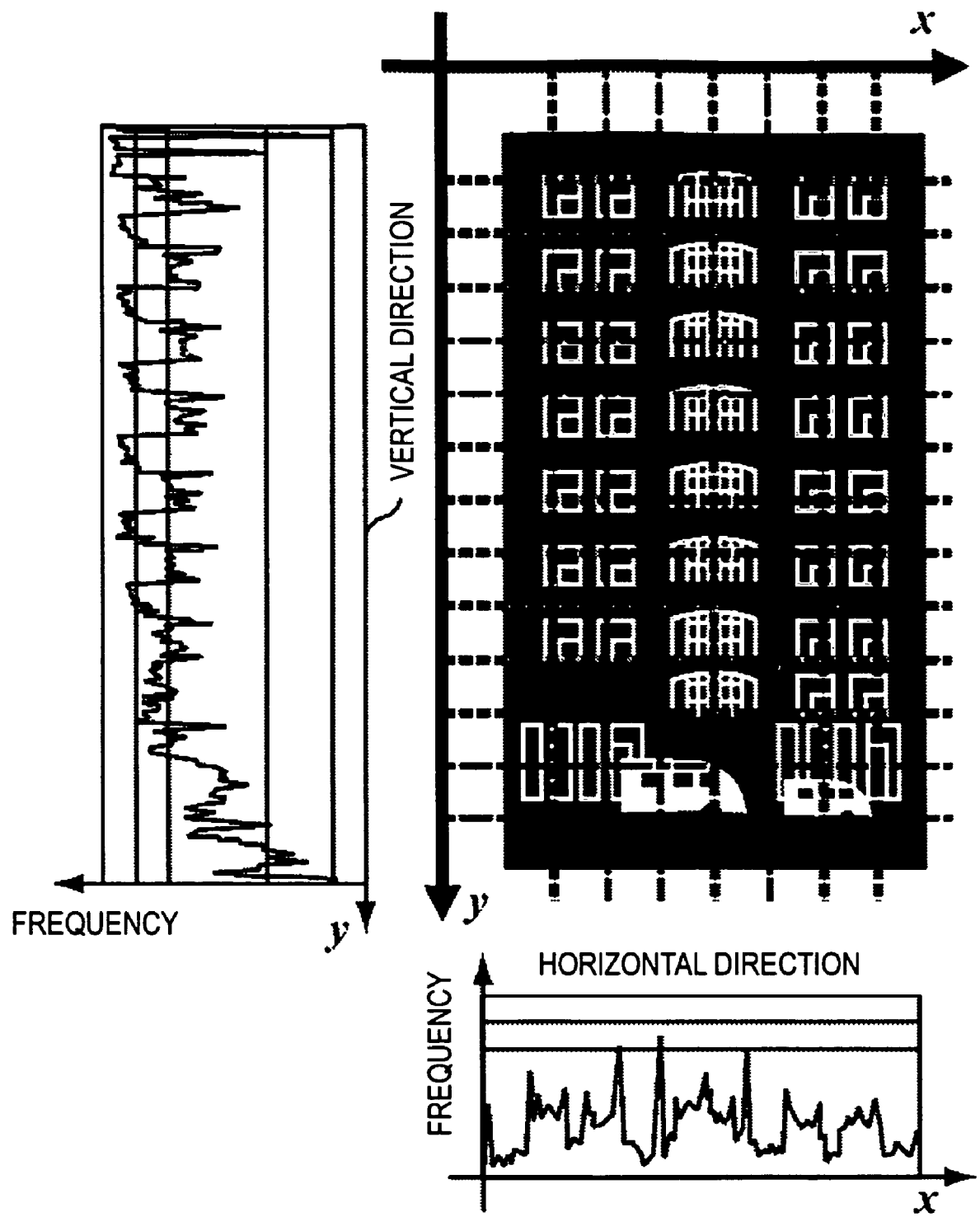
FIG. 68 illustrates an example of the processing for the input image shown in FIG. 67 by using edge extracting filters.

According to the processing of the above-described edge detecting filters, if, for example, an image of a building, such as that shown in FIG. 67, is the input image, only the edge portions (where pixel values are changed) are displayed in white and the other portions are displayed in black, as indicated at the right side of FIG. 68. Accordingly, the binary image in which only edge portions are extracted can be generated.

Referring back to the flowchart of FIG. 58, in step S425, the edge determining unit 834 determines whether each pixel forming the image processed by the edge extracting filters is likely to be an edge, and outputs the determining result to the edge counter 835. More specifically, if the image formed of extracted edges is the above-described binary image in which the pixel values of the edge portions are 1 and the pixel values of the other portions are 0, the edge determining unit 834 determines whether the pixel value of each pixel is 1, and outputs the determining result to the edge counter 835.

In step S426, the edge counter 835 counts the number of pixels that are likely to be edges at each position of the image in the horizontal or vertical direction based on the determination result input from the edge determining unit 834, and outputs the counting result to the DFT unit 836. More specifically, for example, in the image formed of extracted edges indicated at the right side of FIG. 68, when the right horizontal direction is x and the downward vertical direction is y, the coordinate positions and the number (frequency in FIG. 68) of pixels at each coordinate position (the number of pixels having the pixel value 1 indicated in white) are counted, as indicated at the bottom right side of FIG. 68, and the counting result is output to the DFT unit 836.

Since edges repeatedly appear at the x coordinate positions at which edges are present (x coordinate positions of the edges of the window frames of the building), as indicated by the bottom right side of FIG. 68, the frequency of the pixels that are likely to be edges is higher. Similarly, since edges repeatedly appear at the y coordinate positions at which edges are present (y coordinate positions of the edges of the window frames of the building), as indicated by the left side of FIG. 68, the frequency of the pixels that are likely to be edges is higher.

As a result, the relationship of the frequency of the edge appearance with respect to each of the horizontal and vertical positions is shown in FIG. 68.

In step S427, the DFT unit 836 performs DFT on the relationship of the frequency at which pixels that are likely to be edges appear with respect to each of the horizontal and vertical positions, and outputs the transform result to the peak extracting unit 837.

Figure 69:
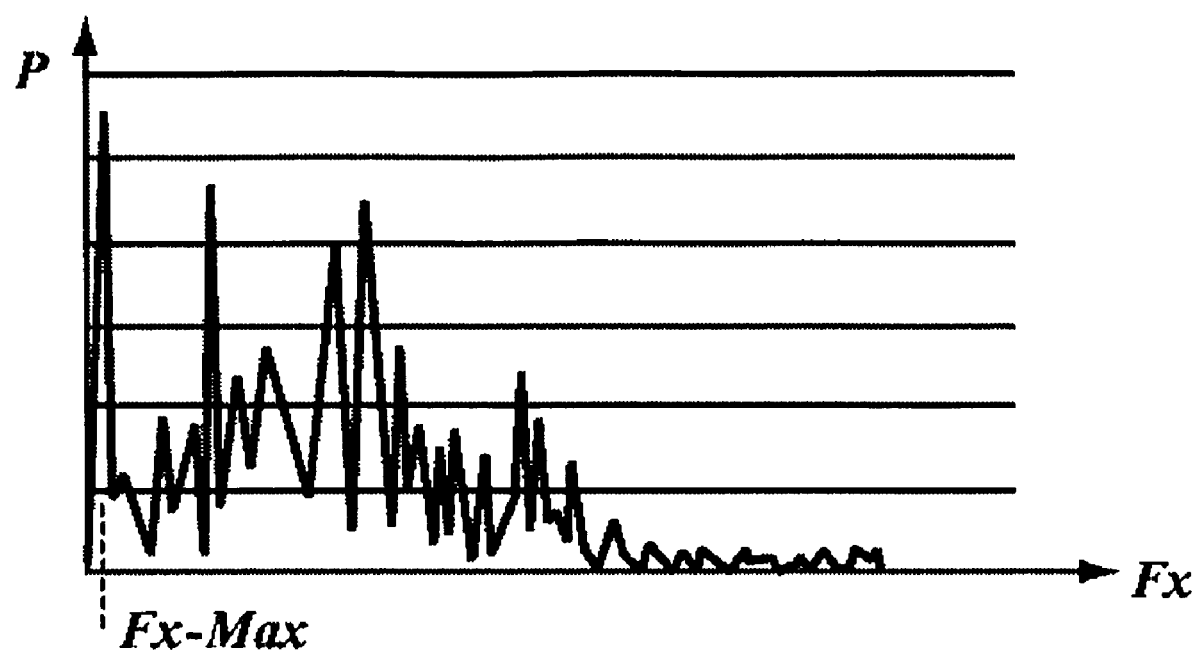
FIG. 69 illustrates a power spectrum in the horizontal direction.

For example, the relationship of the horizontal edge appearance frequency indicated at the bottom right side of FIG. 68 is subjected to the DFT processing and is then transformed into the relationship between the x-direction spatial frequency and the Fourier coefficient shown in FIG. 69. That is, in FIG. 69, the horizontal axis Fx indicates the x-direction horizontal spatial frequency, and the vertical axis P represents the sum of squares of Fourier series pair (pair of a real-part coefficient and an imaginary-part coefficient) as a result of performing DFT. The relationship shown in FIG. 69 is, in general, referred to as the "power spectrum", and the DFT unit 836 transforms the edge-appearance frequency in the horizontal (x) direction indicated at the bottom right side of FIG. 68 into the power spectrum in the x direction.

Figure 70:
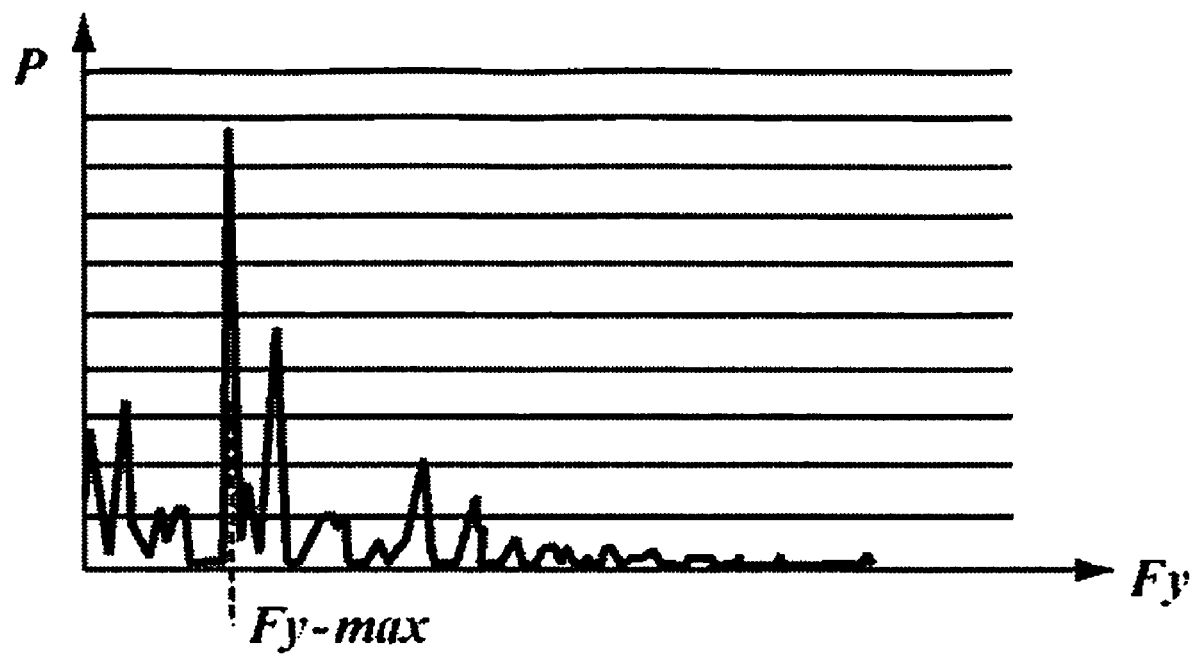
FIG. 70 illustrates a power spectrum in the vertical direction.

Similarly, the relationship of the vertical edge appearance frequency indicated at the left side of FIG. 68 is subjected to the DFT processing and is then transformed into the relationship between the y-direction spatial frequency and the Fourier coefficient shown in FIG. 70. That is, in FIG. 70, the horizontal axis Fy indicates the y-direction horizontal spatial frequency, and the vertical axis P represents the sum of squares of Fourier series pair (pair of a real-part coefficient and an imaginary-part coefficient) as a result of performing DFT. That is, the DFT unit 836 transforms the edge-appearance frequency in the vertical (y) direction indicated at the left side of FIG. 68 into the power spectrum in the y direction.

In step S428, the peak extracting unit 837 extracts the x- and y-direction spatial frequencies at the peak positions of the x- and y-direction power spectra input from the DFT unit 836, and outputs the extracted x- and y-direction spatial frequency values at the peak positions to the number-of-division determining unit 838.

That is, when the x-direction and y-direction power spectra shown in FIGS. 69 and 70, respectively, are detected, the peak extracting unit 837 extracts the x-direction spatial frequency Fx-max at the peak value of the x-direction power spectrum and the y-direction spatial frequency Fy-max at the peak value of the y-direction power spectrum, and outputs the extracted spatial frequencies Fx-max and Fy-max to the number-of-division determining unit 838.

In step S429, the number-of-division determining unit 838 determines the edge cycles at which edges appear on the image in the x and y direction based on the spatial frequencies Fx-max and Fy-max input from the peak extracting unit 837. Since the spatial frequency is the edge appearance frequency per unit length in each of the x and y directions, the edge cycle is the reciprocal of the spatial frequency and indicates the x-direction or y-direction edge appearance interval (the interval is indicated by the number of pixels). Then, the number-of-division determining unit 838 determines the reciprocal of the spatial frequencies Fx-max and Fy-max at the peak values of the x- and y-direction power spectra so as to find the x-direction edge appearance cycle (1/Fx-max) (the number of pixels indicating the x-direction edge appearance interval) and the y-direction edge appearance cycle (1/Fy-max) (the number of pixels indicating the y-direction edge appearance interval).

In step S430, the number-of-division determining unit 838 determines the numbers of divisions of the image in the x and y directions based on the edge appearance cycles, and outputs information concerning the determined number of divisions Dx in the x direction and the number of divisions Dy in the y direction to the image dividing unit 839. That is, the number-of-division determining unit 838 divides the number of x-direction pixels and the number of y-direction pixels, which are contained in the information concerning the image size input from the image input unit 831, by the x-direction edge appearance cycle (1/Fx-max) and the y-direction edge appearance cycle (1/Fy-max), respectively, thereby determining the number of divisions Dx and the number of divisions Dy in the x and y directions.

Figure 71:
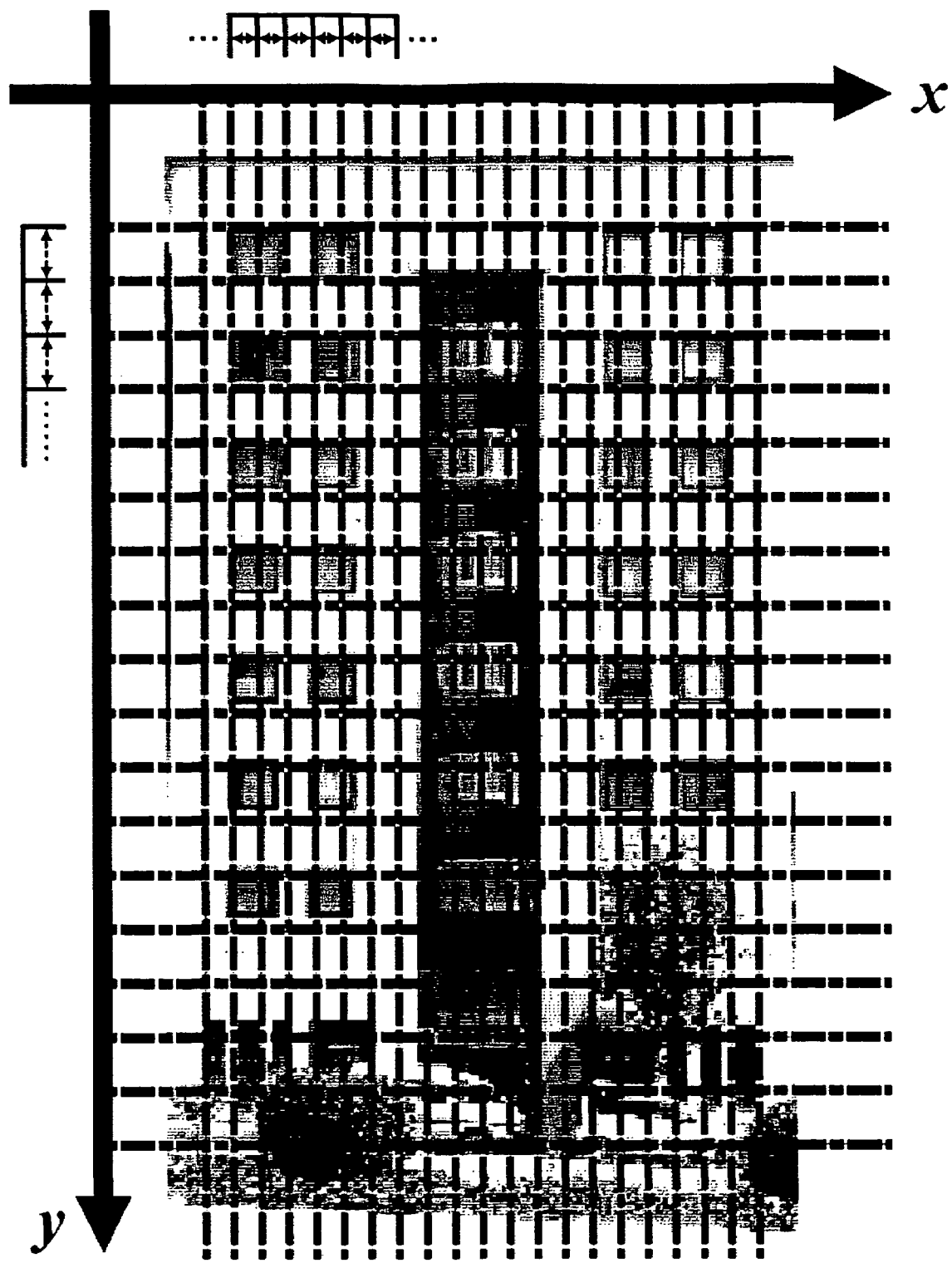
FIG. 71 illustrates an example of the divided input image shown in FIG. 67.
Figure 72:
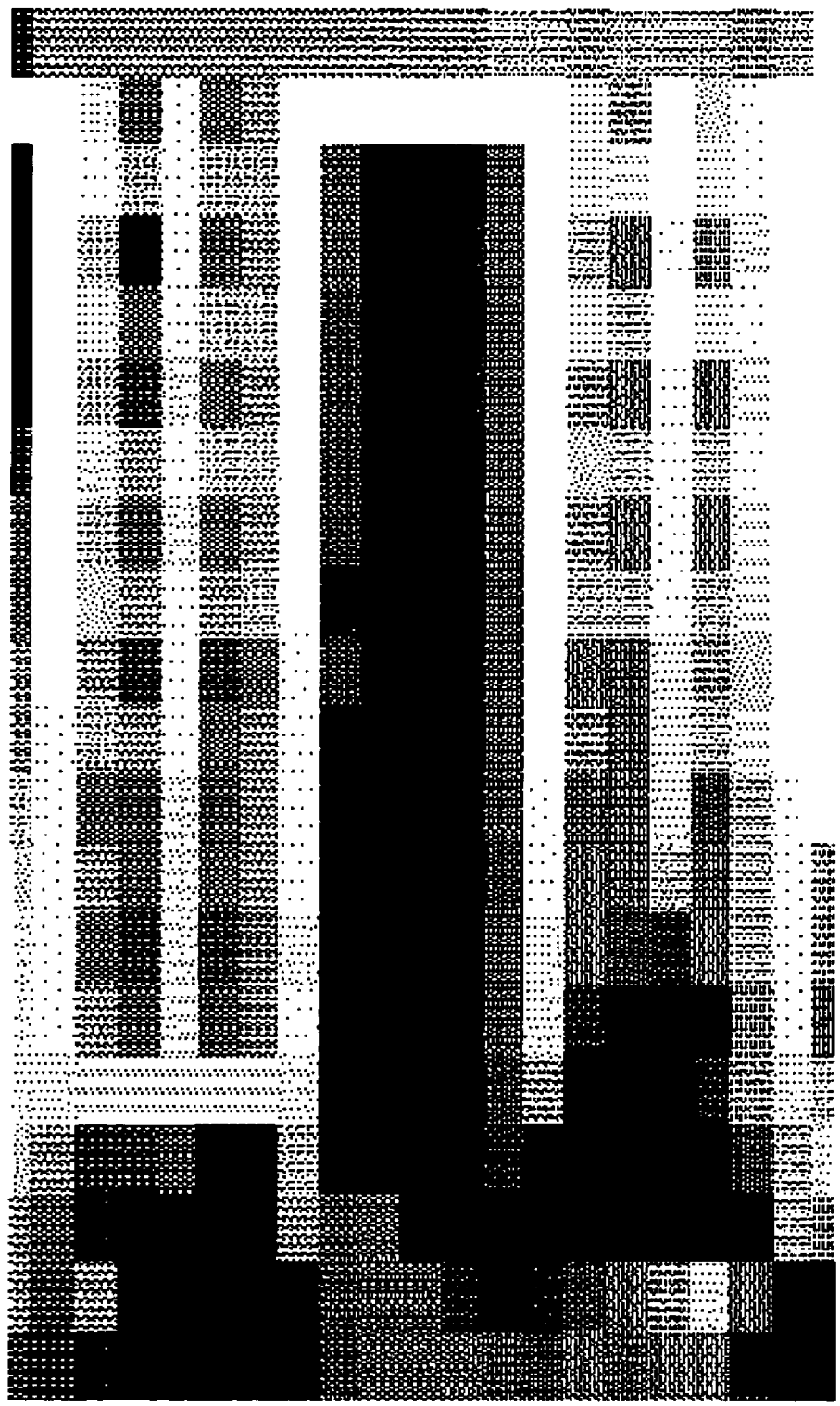
FIG. 72 illustrates an example of a low-resolution image converted from the input image shown in FIG. 67.

In step S431, the image dividing unit 839 divides the image input from the image input unit 831 based on the number of divisions Dx and the number of divisions Dy input from the number-of-division determining unit 838, and outputs the divided images to the color image output unit 840. More specifically, when the image shown in FIG. 67 is the input image, the image dividing unit 839 divides, as shown in FIG. 71, the image into blocks at the interval (1/Fx-max) indicated by the solid arrows above the x axis in FIG. 71 and at the interval (1/Fy-max) indicated by the broken arrows at the left side of the y axis in FIG. 71, and outputs the divided block images to the color image output unit 840. Accordingly, the image dividing unit 839 divides the input image into a total number (Dx×Dy) of blocks having a size (1/Fx-max) in the x direction and (1/Fy-max) in the y direction.

In step S432, the color image output unit 840 sets the average pixel value of the pixel values (luminance values) of all the pixels contained in each block image to be the representative value, and substitutes all the pixels contained in the block image by the representative value, and sequentially outputs the block images. As a result, for example, the input image shown in FIG. 67 is converted into a mosaic image shown in FIG. 72. That is, the input image shown in FIG. 67 is converted into a low-resolution mosaic image formed of the total number Dx×Dy of blocks.

In step S433, the image input unit 831 determines whether the subsequent image is input. If the subsequent image is input, the process returns to step S421, and the subsequent steps are repeated. That is, while images are sequentially input, steps S421 through S433 are repeated.

If it is determined in step S433 that the subsequent image is not input, the processing is completed.

That is, the image converter 821 shown in FIG. 57 can determine the number of divisions in the horizontal and vertical directions based on the edge cycles of the input image. Accordingly, the image converter 821 can set the size of the mosaic blocks to such a degree as to allow the resulting image to be recognizable by the human eye, and then converts the input image into a low-resolution image with the determined block size.

Accordingly, in the above-described method, an image which is not necessary to be processed, for example, an image which is not necessary to be displayed or stored, as a high-resolution image can be converted into a low-resolution image which is recognizable by the human eye. Thus, the load on various types of processing (for example, transferring, displaying, and recording) can be decreased while making the low-resolution image recognizable by the human eye.

In step S432, the color image output unit 840 sets the average pixel value in each block to be the representative value. Alternatively, another type of representative value may be set, for example, the mode value, the median value, or the average value of the maximum and minimum values in each block, or the pixel value of the pixel located at the centroid position in each block may be set to be the representative value.

According to the configuration and the processing shown in FIGS. 57 through 72, the edge enhancer 832 enhances edges of the input image (step S423 of FIG. 58), and the edge extracting unit 833 extracts the edges of the input image (step S424). The numbers of edges in the horizontal and vertical directions that are found by the edge determining unit 834 (step S425) are counted by the edge counter 835 (step S426). The DFT unit 836 generates power spectra by performing DFT processing on the counting result (step S427), and the peak extracting unit 837 extracts the spatial frequencies of the peaks of the power spectra (step S428). The number-of-division determining unit 838 detects the edge cycles of the input image based on the spatial frequencies (step S429), and determines the number of divisions of the input image based on the edge cycles (step S430). The image dividing unit 839 divides the input image into a plurality of blocks by the determined numbers of divisions (step S431). The color image output unit 840 converts all the pixel values in each block image into the predetermined pixel value (average pixel value of all the pixels in each block) and outputs the resulting block images. Thus, the input image can be converted into a low-resolution image such that it is recognizable by the human eye.

The low-resolution mosaic image data output from the image converter 821 as described above may be input into the block forming unit 12 shown in FIG. 1. In this case, since adjacent blocks having similar colors are integrated in step S54 of FIG. 13, the image can be divided into blocks having desired sizes. That is, a block image can be generated.

In the above-described embodiment, the texture generator 14 generates texture data based on the consecutive area data 23 supplied from the consecutive-area extracting device 13. However, instead of using the consecutive area data 23, texture data may be generated based on a mosaic image photographed by a digital still camera and input into the texture generator 14.

In the block forming device 12 discussed with reference to FIGS. 12 through 16, the block image data is directly output. Alternatively, the file generator 405 shown in FIG. 34 may be disposed after the similar color integrator 184 of the block forming device 12 shown in FIG. 12 so that the block image data can be output as a file. In this case, the file generator in the block forming device 12 can execute the processing shown in FIG. 42, thereby generating a file based on the repeating components of the block image data.

The block images generated by the block forming device 12 discussed with reference to FIGS. 12 through 16 may be handled as the block format. Alternatively, the block images having integrated consecutive areas generated by the consecutive-area extracting device 13 discussed with reference to FIGS. 17 through 32 may be handled as the block format.

Instead of using the mode value to determine various elements, the average or median value may be used. Conversely, instead of using the average value to determine various elements, the mode or median value may be used. Alternatively, all of the mode value, the median value, and the average value may be used for setting the statistically representative value.

The horizontal direction and the vertical direction may be read as "the substantially horizontal direction" and "the substantially vertical direction", respectively.

The above-described series of processing may be executed by hardware or software. In this case, the processings shown in FIG. 2, 7, 13, 18, 20, 23, 36, 42, 45, and 46 are executed by a personal computer 900 shown in FIG. 73.

Figure 73:
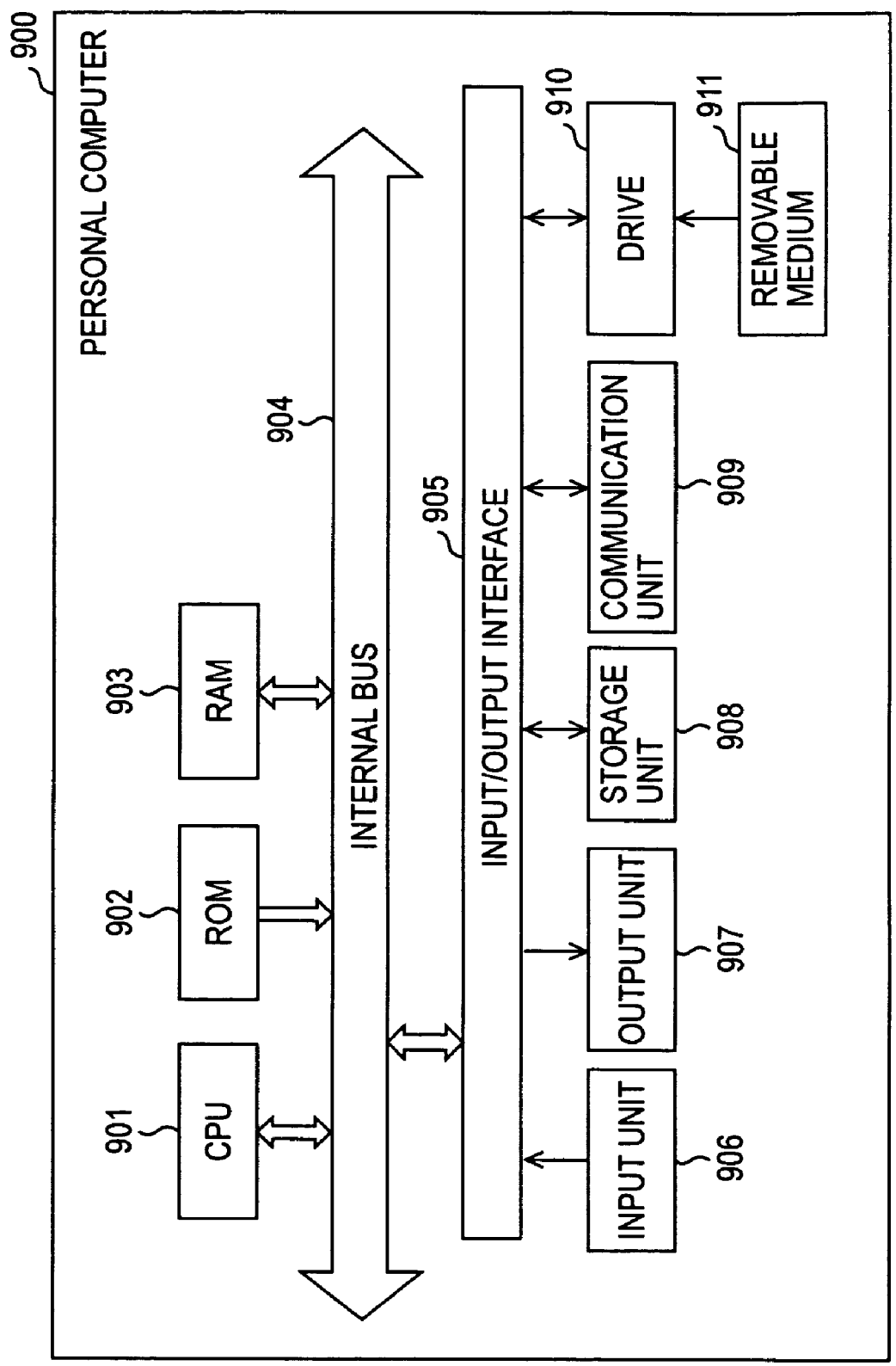
FIG. 73 is a block diagram illustrating an example of the configuration of a personal computer.

In FIG. 73, a central processing unit (CPU) 901 executes various types of processing according to a program stored in a read only memory (ROM) 902 or a program loaded to a random access memory (RAM) 903 from a storage unit 908. The RAM 903 also stores data necessary for executing various types of processing by the CPU 901.

The CPU 901, the ROM 902, and the RAM 903 are connected to each other via an internal bus 904. The internal bus 904 is also connected to an input/output interface 905.

The input/output interface 905 is connected to an input unit 906 including a keyboard and a mouse, an output unit 907 including a display, such as a cathode ray tube (CRT) or a liquid crystal display (LCD), and a speaker, the storage unit 908 including a hard disk, and a communication unit 909 including a modem and a terminal adapter. The communication unit 909 performs communication via various networks including telephone lines or cable television (CATV).

A drive 910 is connected to the input/output interface 905 if necessary. A removable medium 921, such as a magnetic disk, an optical disc, a magneto-optical disk, or a semiconductor memory, is installed in the drive 910, and a computer program read from the removable medium 921 is installed into the storage unit 908 if necessary.

If the series of processing is executed by using software, a corresponding software program is installed from a network or a recording medium.

This recording medium may be a package medium, such as the removable medium 921, recording the program therein, as shown in FIG. 73, which is distributed for providing the program to the user separately from the personal computer 900. Alternatively, the recording medium may be the ROM 902 or a hard disk contained in the storage unit 908 recording the program therein, which is provided to the user while being built in the computer 900.

In this specification, steps forming the computer program may be executed in chronological order disclosed in the specification, or may be executed in parallel or individually.

In this specification, the system is the entire apparatus including a plurality of devices.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing system for processing an image, comprising:
    edge extracting means for extracting edges in at least one of a substantially horizontal direction and a substantially vertical direction from an input image;
    mode-value calculating means for calculating a mode value of intervals between two edges on the image in the substantially horizontal direction or in the substantially vertical direction for all possible combinations of edge pairs of the edges extracted by the edge extracting means;
    repeating-cycle calculating means for detecting linkage portions of a set of edge pairs having the mode value of the intervals calculated by the mode-value calculating means, areas sandwiched between the two edges of the edge pairs having the mode value being continuously adjacent to each other, and for calculating a statistically representative value of the intervals of the two edges of the edge pairs having the linkage portions as a repeating cycle of the extracted edges;

image dividing means for dividing the input image by the repeating cycle of the extracted edges in a direction in which the edges repeatedly appear so as to generate a plurality of first blocks, which are small areas divided from the input image, and for setting a statistically representative color of each of the plurality of first blocks for the corresponding first block;

block integrating means for coupling, among the plurality of first blocks generated by dividing the input image by the image dividing means, a plurality of adjacent first blocks whose color difference is within a predetermined range from a second block and for setting the color of the second block to the statistically representative color of the coupled first blocks so as to integrate the second block into the plurality of first blocks;

area generating means for dividing the input image by boundaries of the second block in the substantially horizontal direction or in the substantially vertical direction generated by integrating the plurality of first blocks by the block integrating means so as to generate a plurality of areas for substituting the color;

area substituting means for substituting, among the plurality of areas generated by the area generating means, an area having the largest proportion of a predetermined statistically representative color for colors of the other areas;

area extracting means for extracting areas having a predetermined or greater size among the areas substituted by the area substituting means;

repeating-component extracting means for extracting repeating components, which are repeatedly appearing, similar components, in the areas extracted by the area extracting means;

repeating-component location adjusting means for adjusting the location of the repeating components extracted by the repeating-component extracting means by equally locating the repeating components extracted by the repeating-component extracting means at regular intervals on a screen;

area interpolation means for interpolating a representative value of an image without the repeating components into some of the areas forming the image in which the location of the repeating components is not adjusted;

feature information generating means for generating feature information indicating the repeating components located in the image interpolated by the area interpolation means and a feature of the location of the repeating components;

acquiring means for acquiring the feature information generated by the feature information generating means; and reproduction means for reproducing the image based on the feature information acquired by the acquiring means.

2. An image processing apparatus for processing an image, comprising:

repeating-component extracting means for extracting repeating components from the image, the repeating components being repeatedly appearing, similar components in the image;

repeating-component location adjusting means for adjusting the location of the repeating components extracted by the repeating-component extracting means by equally locating the repeating components extracted by the repeating-component extracting means at regular intervals on a screen;

area interpolation means for interpolating a representative value of an image without the repeating components into some of the areas forming the image in which the location of the repeating components is not adjusted; and feature information generating means for generating feature information indicating the repeating components in the image interpolated by the area interpolation means and a feature of the location of the repeating components.

3. The image processing apparatus according to claim 2, wherein the repeating-component location adjusting means adjusts the location of the repeating components on the image so that intervals at which the repeating components appear on the screen are equal.

4. The image processing apparatus according to claim 2, wherein the feature information generating means generates, as the feature information, information concerning positions at which the repeating components appear, information concerning the length in the direction perpendicular to the direction in which the repeating components are repeated, information concerning the number of repetitions of the repeating components, information concerning the interval at which the repeating components appear, and information concerning blocks, which are partial images of the image, forming the repeating components.

5. The image processing apparatus according to claim 2, further comprising:

edge extracting means for extracting edges in at least one of a substantially horizontal direction and a substantially vertical direction from an input image;

mode-value calculating means for calculating a mode value of intervals between two edges on the image in the substantially horizontal direction or in the substantially vertical direction for all possible combinations of edge pairs of the edges extracted by the edge extracting means;

repeating-cycle calculating means for detecting linkage portions of a set of edge pairs having the mode value of the intervals calculated by the mode-value calculating means, areas sandwiched between the two edges of the edge pairs having the mode value being continuously adjacent to each other, and for calculating a statistically representative value of the intervals of the two edges of the edge pairs having the linkage portions as a repeating cycle of the extracted edges;

image dividing means for dividing the input image by the repeating cycle of the extracted edges in a direction in which the edges repeatedly appear so as to generate a plurality of first blocks, which are small areas divided from the input image, and for setting a statistically representative color of each of the plurality of first blocks for the corresponding first blocks; block integrating means for coupling, among the plurality of first blocks generated by dividing the input image by the image dividing means, a plurality of adjacent first blocks whose color difference is within a predetermined range into a second block and for setting the statistically representative color of the coupled first blocks for the color of the second block so as to integrate the plurality of first blocks into the second block;

area generating means for dividing the input image by boundaries of the second block in the substantially horizontal direction or in the substantially vertical direction generated by integrating the plurality of first blocks by the block integrating means so as to generate a plurality of areas for substituting the color;

area substituting means for substituting, among the plurality of areas generated by the area generating means, an area having the largest proportion of a predetermined statistically representative color for colors of the other areas; and area extracting means for extracting areas having a predetermined or greater size among the areas substituted by the area substituting means, wherein the repeating-component extracting means extracts the repeating components from the image including the areas having the predetermined or greater size extracted by the area extracting means.

6. An image processing method for an image processing apparatus for processing an image, comprising:

extracting by a processor repeating components from the image by the image processing apparatus, the repeating components being repeatedly appearing, similar components in the image;

adjusting the location of the repeating components by equally locating the repeating components extracted by the extracting at regular intervals on a screen of the image processing apparatus;

interpolating a representative value of a second image without the repeating components into some of the areas forming the image in which the location of the repeating components is not adjusted to create a third image; and generating feature information indicating the repeating components located in the third image and a feature of the location of the repeating components.

7. A computer readable medium encoded with computer executable instructions, wherein the instructions, when executed by a processor, cause the processor to perform a method comprising:

extracting repeating components from the image, the repeating components being repeatedly appearing, similar components in the image;

adjusting the location of the repeating components by equally locating the repeating components extracted by the extracting at regular intervals on a screen;

interpolating a representative value of a second image without the repeating components into some of the areas forming the image in which the location of the repeating components is not adjusted to create a third image; and generating feature information indicating the repeating components located in the third image and a feature of the location of the repeating components.

8. An image processing apparatus for processing an image, comprising:

edge extracting means for extracting edges in at least one of a substantially horizontal direction and a substantially vertical direction from an input image;

mode-value calculating means for calculating a mode value of intervals between two edges on the image in the substantially horizontal direction or in the substantially vertical direction for all possible combinations of edge pairs of the edges extracted by the edge extracting means; and repeating-cycle calculating means for detecting linkage portions of a set of edge pairs having the mode value of the intervals calculated by the mode-value calculating means, areas sandwiched between the two edges of the edge pairs having the mode value being continuously adjacent to each other, and for calculating a statistically representative value of the intervals of the two edges of the edge pairs having the linkage portions as a repeating cycle of the extracted edges.

9. The image processing apparatus according to claim 8, wherein the repeating-cycle calculating means detects the linkage portions of a set of edge pairs including two edges whose intervals are within a predetermined range around the mode value, areas sandwiched between the two edges of the edge pairs being continuously adjacent to each other.

10. An image processing method for an image processing apparatus for processing an image, comprising:

extracting by a processor edges in at least one of a substantially horizontal direction and a substantially vertical direction from an input image by the image processing apparatus;

calculating a mode value of intervals between two edges on the image in the substantially horizontal direction or in the substantially vertical direction for all possible combinations of edge pairs of the edges extracted by the extracting edges; and detecting linkage portions of a set of edge pairs having the mode value of the intervals calculated by the calculating a mode value, areas sandwiched between the two edges of the edge pairs having the mode value being continuously adjacent to each other, and for calculating a statistically representative value of the intervals of the two edges of the edge pairs having the linkage portions as a repeating cycle of the extracted edges.

11. A computer readable medium encoded with computer executable instructions, wherein the instructions, when executed by a processor, cause the processor to perform a method comprising:

extracting edges in at least one of a substantially horizontal direction and a substantially vertical direction from an input image;

calculating a mode value of intervals between two edges on the image in the substantially horizontal direction or in the substantially vertical direction for all possible combinations of edge pairs of the edges extracted by the extracting edges; and detecting linkage portions of a set of edge pairs having the mode value of the intervals calculated by the calculating a mode value, areas sandwiched between the two edges of the edge pairs having the mode value being continuously adjacent to each other, and for calculating a statistically representative value of the intervals of the two edges of the edge pairs having the linkage portions as a repeating cycle of the extracted edges.

12. An image processing apparatus for processing an input image, comprising:

image dividing means for dividing the input image in which a plurality of edges repeatedly appear at predetermined intervals in one of a substantially horizontal direction and a substantially vertical direction by a repeating cycle of the edges in a direction in which the edges repeatedly appear so as to generate a plurality of first blocks, which are small areas divided from the input image, and for setting a statistically representative color of each of the plurality of first blocks for the corresponding first block; and block integrating means for coupling, among the plurality of first blocks generated by dividing the input image by the image dividing means, a plurality of adjacent first blocks whose color difference is within a predetermined range from a second block and for setting the color of the second block to the statistically representative color of the coupled first blocks so as to integrate the second block into the plurality of first blocks.

13. The image processing apparatus according to claim 12, further comprising:

area generating means for dividing the input image by boundaries of the second block in the substantially horizontal direction or in the substantially vertical direction generated by integrating the plurality of first blocks by the block integrating means so as to generate a plurality of areas for substituting the color.

14. The image processing apparatus according to claim 13, further comprising:
area substituting means for substituting, among the plurality of areas generated by the area generating means, an area having the largest proportion of a predetermined statistically representative color for colors of the other areas; and
area extracting means for extracting areas having a predetermined or greater size among the areas substituted by the area substituting means.

15. An image processing method for an image processing apparatus for processing an input image, comprising:
dividing by a processor the input image in which a plurality of edges repeatedly appear at predetermined intervals in one of a substantially horizontal direction and a substantially vertical direction by a repeating cycle of the edges in a direction in which the edges repeatedly appear so as to generate a plurality of first blocks, which are small areas divided from the input image, and for setting a statistically representative color of each of the plurality of first blocks for the corresponding first block by the image processing apparatus; and
coupling, among the plurality of first blocks generated by the dividing the input image, a plurality of adjacent first blocks whose color difference is within a predetermined range from a second block and for setting the color of the second block to the statistically representative color of the coupled first blocks so as to integrate the second block into the plurality of first blocks.

16. A computer readable medium encoded with computer executable instructions, wherein the instructions, when executed by a processor, cause the processor to perform a method comprising:
dividing the input image in which a plurality of edges repeatedly appear at predetermined intervals in one of a substantially horizontal direction and a substantially vertical direction by a repeating cycle of the edges in a direction in which the edges repeatedly appear so as to generate a plurality of first blocks, which are small areas divided from the input image, and for setting a statistically representative color of each of the plurality of first blocks for the corresponding first block; and
coupling, among the plurality of first blocks generated by the dividing the input image, a plurality of adjacent first blocks whose color difference is within a predetermined range from a second block and for setting the color of the second block to the statistically representative color of the coupled first blocks so as to integrate the second block into the plurality of first blocks.

17. An image processing system for processing an image, comprising:
an edge extracting unit extracting edges in at least one of a substantially horizontal direction and a substantially vertical direction from an input image;
a mode-value calculator calculating a mode value of intervals between two edges on the image in the substantially horizontal direction or in the substantially vertical direction for all possible combinations of edge pairs of the edges extracted by the edge extracting unit;
a repeating-cycle calculator detecting linkage portions of a set of edge pairs having the mode value of the intervals calculated by the mode-value calculator, areas sandwiched between the two edges of the edge pairs having the mode value being continuously adjacent to each other, and calculating a statistically representative value of the intervals of the two edges of the edge pairs having the linkage portions as a repeating cycle of the extracted edges;
an image dividing unit dividing the input image by the repeating cycle of the extracted edges in a direction in which the edges repeatedly appear so as to generate a plurality of first blocks, which are small areas divided from the input image, and setting a statistically representative color of each of the plurality of first blocks for the corresponding first block;
a block integrator coupling, among the plurality of first blocks generated by dividing the input image by the image dividing unit, a plurality of adjacent first block whose color difference is within a predetermined range from a second block and setting the color of the second block to the statistically representative color of the coupled first blocks so as to integrate the second block into the plurality of first blocks;
an area generator dividing the input image by boundaries of the second block in the substantially horizontal direction or in the substantially vertical direction generated by integrating the plurality of first blocks by the block integrator so as to generate a plurality of areas for substituting the color;
an area substituting unit substituting, among the plurality of areas generated by the area generator, an area having the largest proportion of a predetermined statistically representative color for colors of the other areas;
an area extracting unit extracting areas having a predetermined or greater size among the areas substituted by the area substituting unit;
a repeating-component extracting unit extracting repeating components, which are repeatedly appearing, similar components, in the areas extracted by the area extracting unit;
a screen configured to display an image;
a repeating-component location adjusting unit adjusting the location of the repeating components extracted by the repeating-component extracting unit by equally locating the repeating components extracted by the repeating-component extracting unit at regular intervals on the screen;
an area interpolator interpolating a representative value of an image without the repeating components into some of the areas forming the image in which the location of the repeating components is not adjusted;
a feature information generator generating feature information indicating the repeating components located in the image interpolated by the areas interpolator and a feature of the location of the repeating components;
an acquiring unit acquiring the feature information generated by the feature information generator; and
a reproduction unit reproducing the image based on the feature information acquired by the acquiring unit.

18. An image processing apparatus for processing an image, comprising:
a processor including an edge extracting unit extracting edges in at least one of a substantially horizontal direction and a substantially vertical direction from an input image;
a mode-value calculator calculating a mode value of intervals between two edges on the image in the substantially horizontal direction or in the substantially vertical direction for all possible combinations of edge pairs of the edges extracted by the edge extracting unit; and a repeating-cycle calculator detecting linkage portions of a set of edge pairs having the mode value of the intervals calculated by the mode-value calculator, areas sandwiched between the two edges of the edge pairs having the mode value being continuously adjacent to each other, and calculating a statistically representative value of the intervals of the two edges of the edge pairs having the linkage portions as a repeating cycle of the extracted edges.

19. An image processing apparatus for processing an input image, comprising:

a processor including an image dividing unit dividing the input image in which a plurality of edges repeatedly appear at predetermined intervals in one of a substantially horizontal direction and a substantially vertical direction by a repeating cycle of the edges in a direction in which the edges repeatedly appear so as to generate a plurality of first blocks, which are small areas divided from the input image, and setting a statistically representative color of each of the plurality of first blocks for the corresponding first block; and a block integrator coupling, among the plurality of first blocks generated by dividing the input image by the image dividing unit, a plurality of adjacent first blocks whose color difference is within a predetermined range from a second block and setting the color of the second block to the statistically representative color of the coupled first blocks so as to integrate the second block into the plurality of first blocks.

* * * * *